United States Patent
Yoshihara et al.

(10) Patent No.: US 6,643,291 B1
(45) Date of Patent: Nov. 4, 2003

(54) MULTIMEDIA INFORMATION COMMUNICATION SYSTEM

(75) Inventors: Katsunori Yoshihara, Koganei (JP); Toshio Murai, Ichikawa (JP); Shuichi Sato, Sagamihara (JP); Shinichi Kashimoto, Ome (JP); Motohisa Araki, Hino (JP); Shinichi Shishino, Omi (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/242,455

(22) PCT Filed: Jun. 16, 1998

(86) PCT No.: PCT/JP98/02651

§ 371 (c)(1),
(2), (4) Date: Feb. 17, 1999

(87) PCT Pub. No.: WO98/58475

PCT Pub. Date: Dec. 23, 1998

(30) Foreign Application Priority Data

Jun. 18, 1997 (JP) .............................................. 9-161722
Nov. 26, 1997 (JP) .............................................. 9-324293

(51) Int. Cl.$^7$ .............................. H44L 12/28; H04J 3/16
(52) U.S. Cl. .................... 370/395.5; 370/467; 370/543; 379/22.01; 709/250
(58) Field of Search ............................... 370/319, 338, 370/344, 347, 360, 388, 389, 401, 395.5, 438, 465, 466, 467, 522, 543; 709/223, 230, 245, 249, 250; 379/220.01, 229, 230

(56) References Cited

U.S. PATENT DOCUMENTS 4,677,611 A * 6/1987 Yanosy et al. .............. 370/401
4,706,081 A * 11/1987 Hart et al. .................. 370/254
5,341,374 A * 8/1994 Lewen et al. ............... 370/450
5,420,916 A * 5/1995 Sekiguchi ................... 370/467
5,430,727 A * 7/1995 Callon ........................ 370/401

OTHER PUBLICATIONS

H. Shimizu et al., *IVDLAN Standardization and Development*, IEICE Transactions, vol. E 74, No. 9, Sep. 1991, pp. 2696–2702.

* cited by examiner

Primary Examiner—Hassan Kizou
Assistant Examiner—Afsar M. Qureshi
(74) Attorney, Agent, or Firm—Finnegan, Henderson, Farabow, Garrett & Dunner, L.L.P.

(57) ABSTRACT

A multimedia information system comprises first and second communication terminal apparatuses for exchanging information data using a common first communication protocol or first and second communication protocols which are different from each other, a first communication network for transmitting information data in accordance with a third communication protocol different from the first and second communication protocols, and first and second communication interface apparatuses for respectively connecting the first and second communication terminal apparatuses to the first communication network, the first communication interface apparatus comprises first conversion means for converting information data in accordance with the first and third communication protocols between the first communication terminal apparatus and the first communication network, and the second communication interface apparatus comprises second conversion means for converting information data in accordance with the second and third communication protocols between the second communication terminal apparatus and the first communication network.

35 Claims, 44 Drawing Sheets

EXTENSION TELEPHONE-EXTENSION TELEPHONE
(VOICE COMMUNICATION)

FIG. 9

DATABASE OF ROUTER APPARATUS

| DN | IP ADDRESS |
|---|---|
| 3000 | 133, 114, 131, 100 |
| 3001 | 133, 114, 131, 101 |
| 3002 | 133, 114, 131, 102 |
| ⋮ | ⋮ |

FIG. 29 DATABASE OF SERVER

| DN | IP ADDRESS |
|---|---|
| 3000 | 133,114,131,100 |
| 3001 | 133,114,131,101 |
| 3002 | 133,114,131,102 |
| ROUTER 5 | 133,114,131,200 |

DATABASE OF HUB

| DN | IP ADDRESS |
|---|---|
| 3000 | 133, 114, 131, 100 |
| 3001 | 133, 114, 131, 101 |
| 3002 | 133, 114, 131, 102 |
| ROUTER 5 | 133, 114, 131, 200 |
| ⋮ | ⋮ |

SUB-ADDRESS DATABASE OF ROUTER

| SUB-ADDRESS | DN |
|---|---|
| 1 | 3000 |
| 2 | 3001 |
| 3 | 3002 |
| ⋮ | ⋮ |

COMMUNICATION TYPE DATABASE OF ROUTER

| SUB-ADDRESS | COMMUNICATION TYPE | DN |
|---|---|---|
| 1 | VOICE | 3000 |
| 2 | DATA | 3001 |

CALLER DATABASE OF ROUTER

| ORIGINATING APPARATUS DN | DN |
|---|---|
| 03-1234-5678 | 3000 |
| 03-1234-6789 | 3001 |
| ⋮ | ⋮ |

MULTIMEDIA INFORMATION COMMUNICATION SYSTEM

TECHNICAL FIELD

The present invention relates to a multimedia information communication system for serving various kinds of media terminals to have, e.g., a LAN (Local Area Network) as a core.

BACKGROUND ART

As conventional private network systems, a system in which a PBX (Private Branch Exchange) serves voice communication terminals such as telephones and the like as extension terminals, and exchange-connects between these extension terminals and an external communication network such as a public network, and between the extension terminals so as to allow conversations, and a system in which data terminals such as personal computers and the like are connected to a LAN (Local Area Network), and e-mails and data are transported between the personal computers via the LAN are known. A system that links a voice communication system using a PBX and a data communication system using a LAN via a gateway has been proposed.

However, in such conventional private network system, independent communication infrastructures must be built in correspondence with the voice communication system and data communication system. The voice communication system readily goes system down since it is integrally controlled by the PBX. To avoid such problem, the PBXs must be duplicated. For this reason, problems of a large-scale system arrangement and heavy investment load on the user have been posed. Furthermore, connection of a new terminal, changes in connection, and the like require setups by maintenance persons, and since the voice communication system using the PBX and the data communication system using the LAN require different maintenance/management forms, maintenance/management processes are complicated and require high cost.

In order to link the voice communication system and data communication system, the gateway must be placed. Hence, the system arrangement requires still larger scale and higher cost.

DISCLOSURE OF INVENTION

It is an object of the present invention to provide a low-cost, high-reliability multimedia information communication system which can implement various kinds of communications by a common communication infrastructure without requiring any large-scale equipment such as a PBX, gateway, and the like, and can make an arrangement simple and maintenance/management easy.

A first multimedia information communication system according to the present invention comprises first and second communication terminal apparatuses for exchanging information data using a common first communication protocol or first and second communication protocols which are different from each other, a first communication network for transmitting information data in accordance with a third communication protocol different from the first and second communication protocols, and first and second communication interface apparatuses for respectively connecting the first and second communication terminal apparatuses to the first communication network, the first communication interface apparatus comprises first conversion means for converting information data in accordance with the first and third communication protocols between the first communication terminal apparatus and the first communication network, and the second communication interface apparatus comprises second conversion means for converting information data in accordance with the second and third communication protocols between the second communication terminal apparatus and the first communication network.

Preferred manners of the first multimedia information communication system according to the present invention are as follows.

(1) The system further comprises a third communication interface apparatus for connecting the first communication network to a second communication network which transmits information data in accordance with a fourth communication protocol which is different from at least the third communication protocol, and the third communication interface apparatus comprises third conversion means for converting information data in correspondence with a difference between the third and fourth communication protocols between the second and first communication networks.

(2) In the system of (1), at least one of the first, second, and third conversion means comprises a plurality of data conversion means provided in correspondence with types of information data, data type determination means for determining a type of input information data, and selection means for selectively enabling the plurality of data conversion means in accordance with a determination result of the data type determination means to convert the information data.

A second multimedia information communication system according to the present invention comprises first and second communication terminal apparatuses for exchanging information data using a common first communication protocol or first and second communication protocols which are different from each other, a first communication network for transmitting information data in accordance with a third communication protocol different from the first and second communication protocols, first and second communication interface apparatuses for respectively connecting the first and second communication terminal apparatuses to the first communication network, and a third communication interface apparatus for connecting the first communication network to a second communication network for transmitting information data in accordance with a fourth communication protocol different from the third communication protocol, and each of the first and second interface apparatuses comprises inquiry means for, when a communication terminal apparatus served by the own apparatus generates a call originating request addressed to a communication terminal apparatus served by another communication interface apparatus, multi-address transmitting an inquiry signal containing first identification information assigned to the terminating communication terminal apparatus to all communication interface apparatuses connected to the first communication network, determination means for, when an inquiry signal reaches via the first communication network, determining if a communication terminal apparatus corresponding to the first identification information contained in the inquiry signal is served by the own apparatus, response signal transmission means for, when the determination means determines that the communication terminal apparatus of interest is served by the own apparatus, sending back a response signal containing second identification information assigned to the own apparatus on the first communication network to an originating communication interface apparatus via the first communication network, and first communication link formation means for, when the response signal is sent back, performing processing for forming a communication link between the own apparatus and the terminating communication interface apparatus on the first communication network on the basis of the second identification information contained in the response signal.

Preferred manners of the second multimedia information communication system according to the present invention are as follows.

(1) Each of the first and second communication interface apparatuses comprises identification information storage means for, when the response signal is sent back, storing the second identification information contained in the response signal together with first identification information corresponding to a partner communication terminal apparatus in correspondence with each other, first acquisition means for, when a communication terminal apparatus served by the own apparatus generates a call originating request addressed to a communication terminal apparatus served by another communication interface apparatus, acquiring second identification information assigned to a communication interface apparatus that serves the terminating communication terminal apparatus from the identification information storage means, and second communication link formation means for, when the first acquisition means acquires the second identification information assigned to the terminating communication interface apparatus, performing processing for forming a communication link that connects between the own communication interface apparatus and terminating communication interface apparatus on the first communication network on the basis of the second identification information.

(2) In the system of (1), the identification information storage means stores first identification information and second identification information acquired by the own communication interface apparatus by the inquiry, and first identification information and second identification information acquired by another communication interface apparatus by the inquiry.

(3) The system further comprises a server apparatus, which is connected to the first communication network, and has a function of intensively storing the first identification information and second identification information acquired by the first and second communication interface apparatuses by the inquiry, and each of the first and second communication interface apparatuses comprises second acquisition means for, when a communication terminal apparatus served by the own apparatus generates a call originating request addressed to a communication terminal apparatus served by another communication interface apparatus, acquiring second identification information assigned to a communication interface apparatus that serves the terminating communication terminal apparatus from the server apparatus, and third communication link formation means for, when the second acquisition means acquires the second identification information assigned to the terminating communication interface apparatus, performing processing for forming a communication link that connects between the own communication interface apparatus and terminating communication interface apparatus on the first communication network on the basis of the second identification information.

(4) The third communication interface apparatus comprises identification information storage means for intensively storing the first identification information and second identification information acquired by the first and second communication interface apparatuses by the inquiry, and each of the first and second communication interface apparatuses comprises third acquisition means for, when a communication terminal apparatus served by the own apparatus generates a call originating request addressed to a communication terminal apparatus served by another communication interface apparatus, acquiring second identification information assigned to a communication interface apparatus that serves the terminating communication terminal apparatus from the identification information storage means of the third communication interface apparatus, and fourth communication link formation means for, when the third acquisition means acquires the second identification information assigned to the terminating communication interface apparatus, performing processing for forming a communication link that connects between the own communication interface apparatus and terminating communication interface apparatus on the first communication network on the basis of the second identification information.

(5) The system further comprises a server apparatus, which is connected to the first communication network, and has a function of intensively storing the first identification information and second identification information acquired by the first and second communication interface apparatuses by the inquiry, and each of the first and second communication interface apparatuses comprises identification information storage means for, when a response signal to the inquiry signal is sent back, storing second identification information contained in the response signal together with first identification information assigned to a terminating communication terminal apparatus in correspondence with each other, first search means for, when a communication terminal apparatus served by the own apparatus generates a call originating request addressed to a communication terminal apparatus served by another communication interface apparatus, searching the identification information storage means of the own apparatus for second identification information assigned to a communication interface apparatus that serves the terminating communication terminal apparatus, second search means for, when the first search means cannot find the second identification information by the search, searching the server apparatus for the second identification information, third search means for, when the second search means cannot find the second identification information by the search, multi-address transmitting an inquiry signal containing first identification information corresponding to the terminating communication terminal apparatus to all communication interface apparatuses connected to the first communication network, and acquiring second identification information assigned to the communication interface apparatus that serves the terminating communication terminal apparatus, on the basis of a response signal to the inquiry signal, and fifth communication link formation means for, when one of the first, second, and third search means acquires the second identification information assigned to the communication interface apparatus that serves the terminating communication terminal apparatus, performing processing for forming a communication link for connecting between the own communication interface apparatus and terminating communication interface apparatus on the first communication network on the basis of the second identification information.

A third multimedia information communication system according to the present invention comprises first and second communication terminal apparatuses for exchanging information data using a common first communication protocol or first and second communication protocols which are different from each other, a first communication network for transmitting information data in accordance with a third communication protocol different from the first and second communication protocols, first and second communication interface apparatuses for respectively connecting the first and second communication terminal apparatuses to the first communication network, and a third communication interface apparatus for connecting the first communication network to a second communication network for transmitting information data in accordance with a fourth communication protocol different from the third communication protocol, each of the first and second interface apparatuses comprises inquiry signal transmission means for, when a communication terminal apparatus served by the own apparatus generates a call originating request addressed to a communication terminal apparatus served by another communication interface apparatus, transmitting an inquiry signal containing identification information corresponding to the terminating communication terminal apparatus onto the first communication network, and the third communication interface apparatus comprises terminating apparatus determination means for receiving the inquiry signal, and determining based on the identification information contained in the inquiry signal if the terminating communication terminal apparatus is a communication terminal apparatus which is served by the first or second communication interface apparatus inside the system, or a communication terminal apparatus which is connected to the second communication network outside the system, and communication link formation means for selectively performing first processing for forming a communication link for connecting between the first or second communication interface apparatus that serves an originating communication terminal apparatus and the first or second communication interface apparatus that serves the terminating communication terminal apparatus, and second control for forming a communication link between the first or second communication interface apparatus that serves the originating communication terminal apparatus and the terminating communication terminal apparatus connected to the second communication network, in accordance with a determination result of the terminating apparatus determination means.

The third multimedia information communication system according to the present invention may further comprise a server apparatus, and the server apparatus may comprise terminating apparatus determination means and communication link forming means equipped in the third communication interface apparatus.

Preferred manners of the third multimedia information communication system according to the present invention are as follows.

(1) The communication link formation means performs, as the first control, control for sending back a response signal containing second identification information assigned to a communication interface apparatus that serves the terminating communication terminal apparatus to the communication interface apparatus as an inquiry source, and forming a communication link that connects between a communication interface apparatus that serves an originating communication terminal apparatus, and the communication interface apparatus that serves the terminating communication terminal apparatus, and as the second control, processing for sending back a response signal containing second identification information assigned to the third communication interface apparatus to the communication interface apparatus as an inquiry source, forming an internal communication link that connects the originating communication interface apparatus and the third communication interface apparatus on the first communication network, forming an external communication link between the terminating external communication terminal apparatus and the third communication interface apparatus by requesting a call connection to the second communication network, and connecting the internal and external communication links to each other.

(2) The terminating apparatus determination means comprises identification information storage means for prestoring first identification information assigned to the first and second communication interface apparatuses, and first identification information of each communication terminal apparatuses served by the communication interface apparatuses in correspondence with each other, and determines if the terminating communication terminal apparatus is a communication terminal apparatus inside or outside the system by checking if first identification information of a terminating apparatus contained in the received inquiry signal is stored in the identification information storage means.

(3) In the system of (2), the terminating apparatus determination means comprises identification information storage means for prestoring first identification information assigned to the first and second communication interface apparatuses, and first identification information of each communication terminal apparatuses served by the communication interface apparatuses in correspondence with each other, and determines if the terminating communication terminal apparatus is a communication terminal apparatus inside or outside the system by checking if first identification information of a terminating apparatus contained in the received inquiry signal is stored in the identification information storage means.

(4) When a received inquiry signal contains information indicating whether or not a call is originated to the second communication network, the terminating apparatus determination means determines based on the information if the terminating communication terminal apparatus is a communication terminal apparatus inside or outside the system.

A fourth multimedia information communication system according to the present invention comprises first and second communication terminal apparatuses for exchanging information data using a common first communication protocol or first and second communication protocols which are different from each other, a first communication network for transmitting information data in accordance with a third communication protocol different from the first and second communication protocols, first and second communication interface apparatuses for respectively connecting the first and second communication terminal apparatuses to the first communication network, and a third communication interface apparatus for connecting the first communication network to a second communication network for transmitting information data in accordance with a fourth communication protocol different from the third communication protocol, and each of the first and second communication interface apparatuses comprises terminating apparatus determination means for, when a communication terminal apparatus served by the own apparatus generates a call originating request addressed to another communication terminal apparatus, determining if the terminating communication terminal apparatus is a communication terminal apparatus which is served by the first or second interface apparatus inside the system, or a communication terminal apparatus which is connected to the second communication network outside the system, and communication link formation means for selectively performing first control for forming a communication link for connecting between the own communication interface apparatus and a communication interface apparatus that serves the terminating communication terminal apparatus, and second control for forming a communication link for connecting between the own communication interface apparatus and the terminating communication terminal apparatus connected to the second communication network, in accordance with a determination result of the terminating apparatus determination means.

Preferred manners of the fourth multimedia information communication system according to the present invention are as follows.

(1) The terminating apparatus determination means comprises inquiry means for, when a communication terminal apparatus served by the own communication interface apparatus generates a call originating request addressed to another communication terminal apparatus, multi-address transmitting an inquiry signal containing identification information corresponding to the terminating communication terminal apparatus to all communication interface apparatuses connected to the first communication network, and determination means for determining if the terminating other communication terminal apparatus is a communication terminal apparatus inside or outside the system by monitoring whether or not one of the communication interface apparatuses connected to the first communication network sends back a response signal indicating that the apparatus serves the terminating other communication terminal apparatus, after the inquiry signal is transmitted.

(2) In the system of (1), the terminating apparatus determination means comprises identification information storage means for, when the response signal is sent back, storing second identification information, which is contained in the response signal, and corresponds to a communication interface apparatus that sent back the response signal, together with first identification information corresponding to the terminating communication terminal apparatus in correspondence with each other, and determination means for, when a communication terminal apparatus served by the own communication interface apparatus generates a call originating request addressed to another communication terminal apparatus, searching the identification information storage means for second identification information assigned to a communication interface apparatus that serves the terminating communication terminal apparatus, and determining based on the presence/absence of the second identification information if the terminating communication terminal apparatus is a communication terminal apparatus inside or outside the system.

(3) When a call originating request sent from an originating communication terminal apparatus contains information indicating whether or not a call is originated to the second communication network, the terminating apparatus determination means determines based on this information if the terminating communication terminal apparatus is a communication terminal apparatus inside or outside the system.

A fifth multimedia information communication system according to the present invention comprises first and second communication terminal apparatuses for exchanging information data using a common first communication protocol or first and second communication protocols which are different from each other, a first communication network for transmitting information data in accordance with a third communication protocol different from the first and second communication protocols, first and second communication interface apparatuses for respectively connecting the first and second communication terminal apparatuses to the first communication network, and a third communication interface apparatus for connecting the first communication network to a second communication network for transmitting information data in accordance with a fourth communication protocol different from the third communication protocol, and the third communication interface apparatus comprises first identification information acquisition means for, when an incoming call signal reaches from an external communication terminal apparatus via the second communication network, acquiring first identification information corresponding to a terminating communication terminal apparatus served by the first or second communication interface apparatus on the basis of information representing a terminating apparatus contained in the incoming call signal, second identification information acquisition means for acquiring second identification information assigned to the first or second communication interface apparatus that serves the terminating communication terminal apparatus on the basis of the first identification information acquired by the first identification information acquisition means, and communication link formation means for forming a communication link that connects between the third communication interface apparatus and the first or second communication interface apparatus that serves the terminating communication terminal apparatus on the first communication network on the basis of the second identification information acquired by the second identification information acquisition means.

Preferred manners of the fifth multimedia information communication system according to the present invention are as follows.

(1) When the incoming call signal coming from the external communication terminal apparatus contains at least one of identification information corresponding to a terminating communication terminal apparatus and a communication type, the first identification information acquisition means determines a terminating communication terminal apparatus on the basis of at least one of the identification information and communication type, and acquires first identification information assigned to the determined communication terminal apparatus.

(2) When the incoming call signal coming from the external communication terminal apparatus contains identification information of an originating communication terminal apparatus, the first identification information acquisition means determines a terminating communication terminal apparatus on the basis of the identification information, and acquires first identification information assigned to the determined communication terminal apparatus.

Preferred manners of the first to fifth multimedia information communication systems according to the present invention are as follows.

(1) Each of the first and second communication interface apparatuses comprises communication interface means for communicating with the first communication network, codec means for decoding information obtained from the first communication network by the communication interface means or encoding information to be output to the first communication network, a PB receiver for decoding a PB signal from the first and second communication terminal apparatuses, and tone generation means for generating a call progress tone for the first and second communication terminal apparatuses.

(2) In the system of (1), each of the first and second communication interface apparatuses further comprises means for connecting a plurality of communication interface means equivalent to the communication interface means to the first communication network.

(3) Each of the first and second communication interface apparatuses comprises communication interface means for communicating with the first communication network, codec means for decoding information obtained from the first communication network by the communication interface means or encoding information to be output to the first communication network, a PB receiver for decoding a PB signal from the first and second communication terminal apparatuses, and radio means for making an information communication with a radio station.

(4) The third communication interface apparatus comprises first communication interface means for communicating with the first communication network, codec means for decoding information obtained from the first communication network or information obtained from the second communication network by the communication interface means, or encoding information to be output to the first or second communication network, a PB receiver for decoding a PB signal from the second communication network, and second communication interface means for communicating with the second communication network.

(5) The third communication interface apparatus comprises first communication interface means for communicating with the first communication network, codec means for decoding information obtained from the first communication network by the communication interface means, or encoding information to be output to the first communication network, and second communication interface means for communicating with the second communication network.

A sixth multimedia information communication system according to the present invention comprises a plurality of interface apparatuses, each of which is connected to a communication terminal, and has protocol conversion means for converting a first communication protocol unique to the communication terminal into a second communication protocol different from the first communication protocol, and vice versa, a network for connecting the interface apparatuses to each other and transmitting a signal in accordance with the second communication protocol, and a communication connection controller for controlling a communication between the plurality of terminal devices, and the communication connection controller is provided to at least one of the interface apparatuses.

Preferred manners of the sixth multimedia information communication system according to the present invention are as follows.

(1) The system further comprises a computer which is connected to the network and has a telephone function, and the communication connection controller is provided to the at least one interface apparatus and the computer.

(2) The system further comprises a server which is connected to the network and has the communication connection controller.

(3) Each of the interface apparatuses transmits, to one communication connection controller, originating side information that pertains to the interface apparatus which is to initiate a communication, terminating side information that pertains to the interface apparatus which is to communicate with, and communication condition information that pertains to communication means for performing a communication, at the beginning of the communication.

(4) In the system of (3), the communication controller acquires detailed originating side information, terminating side information, and communication condition information from a database on the network or the interface apparatus on the basis of the received originating side information, terminating side information, and communication condition information, selects an appropriate communication connection controller on the basis of the acquired information and information that pertains to a status of the network at the time of the communication, and transmits information that pertains to the selected communication connection controller to originating and terminating side interface apparatuses.

(5) In the system of (4), each of the interface apparatuses further comprises means for monitoring a communication state from the originating side interface apparatus to the terminating side interface apparatus.

(6) In the system of (3), the originating side information contains a telephone number, network number, and login name, and the communication condition information contains an audio communication, image communication, and data communication.

(7) In the system of (3), the terminating side information contains a telephone number, network number, login name, and group information required for a communication.

(8) The communication connection controller further comprises means for changing a terminating side interface apparatus in correspondence with a request from an originating or terminating side interface apparatus or a change in status of the network even after the beginning of the communication between the interface apparatuses.

(9) The system further comprises means for changing the communication connection controller in correspondence with a request from an originating or terminating side interface apparatus or a change in status of the network even after the beginning of the communication between the interface apparatuses.

(10) The system further comprises means for changing a communication connection mode in correspondence with a request from an originating or terminating side interface apparatus or a change in status of the network even after the beginning of the communication between the interface apparatuses.

(11) A third interface apparatus different from originating and terminating side interface apparatuses sends information of the originating and terminating side interface apparatuses to one communication connection controller to call the originating and terminating side interface apparatuses in turn and to connect the originating and terminating side interface apparatuses to each other so as to make the originating and terminating side interface apparatuses communicate with each other.

(12) When a terminating side interface apparatus cannot answer a call, a third interface apparatus answers as proxy for the terminating side interface apparatus, stores communicating information, and transfers the stored information upon call termination to the terminating side interface apparatus.

(13) The system further comprises means for converting e-mail text into audio data, and wherein audio data of an e-mail addressed to an originating side interface apparatus is transmitted to the originating side interface apparatus in response to a request from the originating side interface apparatus.

(14) The network transmits a signal in accordance with a protocol complying with an IEEE802 interface.

(15) The network transmits a signal in accordance with a protocol complying with an IEEE1394 interface.

According to the present invention, for example, both an audio signal transmitted from a voice communication terminal and data transmitted from a data terminal such as a personal computer are converted into an identical data format corresponding to a communication protocol of a first communication network by a communication interface apparatus, and the converted data are then sent onto the first communication network. The data transferred on the first communication network is converted into a data format corresponding to a communication protocol of a voice communication terminal or data terminal by a terminating communication interface apparatus, and is then sent to a terminal apparatus. For this reason, a plurality of kinds of communications can be implemented using a single infrastructure, i.e., the first communication network.

In addition, the data conversion processes of the respective terminal apparatuses are distributed to communication interface apparatuses corresponding to the terminal apparatuses, and each communication interface apparatus need only have a data conversion function between, e.g., one type of communication protocol on the terminal apparatus side and only one type of communication protocol on the first communication network side, and need not have all data conversion functions corresponding to a plurality of types of communication protocols versus a plurality of types of communication protocols. For this reason, no large-scale communication equipment for integrated processing such as duplicated PBXs, gateway, and the like is required, and a system can be realized by preparing a plurality of communication interface apparatuses having simple functions, thus attaining a simple system arrangement and a great cost reduction.

Upon connecting a new terminal apparatus or changing connections, after an arbitrary terminal apparatus is connected to the first communication network via a communication interface apparatus, a simple setup process need only be done without requiring any complicated setups. Hence, a system which has high expandability and allows easy maintenance-management can be provided.

As described above, according to the present invention, a low-cost, high-reliability multimedia information communication system which can implement a plurality of kinds of communications by a common communication infrastructure without equipping any large-scale equipment such as a PBX, gateway, and the like, and can make an arrangement simple and maintenance/management easy can be provided.

BRIEF DESCRIPTION OF DRAWINGS

FIG. 9 is a sequence chart showing the first example upon extension-to-extension communication between analog telephones;

FIG. 29 is a table showing an example of the configuration of an IP address search database provided to the content server;

BEST MODE OF CARRYING OUT THE INVENTION

Figure 1:
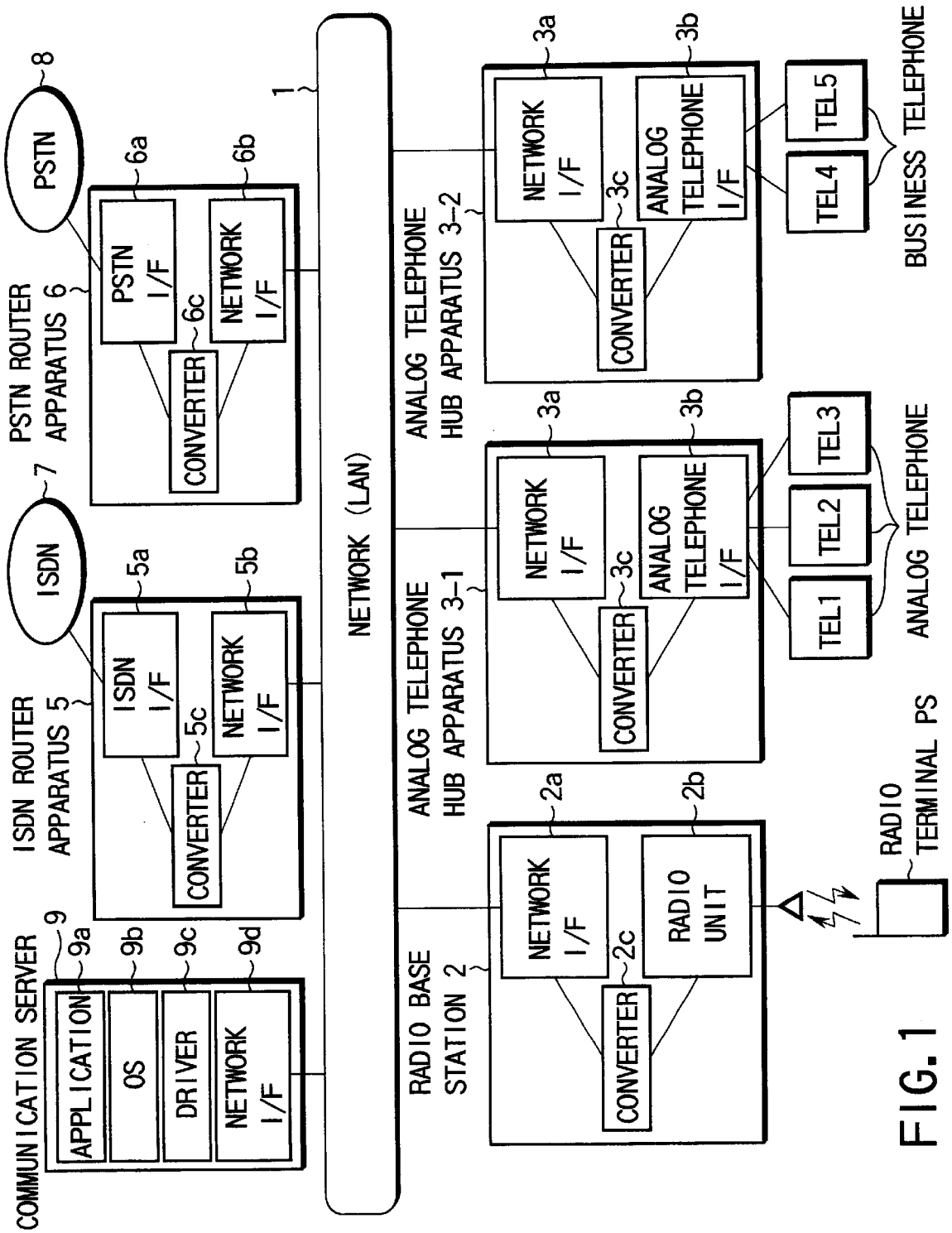
FIG. 1 is a schematic block diagram showing an embodiment of a multimedia information communication system according to the present invention.

FIG. 1 is a schematic diagram showing an embodiment of a multimedia information communication system according to the present invention. Referring to FIG. 1, a LAN 1 serves as a core of this system, and is comprised of Ethernet having a transmission capacity of, e.g., 100 Mbits or 1 Gbits.

A radio base station 2 and a plurality of analog telephone hub apparatuses 3-1 and 3-2 are connected to this LAN 1 as communication interface apparatuses for extension connections. The radio base station 2 has a function of a base station for, e.g., a PHS (Personal Handyphone System), and a radio terminal PS is connected to this radio base station 2 via a radio channel. A plurality of analog telephones TEL1 to TEL5 are connected to the analog telephone hub apparatuses 3-1 and 3-2. The radio terminal PS and analog telephones TEL1 to TEL5 are used as extension terminals.

Also, an ISDN router apparatus 5 and PSTN router apparatus 6 are connected to the LAN 1 as communication interface apparatuses for outside-line connections. The ISDN router apparatus 5 connects the LAN 1 to an ISDN 7. The PSTN router apparatus 6 connects the LAN 1 to a PSTN 8.

Furthermore, a communication server 9 is connected to the LAN 1. The communication server 9 comprises a network interface (I/F) 9d for interfacing with the LAN 1, a driver 9c for driving a hard disk device (not shown) and the like, an OS (operating system) 9b, and an application program 9a. The communication server 9 has a function of saving address information of the communication interface apparatuses 2 to 6 and the extension terminals connected thereto in a database, and searching the database and sending back a result obtained by search to an inquiry source when the communication interface apparatuses 2 to 6 inquire of the server about addresses.

Figure 2:
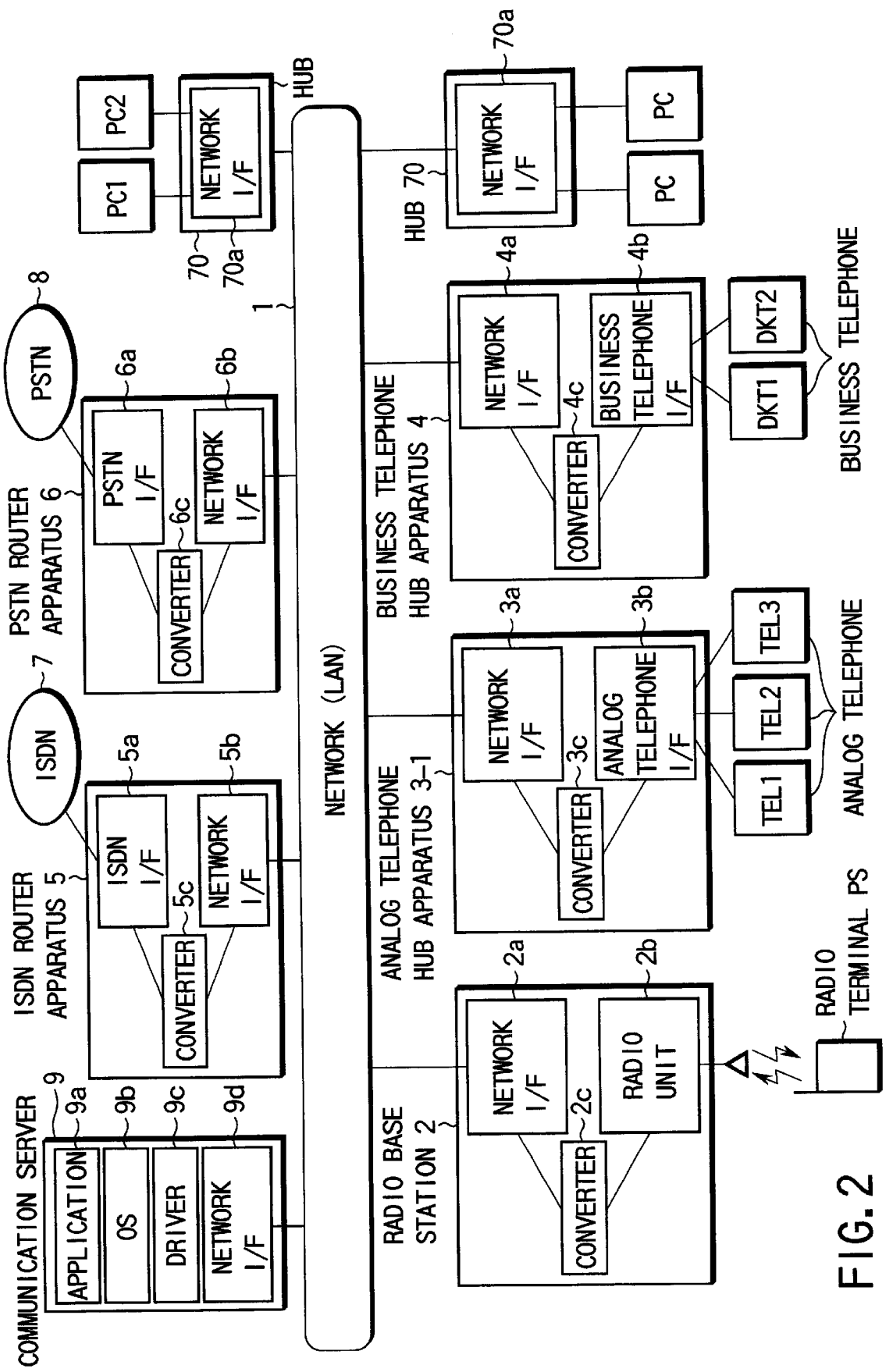
FIG. 2 is a block diagram showing the functional arrangement of a system which can also connect business telephones and personal computers.

The LAN 1 can serve business telephones, and data terminal apparatuses such as personal computers and the like, as extension terminals. FIG. 2 is a block diagram showing the functional arrangement of a system that can connect these business telephones and personal computers.

Referring to FIG. 2, a business telephone hub apparatus 4 and a hub apparatus 70 for a personal computer are connected to the LAN 1. A plurality of business telephones DKT1 and DKT2 are connected to the business telephone hub apparatus 4. These business telephones DKT1 and DKT2 comprise digital multi-functional telephones. The hub apparatus 70 comprises a network I/F 70a for interfacing with the LAN 1, and a plurality of personal computers PC1 and PC2 are connected to the network I/F 70a. These personal computers PC1 and PC2 have a data communication function.

The radio base station 2, analog telephone hub apparatuses 3-1 and 3-2, and business telephone hub apparatus 4 provided to that above system as extension communication interface apparatuses have the following arrangements.

Figure 3:
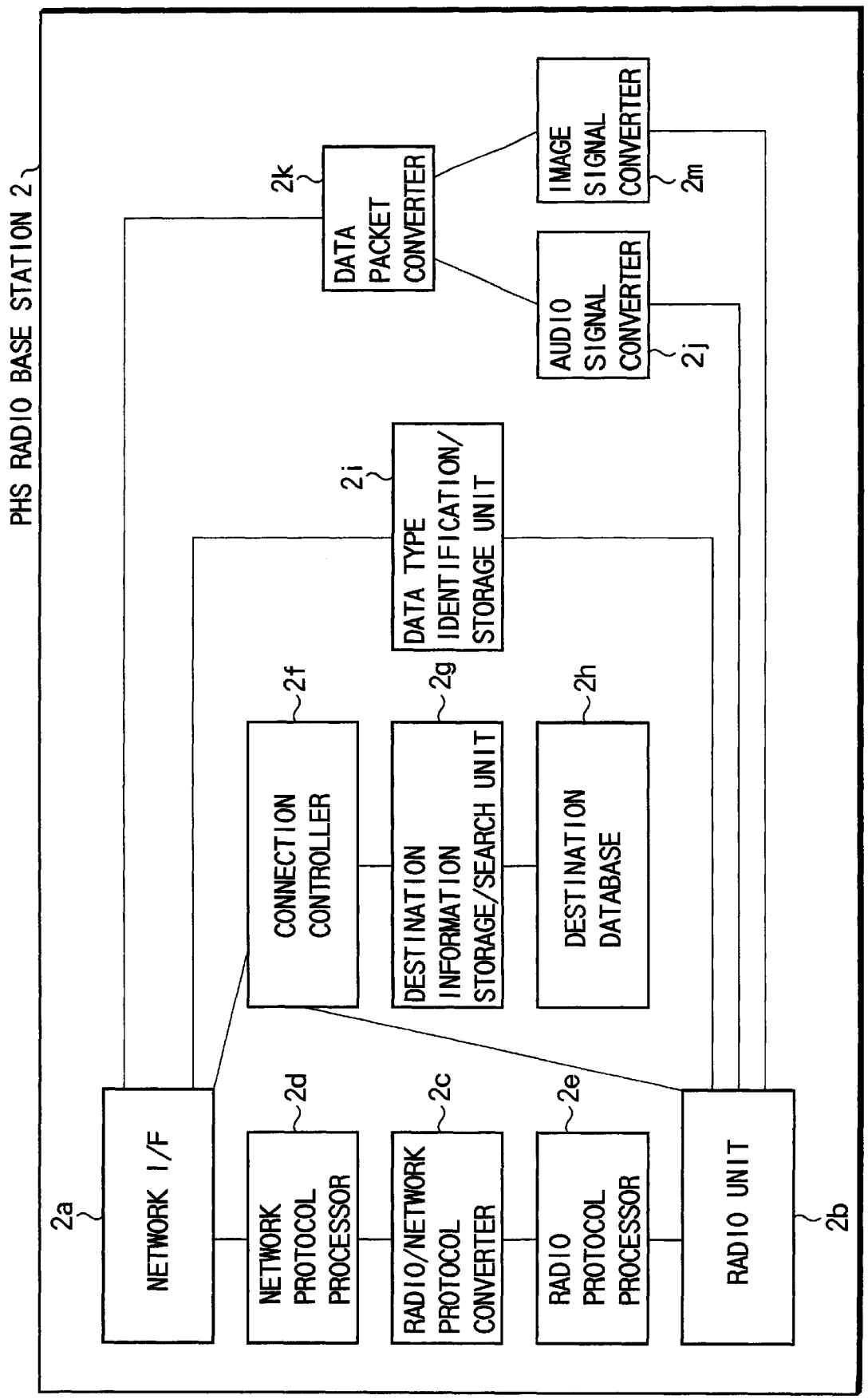
FIG. 3 is a block diagram showing the functional arrangement of a radio base station 2.

FIG. 3 is a block diagram showing the functional arrangement of the radio base station 2. The radio base station 2 comprises a network interface (I/F) 2a for interfacing with the LAN 1, a network protocol processor 2d, a radio unit 2b for exchanging radio signals with the radio terminal PS, a radio protocol processor 2e, and a radio/network protocol converter 2c. Of these units, the network protocol processor 2d controls data transmission with the LAN 1 in accordance with a network protocol defined with the radio terminal PS. The radio/network protocol converter 2c performs protocol conversion between the network protocol and radio protocol.

Also, the radio base station 2 comprises a connection controller 2f, destination information storage/search unit 2g, and destination database 2h, and further a data type identification/storage unit 2*i*, data packet converter 2*k*, audio signal converter 2*j*, and image signal converter 2*m*. Upon reception of a call request from the radio terminal PS, the connection controller 2*f* inquires of other communication interface apparatuses connected to the LAN 1 to confirm the location of the destination terminal, and executes control for forming a communication link for connecting the radio terminal PS and the communication partner terminal on the LAN 1 on the basis of the confirmation result. The destination information storage/search unit 2*g* stores the LAN address of the communication interface apparatus that serves the destination communication terminal acquired by the inquiry of the connection controller 2*f* in the destination database 2*h* together with the address of the destination communication terminal. The data type identification/storage unit 2*i* has a function of determining and storing the type of data received from the LAN 1.

The audio signal converter 2*j* converts audio data coming from the radio terminal PS into a format suitable for packetization. The image signal converter 2*m*,converts,image data coming from the radio terminal PS into a format suitable for packetization. The data packet converter 2*k* forms packets by breaking up the audio and image data in units of predetermined block lengths.

Figure 4:
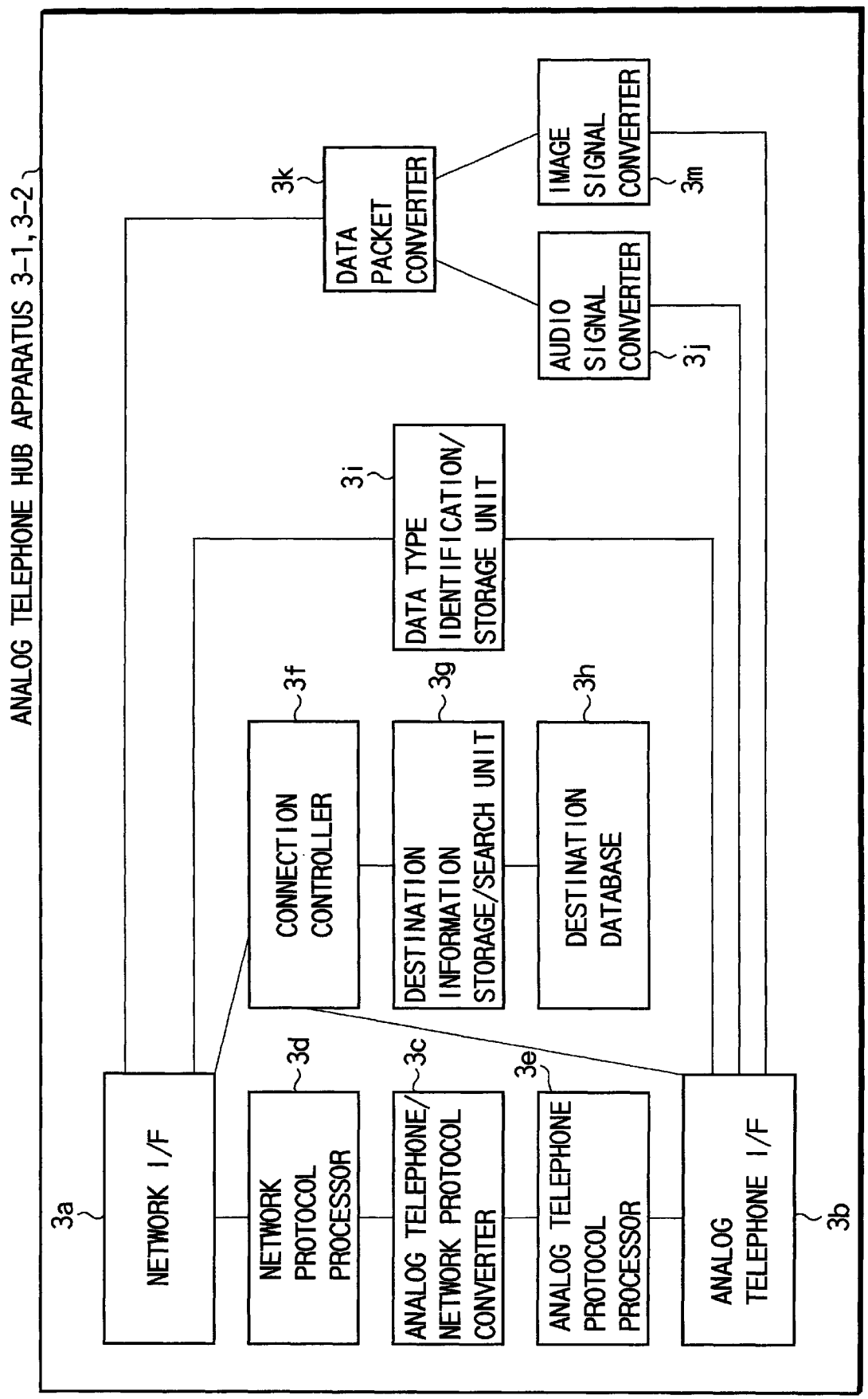
FIG. 4 is a block diagram showing the functional arrangement of analog telephone hub apparatuses 3-1 and 3-2f.

FIG. 4 is a block diagram showing the functional arrangement of the analog telephone hub apparatuses 3-1 and 3-2. The difference between the arrangements of the analog telephone hub apparatuses 3-1 and 3-2, and the radio base station 2 lies in that they comprise an analog telephone interface (I/F) 3*b*, analog telephone protocol processor 3*e*, and analog telephone/network protocol converter 3*c* in place of the radio unit 2*b*, radio protocol processor 2*e*, and radio/network protocol converter 2*c*.

The analog telephone I/F 3*b* exchanges audio signal with the analog telephones TEL1 to TEL5. The analog telephone protocol processor 3*e* controls telephone communications in accordance with a communication protocol defined with the analog telephones TEL1 to TEL5. The analog telephone/network protocol converter 3*c* performs protocol conversion between the network protocol and analog telephone protocol.

Figure 5:
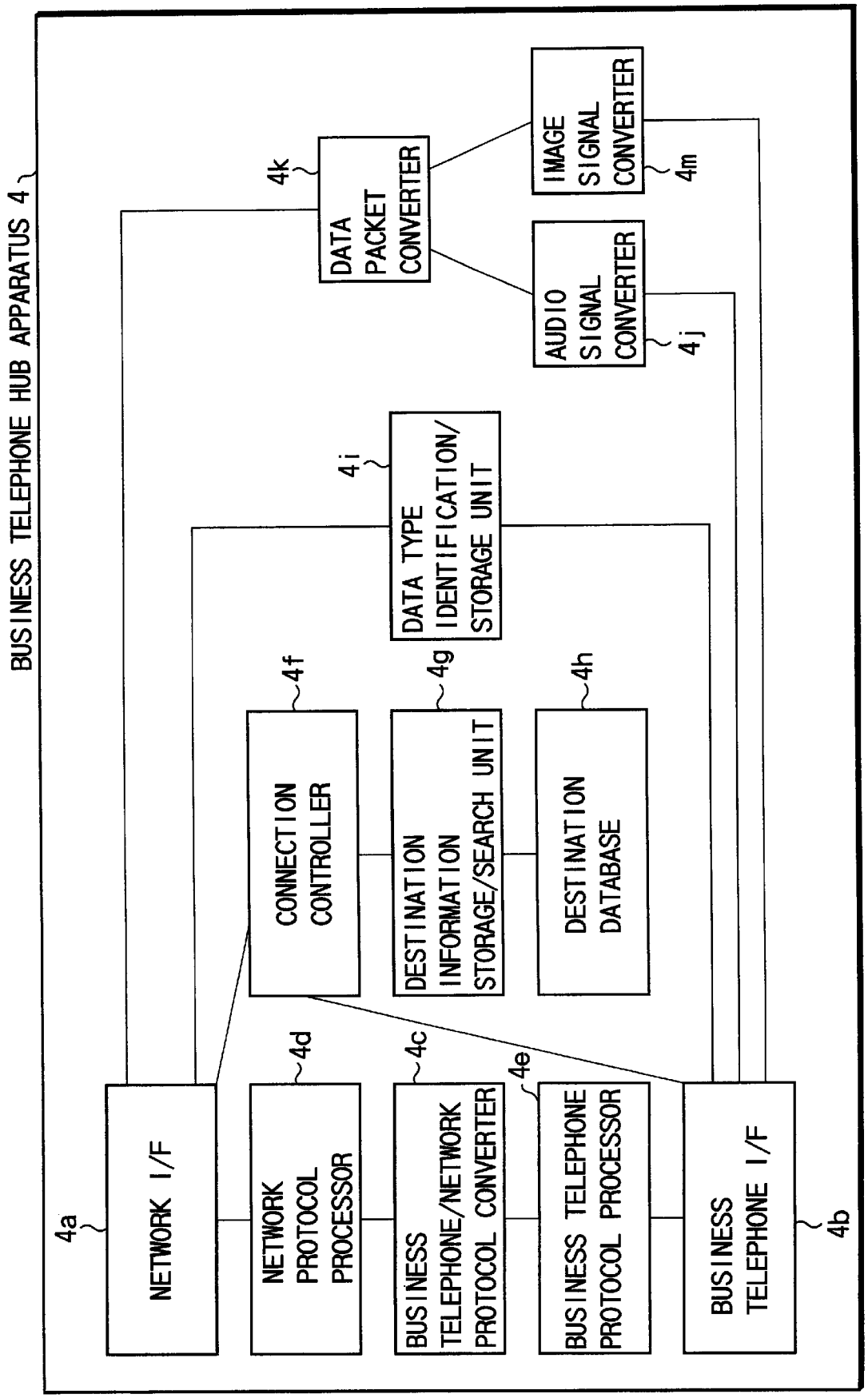
FIG. 5 is a block diagram showing the functional arrangement of a business telephone hub apparatus 4.

FIG. 5 is a block diagram showing the functional arrangement of the business telephone hub apparatus 4. The difference between the arrangements of this business telephone hub apparatus 4, and the analog telephone hub apparatuses 3-1 and 3-2 lies in that it comprises a business telephone interface (I/F) 4*b*, business telephone protocol processor 4*e*, and business telephone/network protocol converter 4*c* in place of the analog telephone interface (I/F) 3*b*, analog telephone protocol processor 3*e*, and analog telephone/network protocol converter 3*c*.

The business telephone I/F 4*b* exchanges audio data signals with the business telephones DKT1 and DKT2. The business telephone protocol processor 4*e* controls digital telephone communications in accordance with a communication protocol defined with the business telephones DKT1 and DKT2. The business telephone/network protocol converter 4*c* performs protocol conversion between the network protocol and business telephone protocol.

The ISDN router apparatus 5 and PSTN router apparatus 6 provided to the system as outside-line communication interface apparatuses have the following arrangements.

Figure 6:
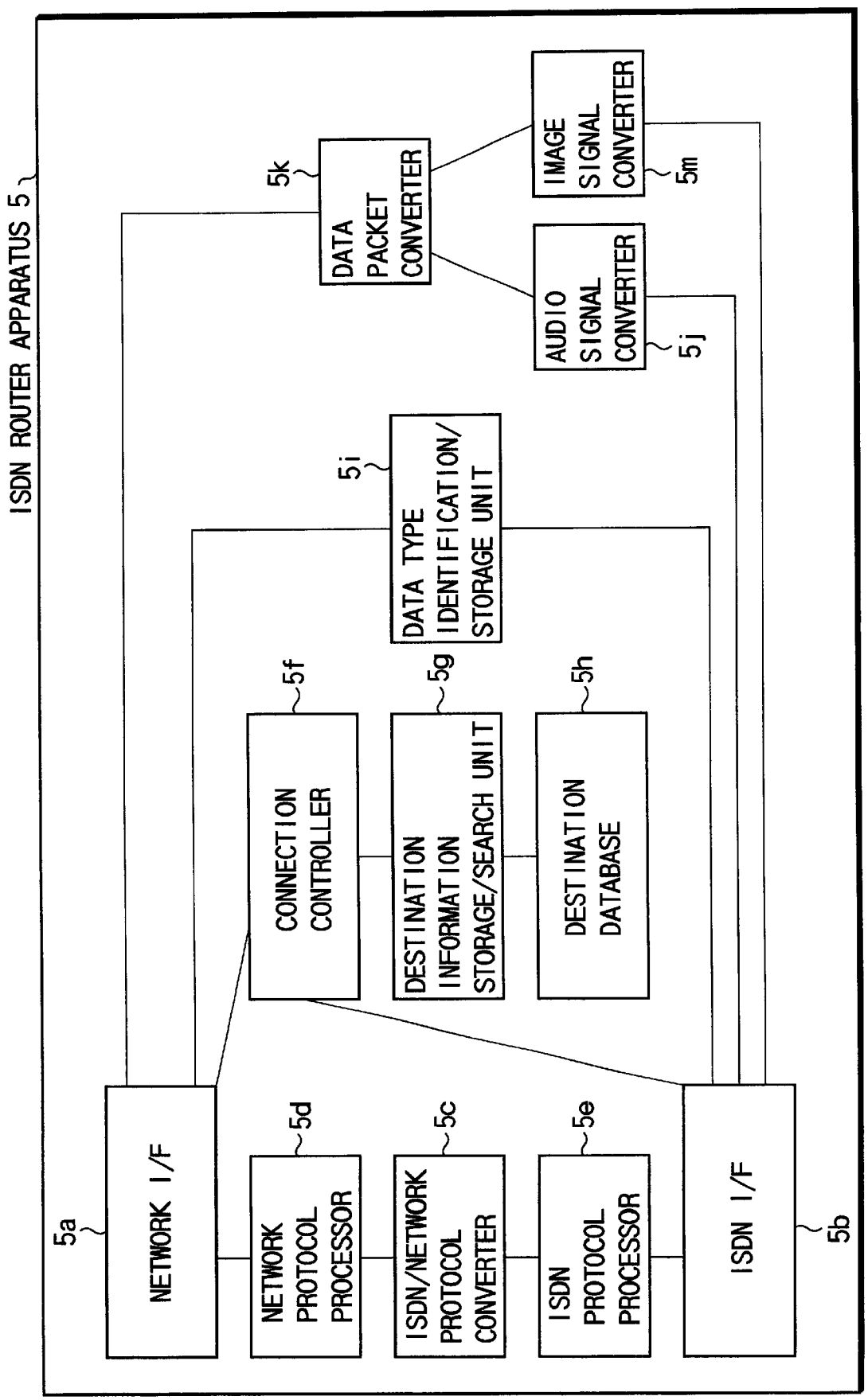
FIG. 6 is a block diagram showing the functional arrangement of an ISDN router apparatus 5.

FIG. 6 is a block diagram showing the functional arrangement of the ISDN router apparatus 5. This ISDN telephone hub apparatus 5 is different from the arrangement of the analog telephone hub apparatuses 3-1 and 3-2 in that it comprises an ISDN interface (I/F) 5*b*, ISDN protocol processor 5*e*, and ISDN/network protocol converter 5*c*.

The ISDN I/F 5*b* exchanges data signals with the ISDN. The ISDN protocol processor 5*e* controls digital telephone communications in accordance with a communication protocol defined with the ISDN. The ISDN/network protocol converter 5*c* performs protocol conversion between the network protocol and business telephone protocol.

Figure 7:
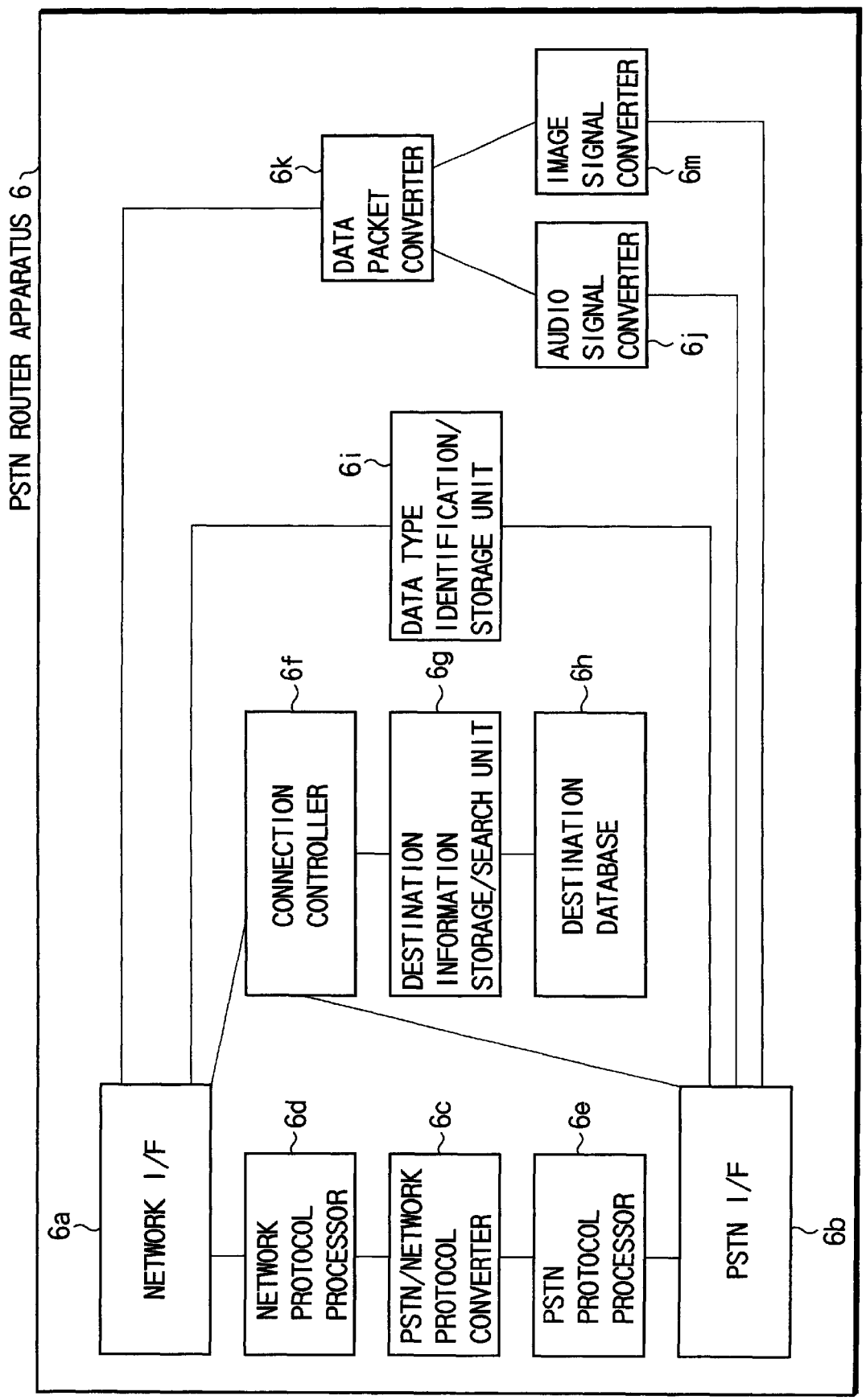
FIG. 7 is a block diagram showing the functional arrangement of a PSTN router apparatus 6.

FIG. 7 is a block diagram showing the functional arrangement of the PSTN router apparatus 6. The difference between the arrangements of this PSTN router apparatus 6 and the ISDN router apparatus 5 lies in that it comprises a PSTN interface (I/F) 6*b*, PSTN protocol processor 6*e*, and PSTN/network protocol converter 6*c* in place of the ISDN interface (I/F) 5*b*, ISDN protocol processor 5*e*, and ISDN/network protocol converter 5*c*.

The PSTN I/F 6*b* exchanges data signals with the PSTN. The PSTN protocol processor 6*e* controls digital telephone communications in accordance with a communication protocol defined with the PSTN. The PSTN/network protocol converter 6*c* performs protocol conversion between the network protocol and ISDN protocol.

Various communication processes of the system with the above-mentioned arrangement will be explained below using sequence charts.

(1) When extension-to-extension communication is made between radio terminal PS and analog telephone TEL1

Figure 8:
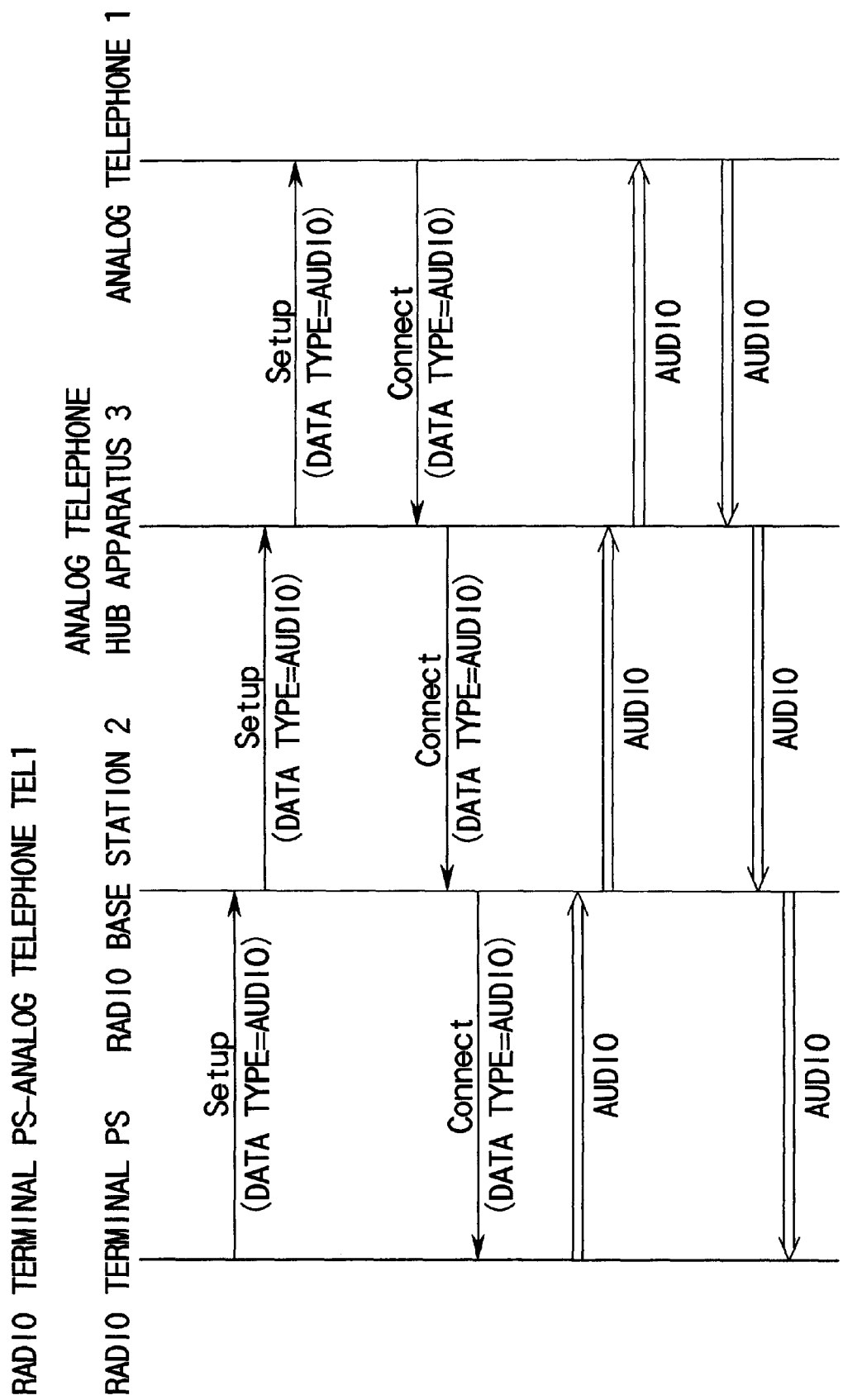
FIG. 8 is a sequence chart upon extension-to-extension communication between a radio terminal PS and analog telephone TEL1.

FIG. 8 shows the sequence. Upon reception of a setup message from the radio terminal PS, the radio base station 2 checks if destination information contained in the setup message indicates the network address itself. If the destination information does not indicate the network address, the destination information storage/search unit 2*g* accesses the destination database 2*h* in accordance with an instruction from the connection controller 2*f* to retrieve a network address corresponding to the destination address contained in the setup message from the destination database 2*h*. The data type identification/storage unit 2*i* checks if the data type in the setup message indicates audio or data, and stores the result.

The radio/network protocol converter 2*c* reassembles a setup message complying with the network protocol on the basis of the received setup message and the retrieved destination network address, and transmits the reassembled setup message onto the LAN 1 from the network I/F 2*a* toward the terminating analog telephone hub apparatus 3-1 under the control of the network protocol processor 2*d*.

Upon receiving the setup message addressed to the own apparatus via the LAN 1, the analog telephone hub apparatus 3-1 identifies the terminating analog telephone TEL1 from the received setup message. The analog telephone/network protocol converter 3*c*reassembles a setup message complying with the communication protocol for the analog telephone, and transmits the reassembled setup message from the analog telephone I/F 3*b* to the terminating analog telephone TEL1 under the control of the analog telephone protocol processor 3*e*. When the user goes off-hook to answer the received setup message, the analog telephone TEL1 sends back a connect message.

When the analog telephone hub apparatus 3-1 has received the connect message sent back from the terminating analog telephone TEL1, the analog telephone/network protocol converter 3*c* reassembles a connect message complying with the network protocol, and outputs this connect message onto the LAN 1 toward the originating radio base station 2.

When the radio base station 2 has received this connect message via the network I/F 2a, the data type identification/storage unit 2i identifies if the data type in this connect message indicates audio or data, and stores the result. The radio/network protocol converter 2c reassembles a connect message complying with the radio protocol on the basis of the received connect message, and outputs the reassembled connect message from the radio unit 2b toward the radio terminal PS under the control of the radio protocol processor 2e.

In this manner, a communication link via the LAN 1 is formed between the originating radio terminal PS and terminating analog telephone TEL1, and these terminals proceed to make an extension-to-extension call as follows.

More specifically, upon reception of audio data from the radio terminal PS, the radio base station 2 recognizes with reference to the data type identification/storage unit 2i if the data type is audio. The radio base station 2 sends the received audio data to the audio signal converter 2j on the basis of the recognition result to convert the audio data, then packetizes the converted data by the data packet converter 22k, and transmits that audio packet from the network I/F 2a onto the LAN 1.

By contrast, upon receiving an audio packet from the analog telephone hub apparatus 3-1 via the LAN 1, the radio base station 2 confirms with reference to the data type identification/storage unit 2j if the received audio packet contains audio data, reconstructs a datastream from the received audio packet using the packet converter 2k, and converts the datastream into a signal format suitable for the radio terminal by the audio signal converter 2j. Then, the audio data is transmitted from the radio unit 2b toward the radio terminal PS.

Note that the analog telephone hub apparatus 3-1 performs the same audio data conversion as in the radio base station 2. More specifically, an audio packet received from the LAN 1 is converted into an analog audio signal corresponding to the analog telephone TEL1 by a data packet converter 3k and audio signal converter 3j, and the analog audio signal is then sent from the analog telephone I/F 3b to the analog telephone TEl1. On the other hand, an audio signal sent from the analog telephone TEL1 is converted into a digital signal by the audio signal converter 3j, and is packetized by the data packet converter 3k to form an audio packet. The audio packet is transmitted onto the LAN 1 from the network I/F 3a toward the radio base station 2.

(2) When extension-to-extension communication is made between analog telephones

Figure 10:
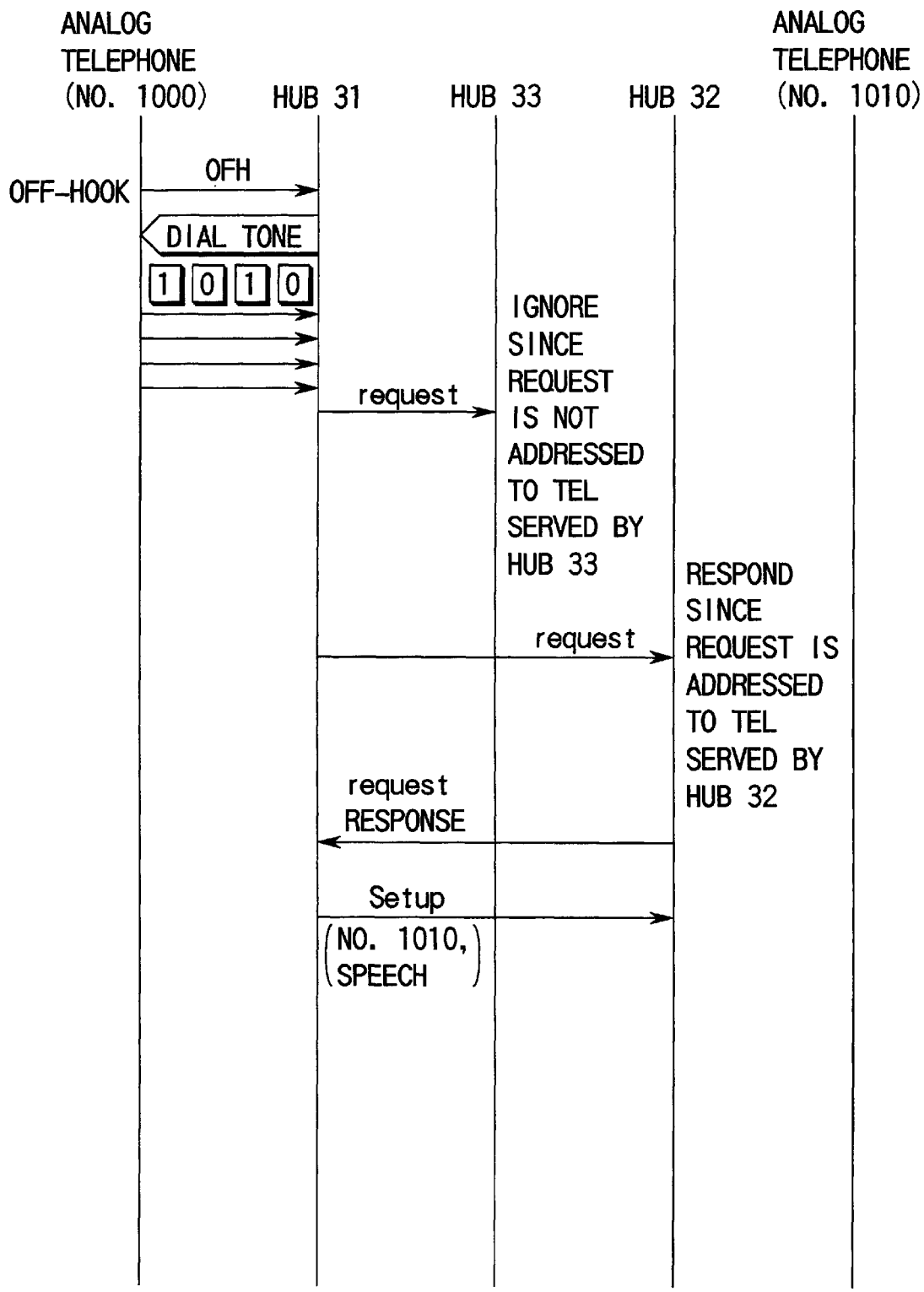
FIG. 10 is a sequence chart showing the second example upon extension-to-extension communication between analog telephones.
Figure 11:
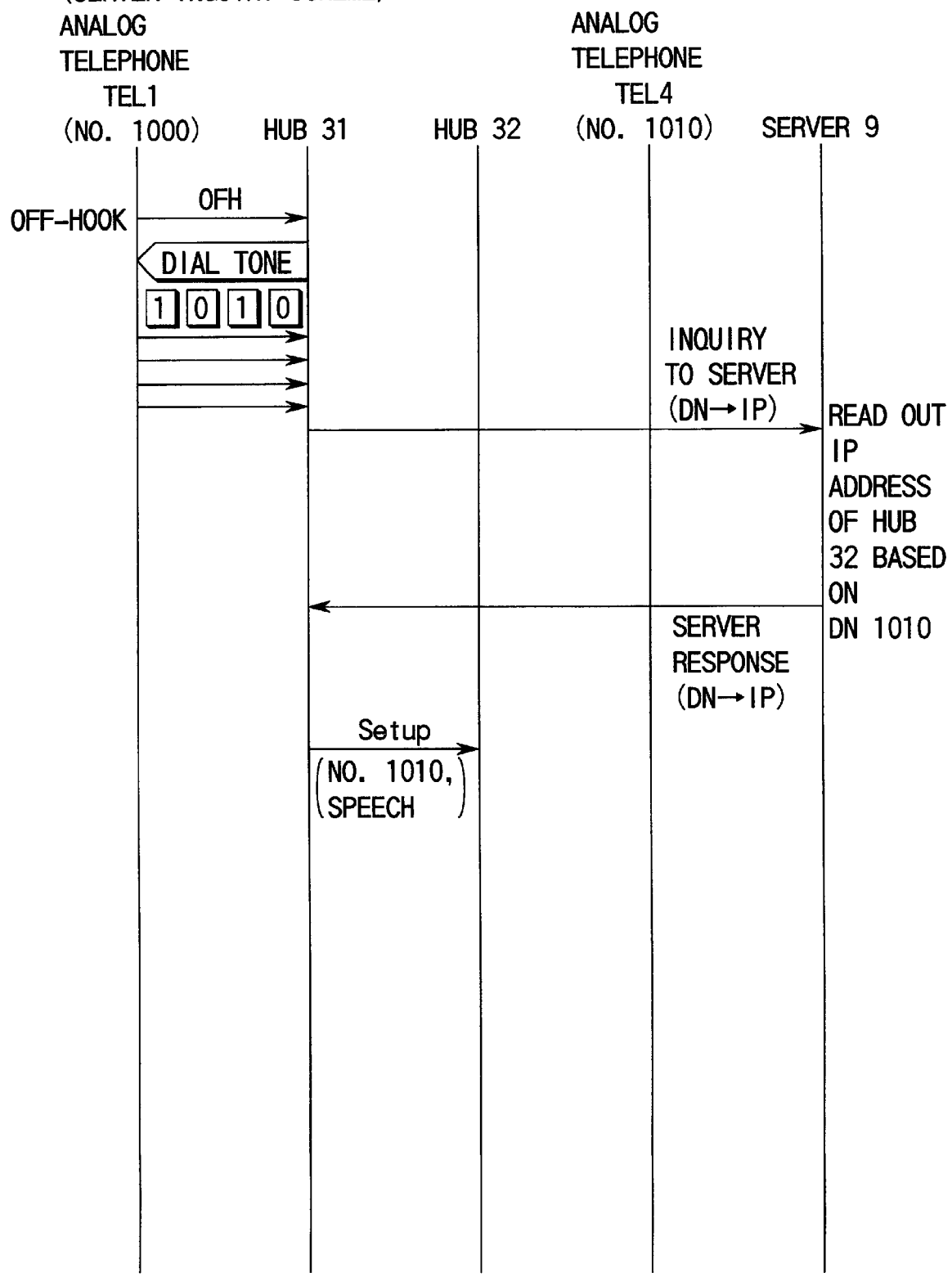
FIG. 11 is a sequence chart showing the third example upon extension-to-extension communication between analog telephones.

FIGS. 9, 10, and 11 show that sequence. A case will be exemplified below wherein the analog telephone TEL1 assigned dial No. 1000 places a call to the analog telephone TEL4 assigned dial No. 1010.

Assume that the user lifts the handset of the analog telephone TEL1, and dial-inputs dial No. "1010" of the communication partner after he or she has confirmed a dial tone. In response to this operation, the analog telephone hub apparatus 3-1 makes dial analysis of a call terminating apparatus upon receiving all the digits of the dial number from the analog telephone TEL1, and acquires the IP address of the terminating hub apparatus. This dial analysis is done by searching a telephone number versus hub apparatus IP address conversion table stored in a destination database 3h. As a result of this search, if the IP address of the hub apparatus corresponding to the dial number of the terminating apparatus is successfully acquired, a setup message is generated, and is sent onto the LAN 1 toward the terminating hub apparatus.

By contrast, if the IP address of the hub apparatus corresponding to the dial number of the terminating apparatus is not stored in the destination database 3h, the analog telephone hub apparatus 3-1 inquires of the communication server 9. FIG. 11 shows the inquiry sequence. Upon reception of the above-mentioned inquiry message, the server 9 accesses a conversion table using DN "1010" contained in the inquiry message as a key to search for the IP address of the corresponding hub apparatus. If the IP address is found, that IP address is sent to the analog telephone hub apparatus 3-1 as an inquiry source using a response message. Upon reception of this IP address message, the analog telephone hub apparatus 3-1 generates a setup message, and transmits it onto the LAN 1 toward the terminating analog telephone hub apparatus 3-2.

On the other hand, assume that no IP address corresponding to that inquiry is stored in the conversion table of the server 9, and a response message indicating this is sent back to the analog telephone hub apparatus 3-1 as an inquiry source. In this case, the analog telephone hub apparatus 3-1 issues a multi-address request to all the hub apparatuses connected to the LAN 1. FIG. 10 shows the sequence in such case.

More specifically, the analog telephone hub apparatus 3-1 generates a request message and sends it onto the LAN 1. Upon reception of the request message via the LAN 1, all the hub apparatuses connected to the LAN 1 search their destination databases 3h to check if a communication terminal corresponding to DN "1010" contained in that request message is served by the own apparatus. If a given hub apparatus determines that it serves the communication terminal in question, it sends a request response message indicating this to the analog telephone hub apparatus 3-1 as a request source. If it is determined that the own apparatus does not serve the communication terminal corresponding to requested DN "1010", no response message is sent back.

If the request response message is sent back from one of the hub apparatuses (e.g., the analog telephone hub apparatus 3-2) in response to the request, the analog telephone hub apparatus 3-1 transmits a setup message toward the terminating analog telephone hub apparatus 3-2 using as a destination address the IP address contained in that request response message.

If no request response message is sent back from any of the hub apparatuses within a predetermined period of time, the analog telephone hub apparatus 3-1 determines a dial error of the originating analog telephone, and disconnects a DC loop with the analog telephone TEL1. Note that a message indicating a connection failure such as a message indicating a dial error or the like may be sent to the originating analog telephone and may be visibly or audibly output.

Upon receiving the setup message addressed to the own apparatus, the analog telephone hub apparatus 3-2 on the terminating side sends back a call setup acceptance (call proc) to the analog telephone hub apparatus 3-1 on the originating side, and analyzes the received setup message. At this time, in a protocol defined in H323, the setup message contains a call setup, call number "1010", and transmission performance: data type="audio". The analog telephone hub apparatus 3-2 determines the terminating analog telephone TEL4 and data type from such information. Based on the determination result, a call termination signal is output to the terminating analog telephone TEL4 to signal reception of an incoming call. At this time, a ringer signal (Alert) is output to the originating analog telephone hub apparatus 3-1. Upon receiving the ringer signal, the analog telephone hub apparatus 3-1 generates a ring back tone RBT and outputs it to the originating analog telephone TEL1.

In this state, assume that the user of the terminating analog telephone TEL4 goes off-hook to answer the call. Then, the analog telephone hub apparatus 3-2 outputs a connection message (connect message; Conn) to the originating analog telephone hub apparatus 3-1. Upon receiving the connect message, the originating analog telephone hub apparatus 3-1 sends back a connection confirmation message (connect acknowledgement message; Conn Ack), and stops the ring back tone.

In this way, a voice communication connection is established on the LAN 1, and a voice communication can be made between the originating analog telephone TEL1 and the terminating analog telephone TEL4 via a communication link based on this voice connection.

During the voice communication, the analog telephone hub apparatuses 3-1 and 3-2 convert audio data. More specifically, an audio packet received from the LAN 1 is converted into an analog audio signal corresponding to the analog telephone TEL1 by the packet converter 3k and audio signal converter 3j, and the converted analog audio signal is sent to the analog telephone TEL1 or TEL4 via the analog telephone I/F 3b. An audio signal sent from the analog telephone TEL1 or TEL4 is converted into a digital signal by the audio signal converter 3j and is converted into an audio packet by the packet converter 3k, and the audio packet is transmitted from the network I/F 3a onto the LAN 1.

Assume that the voice communication has ended, and the user of, e.g., the analog telephone TEL4 goes on-hook. The analog telephone hub apparatus 3-2 generates a disconnection message (Disc) and sends it onto the LAN 1 toward the analog telephone hub apparatus 3-1 on the communication partner side. Upon receiving the disconnection message, the analog telephone hub apparatus 3-1 stops transmission/reception of an audio packet on the LAN 1 and releases the voice connection. Then, the apparatus 3-1 sends a release message (Rel) to the analog telephone hub apparatus 3-2 on the other end of the line, and outputs a busy tone to the analog telephone TEL1. In this state, when the apparatus 3-1 receives a release acknowledgement message (Rel Comp) from the analog telephone hub apparatus 3-2 on the other end of the line, the apparatus 3-1 stops output of the busy tone and returns to a standby state.

Figure 12:
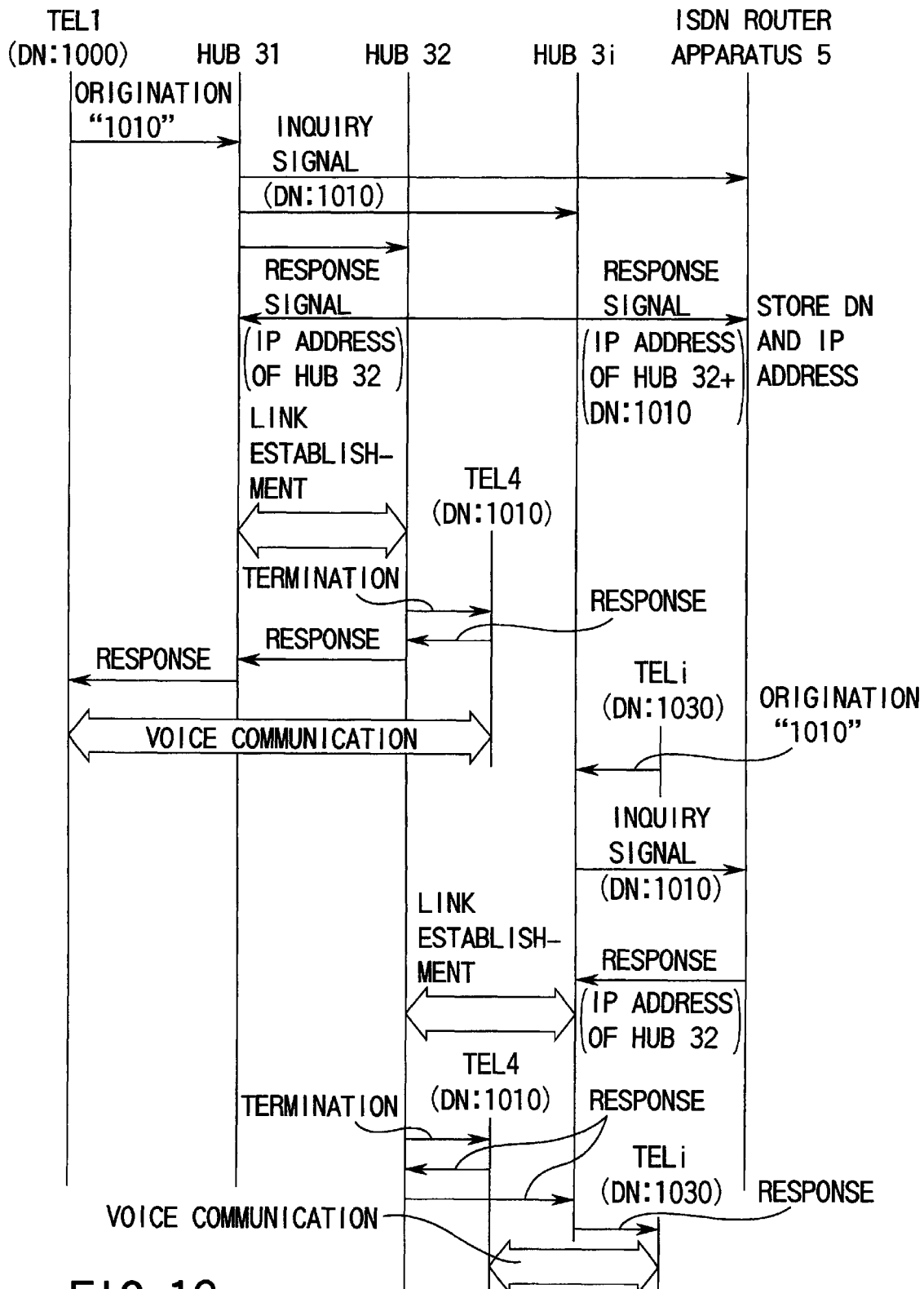
FIG. 12 is an operation sequence chart upon connecting extension terminals by inquiring of the router apparatus 5 as to an IP address.

Note that the router apparatus 5 may be inquired of as to the IP address. FIG. 12 shows the operation sequence in such case.

The router apparatus 5 stores an IP address in its own destination database 5h together with the DN of the terminating terminal apparatus every time each hub apparatus in the system acquires an IP address using a multi-address request. More specifically, when a given hub apparatus in the system multi-address transmits a request message of an IP address, and another hub apparatus sends back a request response message to this request, the router apparatus 5 also receives this request response message. The apparatus 5 extracts the DN of the terminating terminal apparatus and the IP address of the hub apparatus that serves the terminal apparatus of interest, and stores them in its own destination database 5h in correspondence with each other. Hence, the contents of the destination database 5h of the router apparatus 5 grow rich as IP addresses are acquired using multi-address requests by the hub apparatuses in the system.

Assume that the user of, e.g., a telephone TELi connected to a hub apparatus 3i (not shown) places a call to the telephone TEL4. The hub apparatus 3i generates a request message containing DN "1010" of the terminating telephone TEL4, and outputs it toward the router apparatus 5.

Upon receiving the request message, the router apparatus 5 reads out the IP address of a hub apparatus that serves the communication terminal corresponding to DN "1010" contained in this request message from the destination database 5h using that DN as a key. The apparatus 5 inserts the readout IP address in a request response message, and sends the message to the hub apparatus 3i that is the request source.

Upon receiving the request response message, the hub apparatus 3i transmits a setup message including as a destination address the IP address informed by the received message toward the terminating analog telephone hub apparatus 3-2. The hub apparatus 3-2 on the terminating side analyzes this setup message, and outputs a call termination signal to the terminating telephone TEL4 to signal reception of an incoming call. Also, the apparatus 3-2 outputs a ringer signal to the originating hub apparatus 3i to generate a ring back tone(RBT) from the originating telephone TELi. When the user of the terminating telephone TEL4 answers the call, both the telephones TELi and TEL4 are ready for the users to talk.

Note that the IP address acquisition/storage function using the multi-address request of the hub apparatus may be provided to all or some of the hub apparatuses 3-1, 3-2, 3-i, . . . in place of the router apparatus 5. In a system in which the hub apparatuses 3-1, 3-2, 3-i, . . . have such function, when a terminal apparatus served by the own apparatus places a call, each of the hub apparatuses 3-1, 3-2, 3-i, . . . searches its own destination database 3h to check if the IP address of the terminating hub apparatus is stored. If the IP address is stored, the originating hub apparatus outputs a setup message to the terminating hub apparatus using the stored address as a destination address. By contrast, if the IP address is not stored, 5 the originating hub apparatus inquires of the communication server 9 or router apparatus 5 about the IP address. With this process, the time required for acquiring the IP address can be shortened, and an increase in traffic on the LAN 1 can be suppressed.

Figure 13:
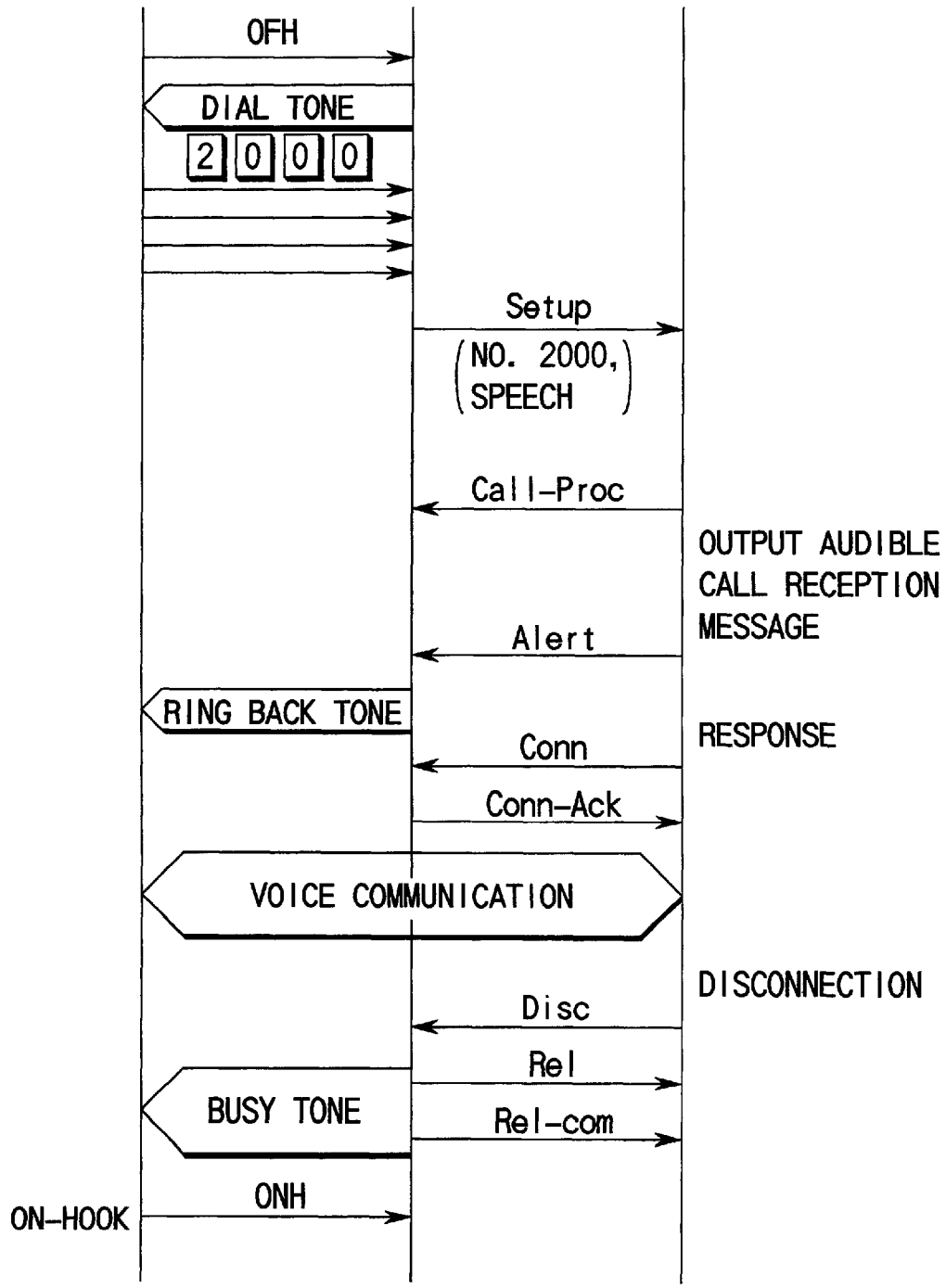
FIG. 13 is a sequence chart upon extension-to-extension voice communication between an analog telephone and personal computer.

(3) When extension-to-extension voice communication is made between analog telephone and personal computer FIG. 13 shows the sequence. A case will be exemplified below wherein the user of the analog telephone TEL1 assigned dial number 1000 places a call to the personal computer PC1 assigned dial number 2000.

Assume that the user of the analog telephone TEL1 lifts its handset and dial-inputs dial number "2000" of the communication partner after he or she has confirmed a dial tone. The analog telephone hub apparatus 3-1 performs dial analysis of the terminating apparatus to acquire the IP address of the terminating hub apparatus after it has received all the digits of the dial number from the analog telephone TEL1. Note that the IP address is acquired by the same scheme as that. described in (2) when an extension-to-extension communication is made between analog telephones.

After the IP address of the terminating personal computer PC1 is acquired, the analog telephone hub apparatus 3-1 generates a setup message and transmits it toward the terminating personal computer PS1. This setup message is received by the personal computer PC1 via the hub apparatus 70. Upon receiving the setup message, the personal computer PC1 sends back a call setup acceptance (call proc) to the originating hub telephone hub apparatus 3-1, determines based on the received setup message if the data type is audio, and stores the result. If the data type is audio, the personal computer PC1 audibly outputs a call reception message to inform the user of reception of an incoming call. At the same time, the personal computer PC1 outputs a ringer signal (Alert) to the originating analog telephone hub apparatus 3-1.

Upon receiving the ringer signal, the originating analog telephone hub apparatus 3-1 generates a ring back tone RBT and outputs it to the originating analog telephone TEL1. In this state, assume that the user of the terminating personal computer PC1 makes operation corresponding to off-hook to answer the call. Then, the personal computer PC1 outputs a connection message (connect message; Conn) to the originating analog telephone hub apparatus 3-1. Upon receiving the connect message, the originating analog telephone hub apparatus 3-1 sends back a connection confirmation message (connect acknowledgement message; Conn Ack) and stops the ring back tone.

In this way, a voice communication connection is established on the LAN 1, and the users of the originating analog telephone TEL1 and the terminating personal computer PC1 can talk via the communication link based on this voice communication connection.

During this voice communication, audio data conversion between the LAN 1 and analog telephone TEL1 is made by the analog telephone hub apparatus 3-1, but that between the LAN 1 and the audio system of the personal computer PC1 is made inside the personal computer PC1. That is, the hub apparatus 70 for the personal computer only interfaces between the personal computer PC1 and LAN 1.

Figure 14:
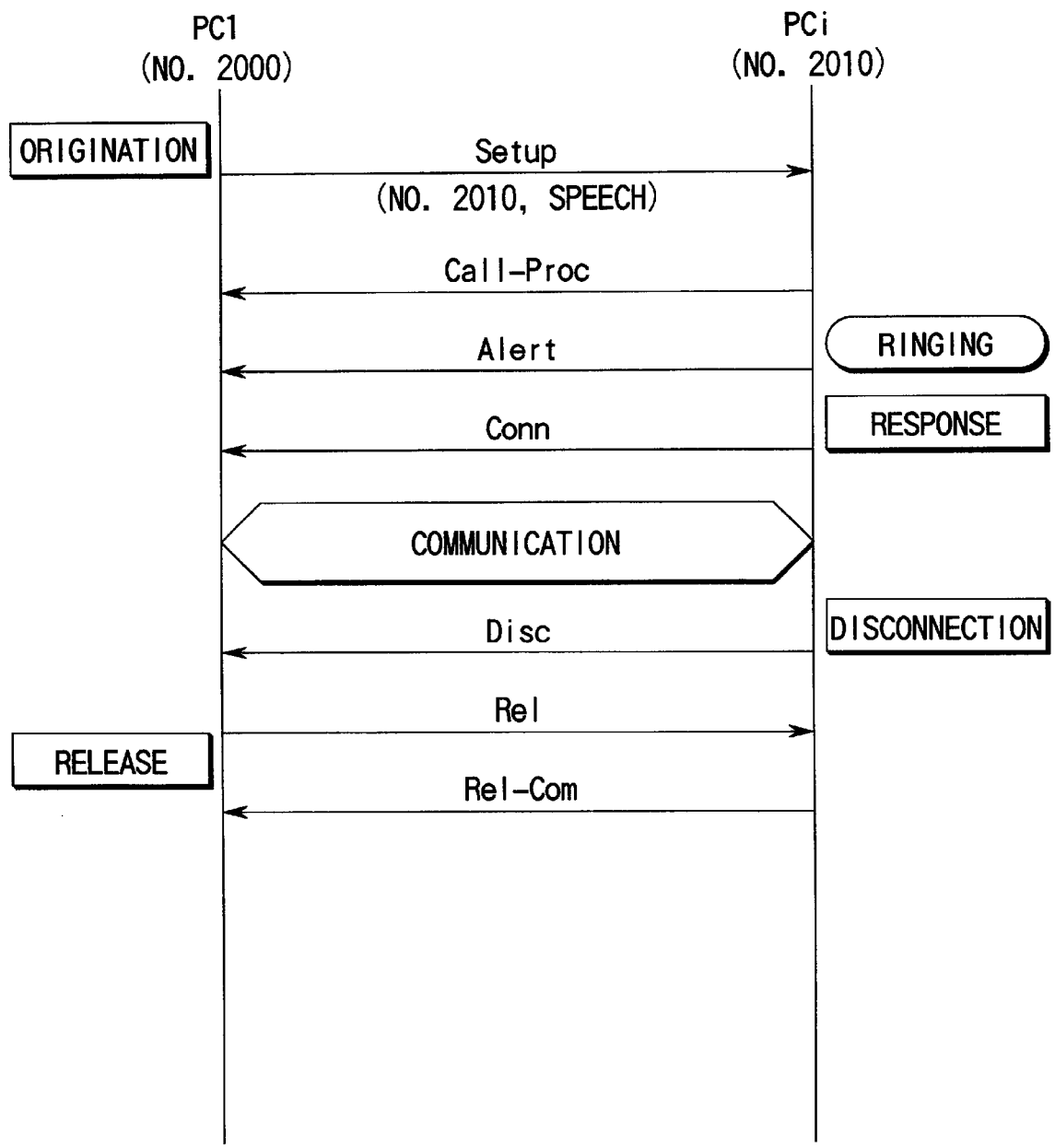
FIG. 14 is a sequence chart upon extension-to-extension voice communication between personal computers.

(4) When extension-to-extension voice communication is made between personal computers FIG. 14 shows the sequence. A case will be exemplified below wherein the user of the personal computer PC1 assigned dial number 2000 places a call to another personal computer PCi (not shown) assigned dial number 2010.

When the user inputs a call originating instruction to dial number 2010 at the personal computer PC1, the personal computer PC1 makes dial analysis to acquire the IP address of the terminating hub apparatus. Note that the IP address is acquired by the same scheme as that described in (2) when an extension-to-extension communication is made between analog telephones.

After the IP address of the terminating hub apparatus is acquired, the personal computer PC1 generates a setup message and transmits it onto the LAN 1 toward the terminating personal computer PCi. This setup message is received by a hub apparatus to which the terminating personal computer PCi is connected via the LAN 1, and is transferred from the hub apparatus PCi to the personal computer PCi.

Upon receiving the setup message, the personal computer PCi sends back a call setup acceptance (cal proc) to the personal computer PC1 on the originating side, and checks based on the received setup message if the data type indicates audio and stores the result. If the data type indicates audio, a ringing tone is generated to inform the user of the presence of an incoming call. At the same time, a ringer signal (Alert) is output to the originating personal computer PC1.

In this state, assume that the user of the terminating personal computer PCi makes operation corresponding to off-hook to answer the call. The personal computer PCi then outputs a connection message (connect message; Conn) to the originating personal computer PC1.

In this manner, a voice communication connection is established on the LAN 1, and after that, the users of the originating personal computer PC1 and terminating personal computer PCi can talk via a communication link based on this voice communication connection.

During this voice communication, audio data conversion between the LAN 1 and the personal computers PC1 and PCi is respectively made inside the personal computers PC1 and PCi.

Figure 15:
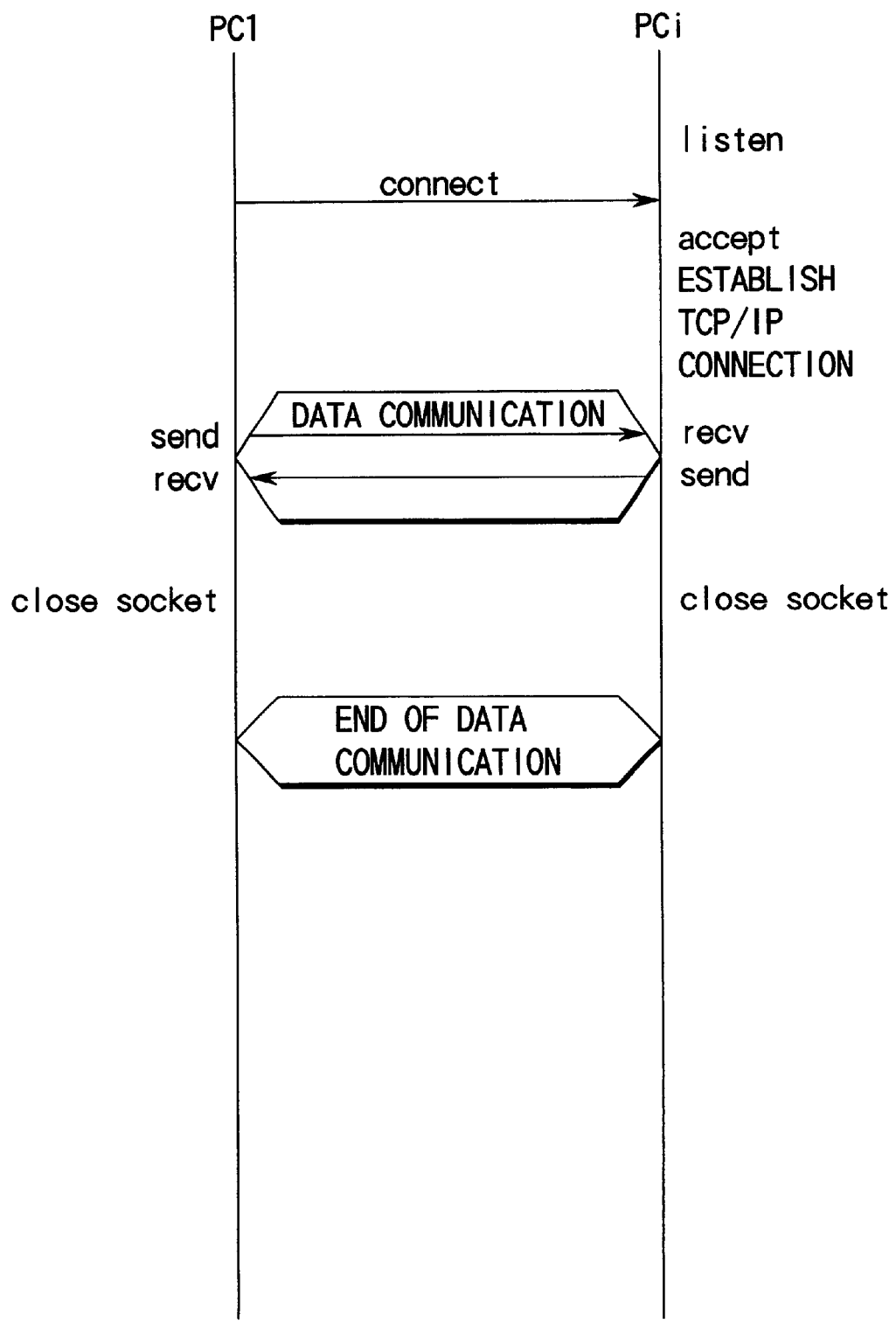
FIG. 15 is a sequence chart upon extension-to-extension data communication between personal computers.

(5) When extension-to-extension data communication is made between personal computers FIG. 15 shows the sequence. The personal computer PC1 on the originating side acquires the IP address assigned to a hub apparatus on the terminating side, and then transmits a connect message onto the LAN 1 toward the terminating personal computer PCi. After transmission of the connect message, the personal computers PC1 and PCi perform processing for establishing a TCP/IP connection. After the connection has been established by that processing, the personal computers PC1 and PCi are ready to make a data communication therebetween.

(6) When voice communication is made between outside-line data terminal and extension analog telephone (if outside-line data terminal can interpret IP address in LAN 1)

Figure 16:
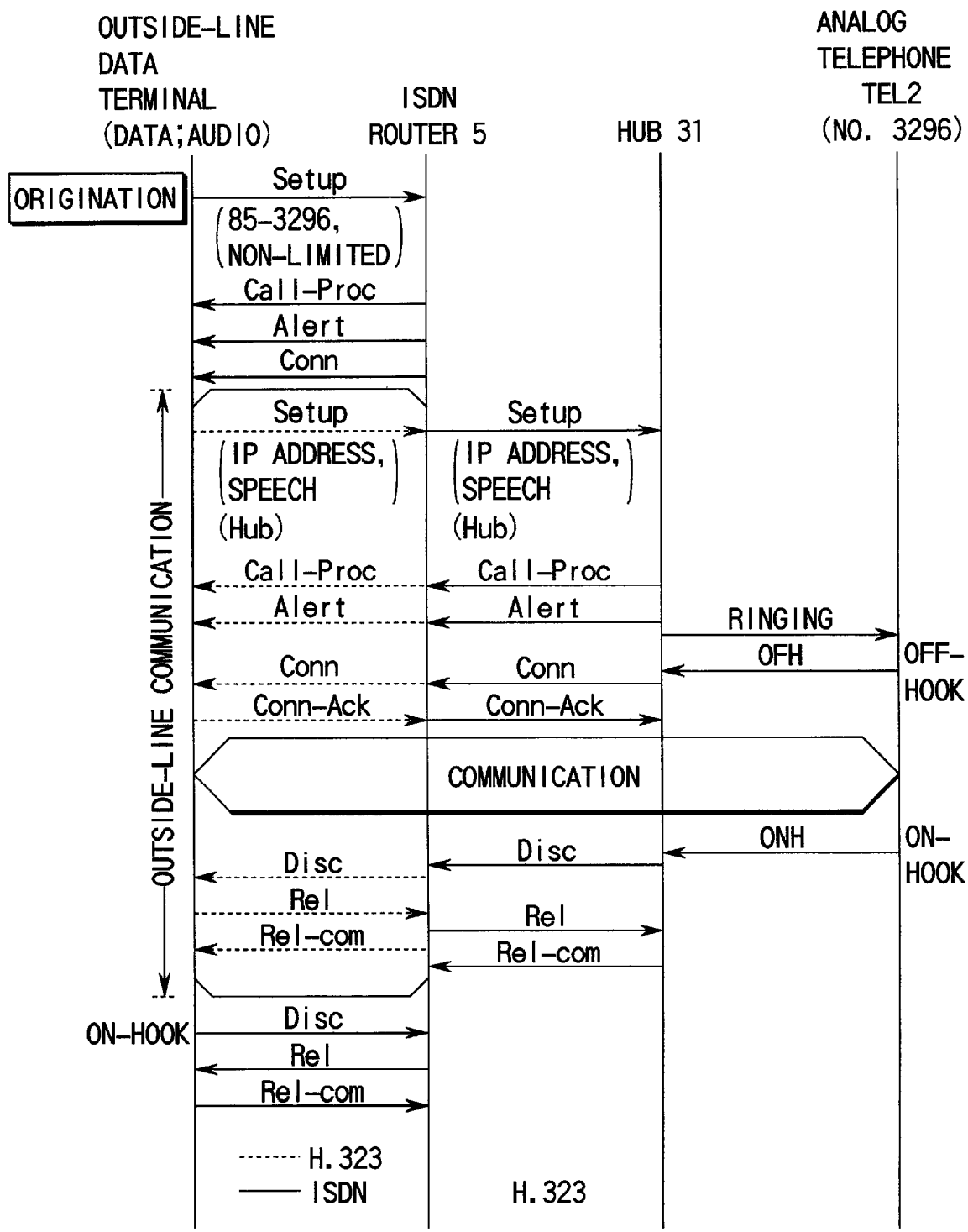
FIG. 16 is a sequence chart showing the first example upon voice communication between an outside-line data terminal and an extension analog telephone.

FIG. 16 shows the sequence. A case will be exemplified below wherein an outside-line data terminal (personal computer) connected to the ISDN 7 calls the analog telephone TEL2 assigned dial number "85-3296" to make a voice communication.

The outside-line data terminal transmits a setup message inserted with termination number "85-3296" and data type= non-limited to the ISDN router apparatus 5 via the ISDN 7. Then, the ISDN router apparatus 5 sends back a call setup acceptance (call proc) to the outside-line data terminal on the originating side in accordance with the ISDN protocol, and analyzes the received setup message to sequentially output a ringer signal (Alert) and connection message (connect message; Conn) to the originating outside-line data terminal on the basis of the analysis result. In this manner, a communication connection according to the ISDN protocol is established between the outside-line data terminal and ISDN router apparatus 5.

After the ISDN communication connection has been established in this way, the originating outside-line data terminal generates in turn a setup message including the IP address assigned from the system to the terminating analog hub apparatus 3-1, and data type=audio, and transmits it toward the ISDN router apparatus 5 in accordance with the protocol (H.323) of the LAN 1. Upon receiving the setup message, the ISDN router apparatus 5 directly outputs it onto the LAN 1 toward the terminating analog telephone hub apparatus 3-1.

Upon receiving the setup message addressed to the own apparatus, the analog telephone hub apparatus 3-1 on the terminating side sends back a call setup acceptance (call proc) toward the outside-line data terminal on the originating side, and analyzes the received setup message. The apparatus 3-1 sends back a call termination signal to the terminating analog telephone TEL2 on the basis of the analysis result to make it to signal reception of an incoming call. At that time, the apparatus 3-1 outputs a ringer signal (Alert) to the originating outside-line data terminal via the ISDN router apparatus 5.

In this state, assume that the user of the terminating analog telephone TEL2 goes off-hook to answer the call. Then, the analog telephone hub apparatus 3-1 outputs a connection message (connect message; Conn) to the originating outside-line data terminal via the ISDN router apparatus 5. Upon receiving the connect message, the originating outside-line data terminal sends back a connection confirmation message (connect acknowledgement message; Conn Ack).

In this way, a communication connection according to the protocol (H.323) of the LAN 1 is established between the outside-line data terminal and the terminating analog telephone TEL2, and the users of the originating outside-line data terminal and terminating analog telephone TEL2 can talk via a communication link based on that communication connection.

Note that in a disconnection procedure after the end of the voice communication, the communication connection according to the protocol (H.323) of the LAN 1 is released, and after that, the communication connection according to the ISDN protocol is released in the order opposite to the above-mentioned setup procedure of the communication link.

Figure 17:
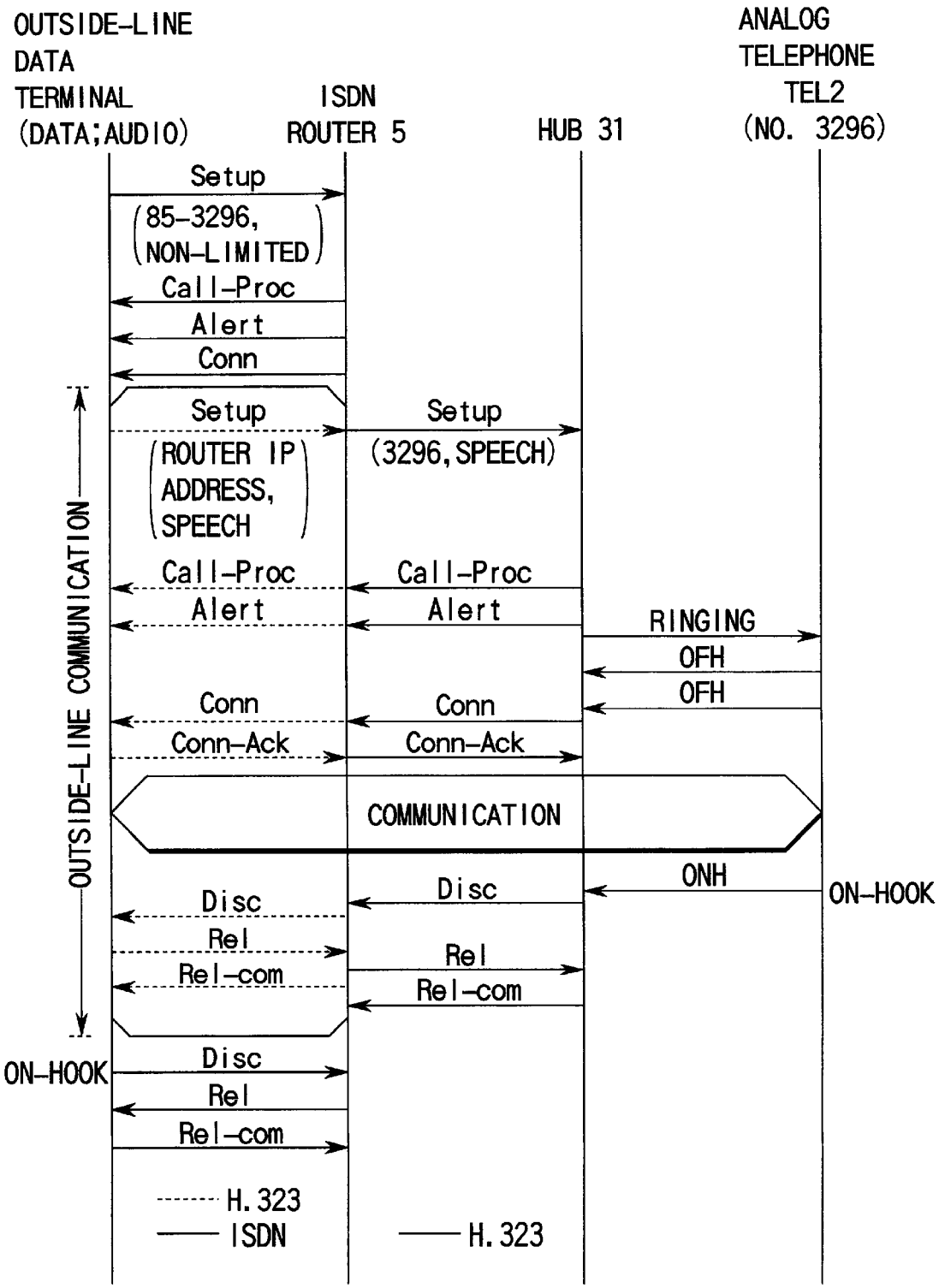
FIG. 17 is a sequence chart showing the second example upon voice communication between an outside-line data terminal and an extension analog telephone.

(7) When voice communication is made between outside-line data terminal and extension analog telephone (if outside-line data terminal can interpret only global IP address of ISDN router apparatus 5) FIG. 17 shows the sequence. Referring to FIG. 17, the originating outside-line data terminal transmits a setup message containing the IP address of the router to the ISDN router apparatus 5 according to the protocol (H.323) of the LAN 1 while a communication connection according to the ISDN protocol is established between itself and the ISDN router apparatus 5.

Upon receiving this setup message, the ISDN router apparatus 5 acquires the IP address of the terminating analog telephone hub apparatus 3-1 by searching its own database 5h, and transmits a setup message onto the LAN 1 toward the analog telephone hub apparatus 3-1 using the acquired IP address. At this time, extension dial number "3296" of the terminating analog telephone TEL2 and data type are inserted in that setup message.

Note that the procedure to be executed between the external data terminal and terminating analog telephone TEL2 are the same as that described previously with reference to FIG. 16.

Figure 18:
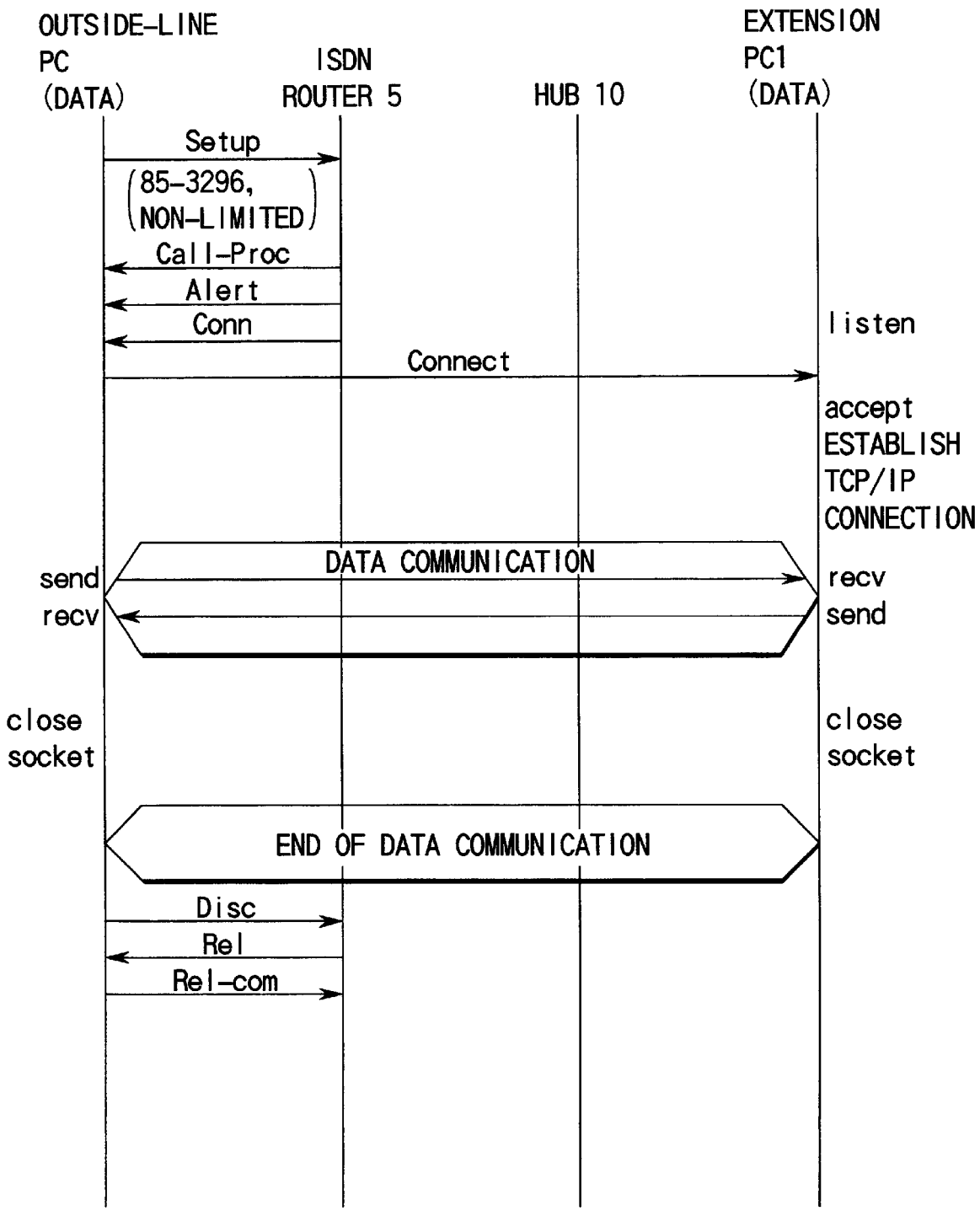
FIG. 18 is a sequence chart upon data communication between an outside-line data terminal and an extension data terminal.

(8) When data communication is made between outside-line data terminal and extension data terminal FIG. 18 shows the sequence. Referring to FIG. 18, a procedure for establishing an ISDN communication connection is executed between the originating external data terminal and the ISDN router apparatus 5. After the ISDN communication connection has been established, the external data terminal transmits a connect message to an extension data terminal. Upon transmission of this connect message, the originating external data terminal and terminating internal data terminal perform processing for establishing a TCP/IP connection. After a communication connection according to the protocol of the LAN 1 has been established between the originating external data terminal and terminating internal data terminal, they can make a data communication.

Figure 19:
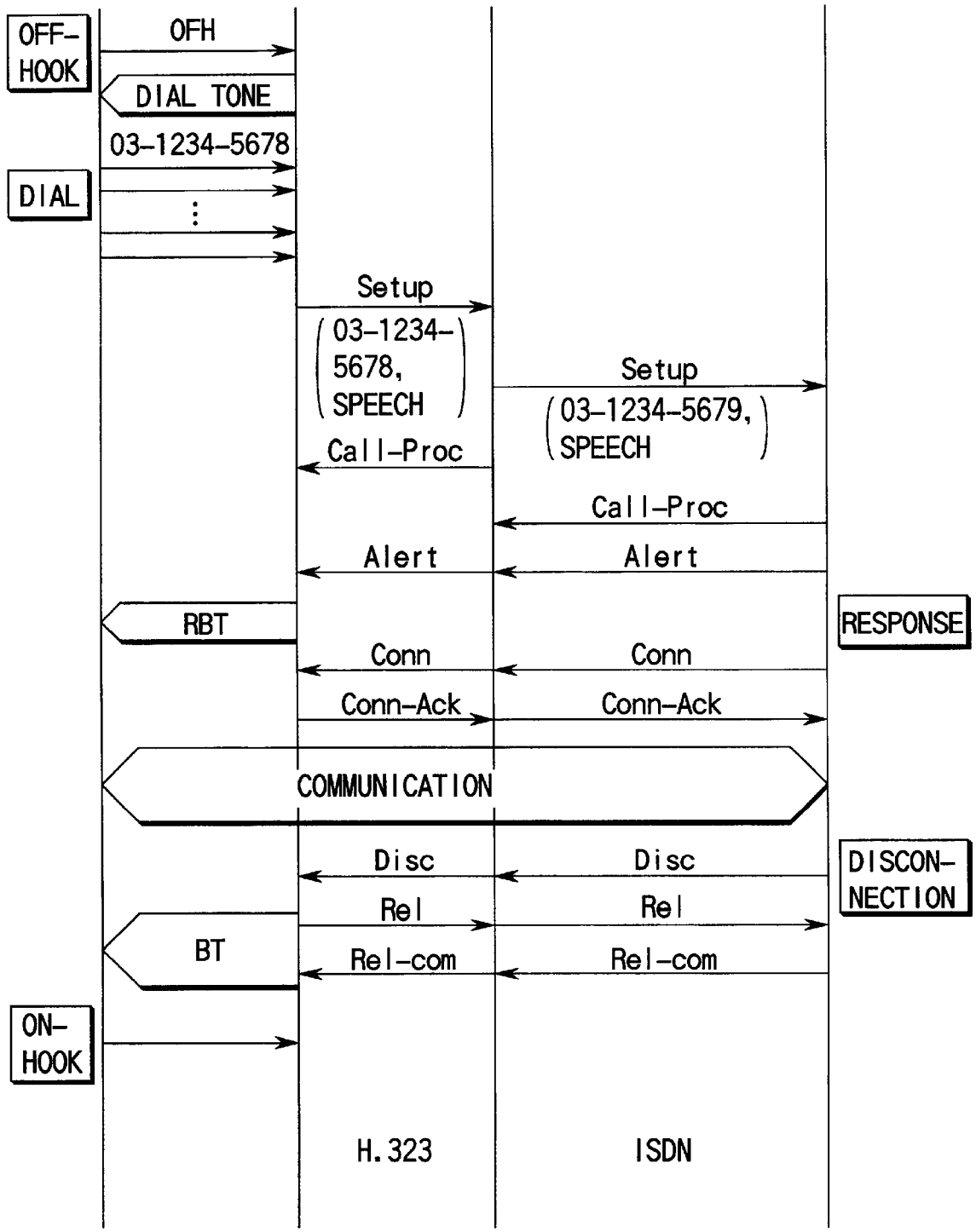
FIG. 19 is a sequence chart upon voice communication between an analog telephone and an external telephone.

(9) When voice communication is made between analog telephone and external telephone FIG. 19 shows the sequence. A case will be exemplified below wherein the analog telephone TEL1 originates a call to an external telephone via the ISDN 7 to start a voice communication.

Upon receiving the dial number of an external telephone from the analog telephone TEL1, the analog telephone hub apparatus 3-1 searches the destination database in its own apparatus to acquire the IP address of the ISDN router apparatus 5. After that, the apparatus 3-1 generates a setup message and transmits it onto the LAN 1 toward the ISDN router apparatus 5. At this time, the dial number of the terminating external telephone and data type=audio are inserted into that setup message. This setup message is transferred from the ISDN router apparatus 5 to the terminating external telephone via the ISDN 7.

Upon receiving the setup message addressed to the own apparatus, the terminating external telephone sends back a call setup acceptance (call proc) to the ISDN router apparatus 5, and outputs a ringer signal (Alert) to the originating analog telephone hub apparatus 3-1. Upon receiving the ringer signal, the originating analog telephone hub apparatus 3-1 generates a ring back tone RBT and outputs it to the originating analog telephone TEL1.

Assume that the user of the terminating external telephone goes off-hook in this state to answer the call. Then, the external telephone outputs a connection message (connect message; Conn) to the originating analog telephone hub apparatus 3-1 via the ISDN router apparatus 5. Upon receiving this connect message, the originating analog hub apparatus 3-1 sends back a connection confirmation message (connect acknowledgement message; Conn Ack) via the ISDN router apparatus 5 and stops the ring back tone.

In this fashion, a voice connection is established between the originating analog telephone TEL1 and external telephone via the ISDN 7, and the users of these terminals can talk via a voice communication link based on this voice connection.

(10) When voice communication is made between an extension analog telephone and external telephone (multi-address request scheme).

Figure 20:
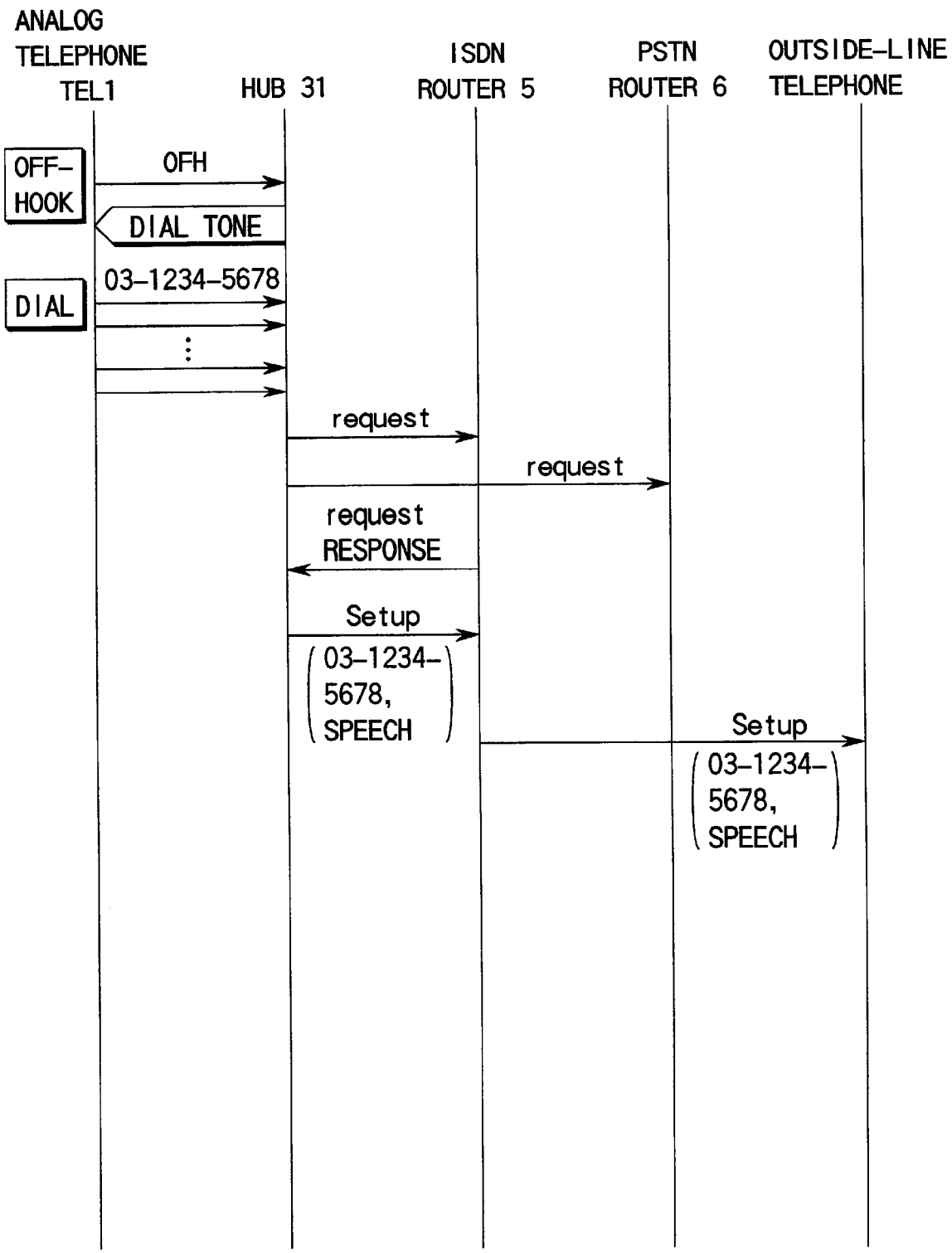
FIG. 20 is a sequence chart showing an example upon voice communication between an analog telephone and an external telephone.

FIG. 20 shows the sequence. Upon receiving a dial number from the originating analog telephone TEL1, the analog telephone hub apparatus 3-1 transmits a request message to all the routers connected to the LAN 1, i.e., the ISDN router apparatus 5 and PSTN router apparatus 6. Upon reception of this request message via the LAN 1, all the router apparatuses 5 and 6 connected to the LAN 1 check if a call can be placed to an external telephone corresponding to DN contained in that request message. If a call can be placed, the apparatuses send back a request message indicating this to the analog telephone hub apparatus 3-1 as a request source. If a call cannot be placed to an external telephone corresponding to the requested DN, no response message is sent back.

If a request response message is sent back from, e.g., the ISDN router apparatus 5 in response to the request, the analog telephone hub apparatus 3-1 generates a setup message and sends it back toward the external telephone via the ISDN router apparatus 5.

(11) When voice communication is made between an extension analog telephone and external telephone (server inquiry scheme)

Figure 21:
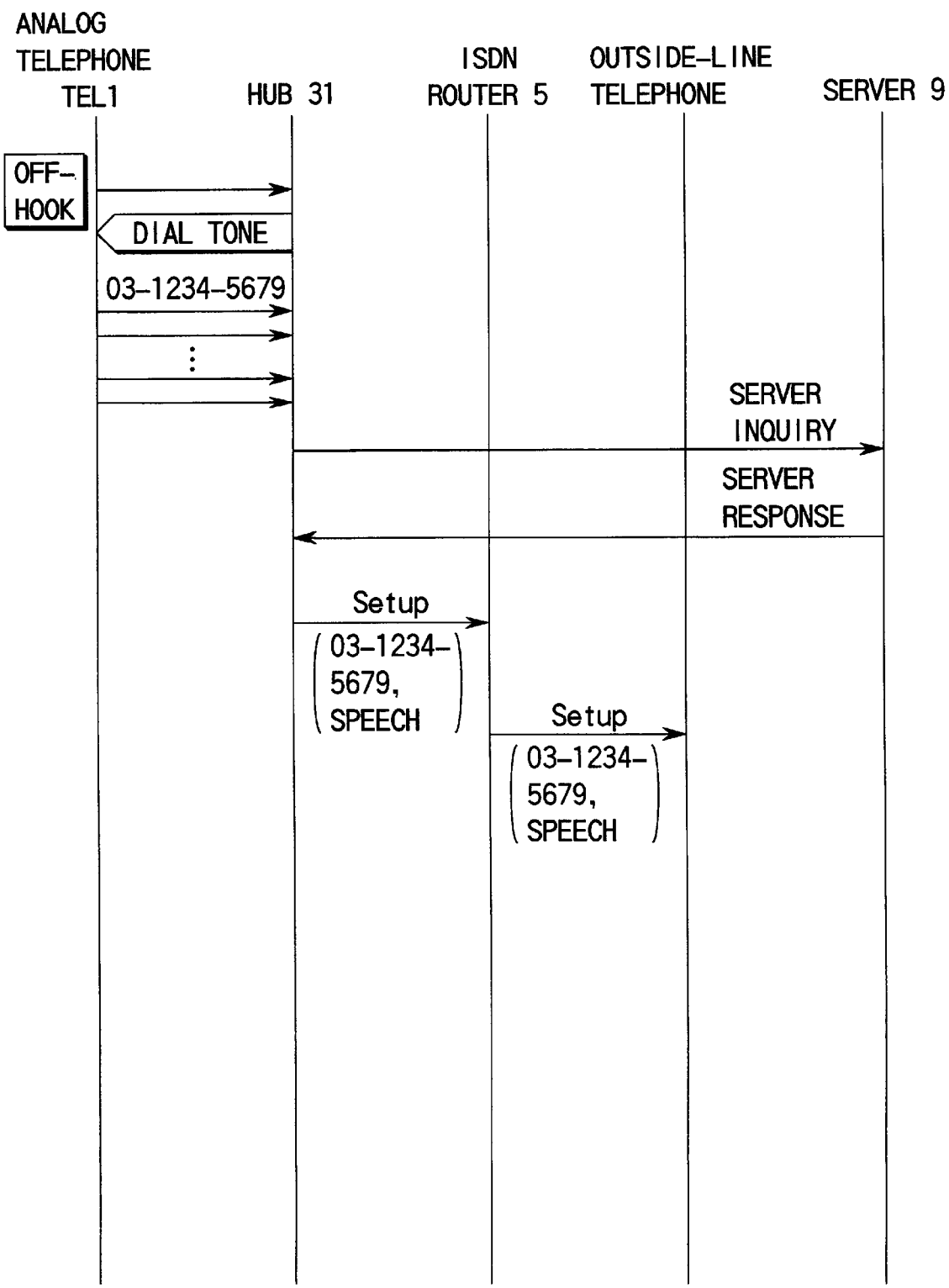
FIG. 21 is a sequence chart showing another example upon voice communication between an extension analog telephone and an external telephone.

FIG. 21 shows the sequence. Upon receiving the dial number from the originating analog telephone TEL1, the analog telephone hub apparatus 3-1 transmits an inquiry message to the communication server 9 connected to the LAN 1. Upon reception of this inquiry message, the server 9 accesses the destination database on the basis of the inquiry message to retrieve the IP address of the terminating hub apparatus. Then, the server 9 informs the analog telephone hub apparatus 3-1 as the inquiry source of that IP address using a response message. Upon receiving the IP address message, the analog telephone hub apparatus 3-1 generates a setup message and transmits it to the ISDN router apparatus 5. The ISDN router apparatus 5 transfers this setup message to the external telephone.

Figure 22:
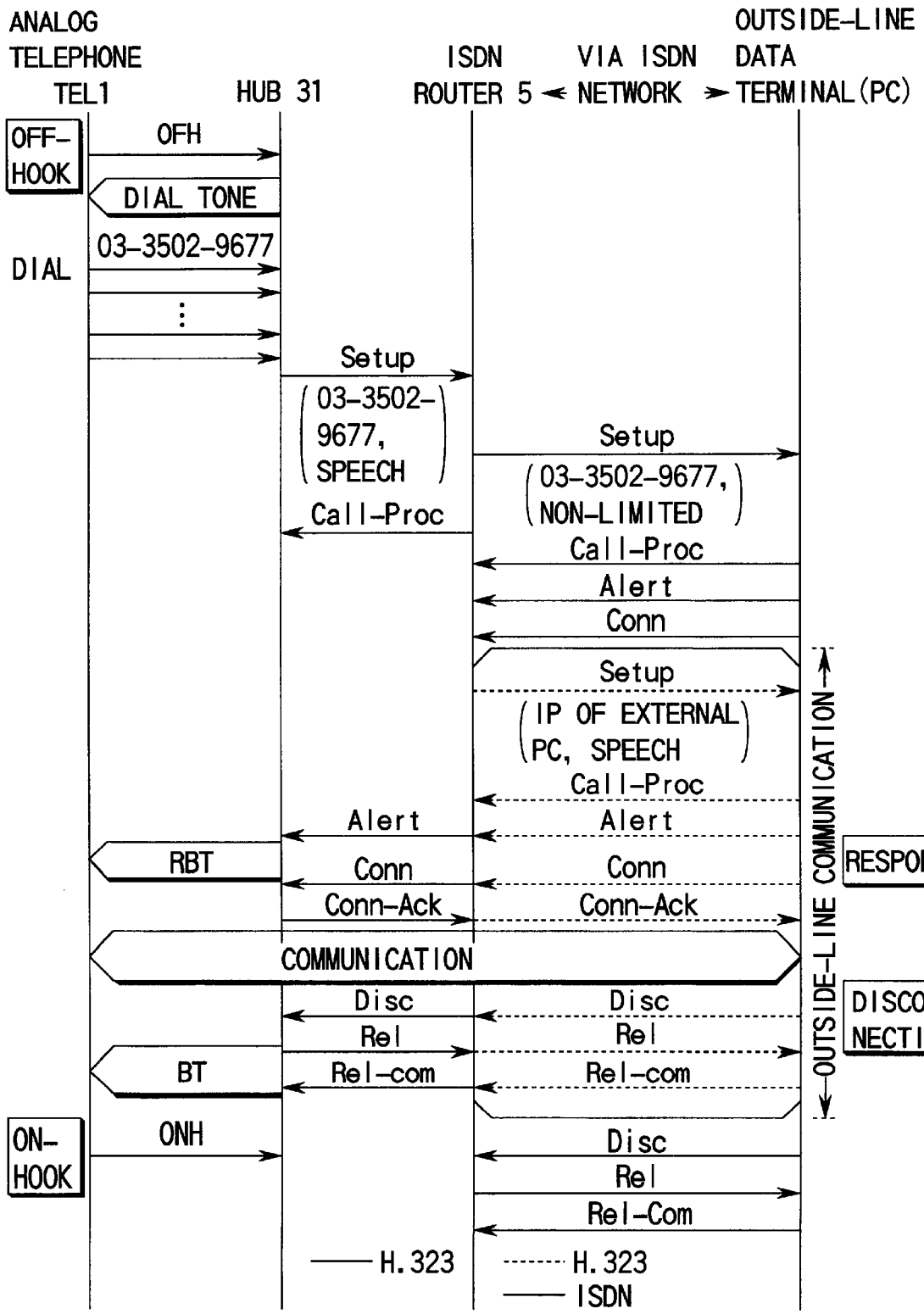
FIG. 22 is a sequence chart upon voice communication between an extension analog telephone and an outside-line data terminal.

(12) When voice communication is made between extension analog telephone and outside-line data terminal FIG. 22 shows the sequence. Referring to FIG. 22, assume that the user goes off-hook at the analog telephone TEL1 and dial-inputs dial number "03-3502-9677" of the communication partner after he or she has confirmed a dial tone. Then, the analog telephone hub apparatus 3-1 performs dial analysis to acquire the IP address of the ISDN router apparatus 5 from its own destination database 3h upon receiving all the digits of the dial number from the analog telephone TEL1.

After the IP address of the ISDN router apparatus 5 is acquired, the analog telephone hub apparatus 3-1 generates a setup message and transmits it toward the ISDN router apparatus 5. Upon reception of this setup message, the ISDN router apparatus 5 sends back a call setup acceptance (call proc) to the originating analog telephone hub apparatus 3-1, and transmits a setup message in which termination number "03-3502-9677" and data type=non-limited are inserted in accordance with the ISDN protocol to an outside-line data terminal via the ISDN 7. The outside-line data terminal sends back a call setup acceptance (call proc) to the ISDN router apparatus 5 in accordance with the ISDN protocol, and outputs a ringer signal (Alert) and connection message (connect message; Conn) in turn. In this way, a communication connection according to the ISDN protocol is established between the ISDN router apparatus 5 and outside-line data terminal.

After the ISDN communication connection has been established, the ISDN router apparatus 5 generates a setup message that contains the IP address assigned to the external data terminal and data type=audio, and transmits it toward the external data terminal in accordance with the protocol (H.323) of the LAN 1. Upon receiving the setup message, the external data terminal sends back a call setup acceptance (call proc) toward the originating ISDN router apparatus 5, and also outputs a ringer signal (Alert). This ringer signal is transferred from the ISDN router apparatus 5 to the analog telephone hub apparatus 3-1 via the LAN 1. Upon receiving this ringer signal, the analog telephone hub apparatus 3-1 generates a ring back tone and transmits it to the originating analog telephone TEL1.

In this state, if the user makes operation corresponding to off-hook at the terminating external data terminal to answer the call, the external data terminal outputs a connection message (connect message; Conn) to the originating analog telephone hub apparatus 3-1 via the ISDN router apparatus 5. Upon reception of this connect message, the originating analog telephone hub apparatus 3-1 sends back a connection confirmation message (connect acknowledgement message; Conn Ack).

In this way, a communication connection according to the protocol (H.323) of the LAN 1 is established between the originating analog telephone TEL1 and terminating external data terminal, and the users of the originating analog telephone TEL1 and terminating external data terminal can talk via a communication link based on this communication connection.

Note that in a disconnection procedure after the end of the voice communication, the communication connection according to the protocol (H.323) of the LAN 1 is released, and after that, the communication connection according to the ISDN protocol is released in the order opposite to the above-mentioned setup procedure of the communication link.

Figure 23:
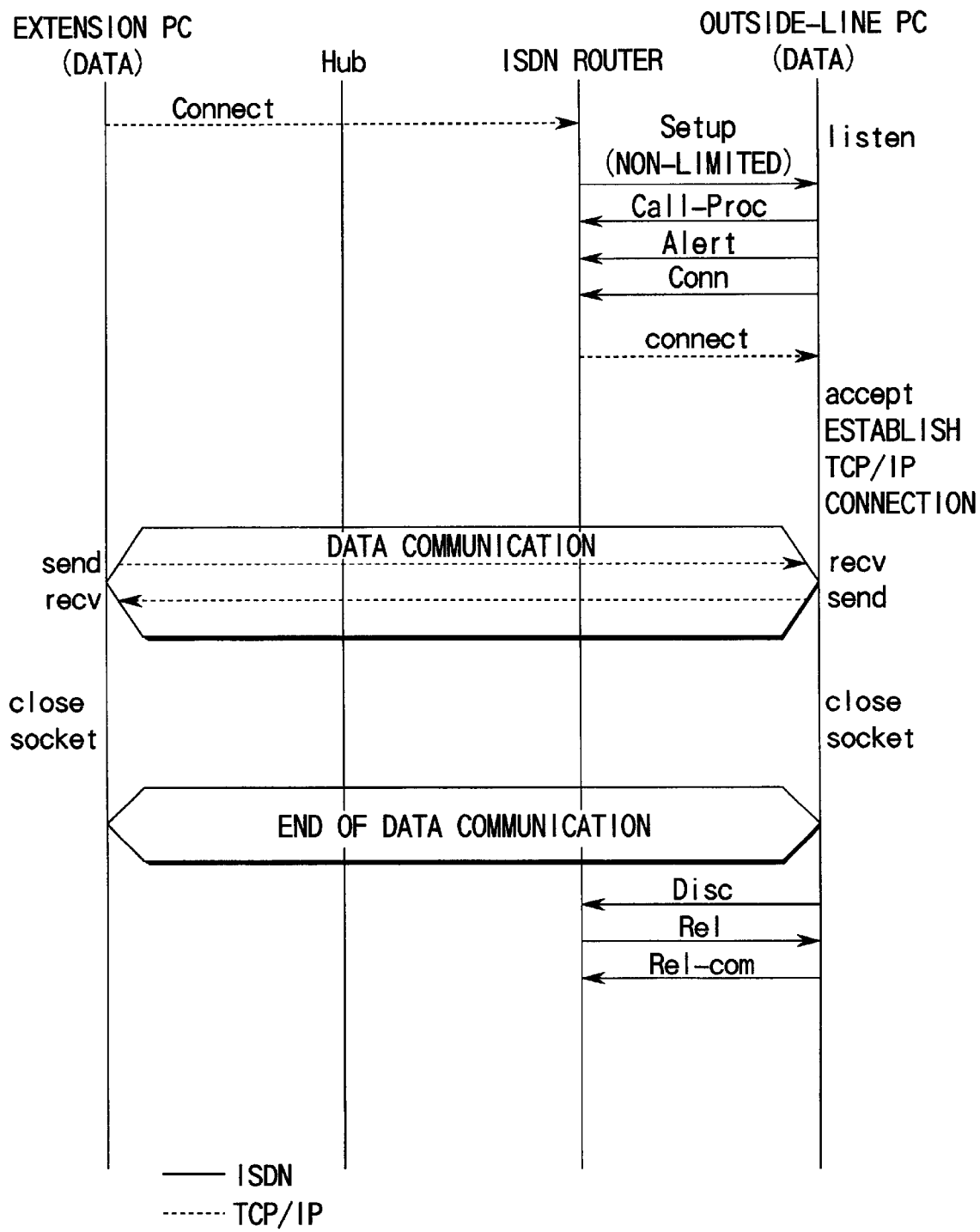
FIG. 23 is a sequence chart upon data communication between an extension data terminal and an outside-line data terminal.

(13) When data communication is made between extension data terminal and outside-line data terminal FIG. 23 shows the sequence. Referring to FIG. 23, the originating extension data terminal transmits a connect message to the ISDN router apparatus 5 in accordance with the TCP/IP protocol. Upon receiving this connect message, the ISDN router apparatus 5 executes a procedure for establishing an ISDN communication connection between itself and the external data terminal. After the ISDN communication connection has been established, the ISDN router apparatus 5 transmits a connect message to the external data terminal in accordance with the TCP/IP protocol.

Upon transmission of this connect message, the originating extension data terminal and terminating external data terminal perform processing for establishing a TCP/IP connection. After the communication connection according to the protocol of the LAN 1 has been established between the originating extension data terminal and terminating external data terminal, a data communication can be made between the originating extension data terminal and terminating external data terminal.

(14) When extension terminal accesses outside line (router apparatus determines terminating apparatus on the basis of its own database)

Figure 24:
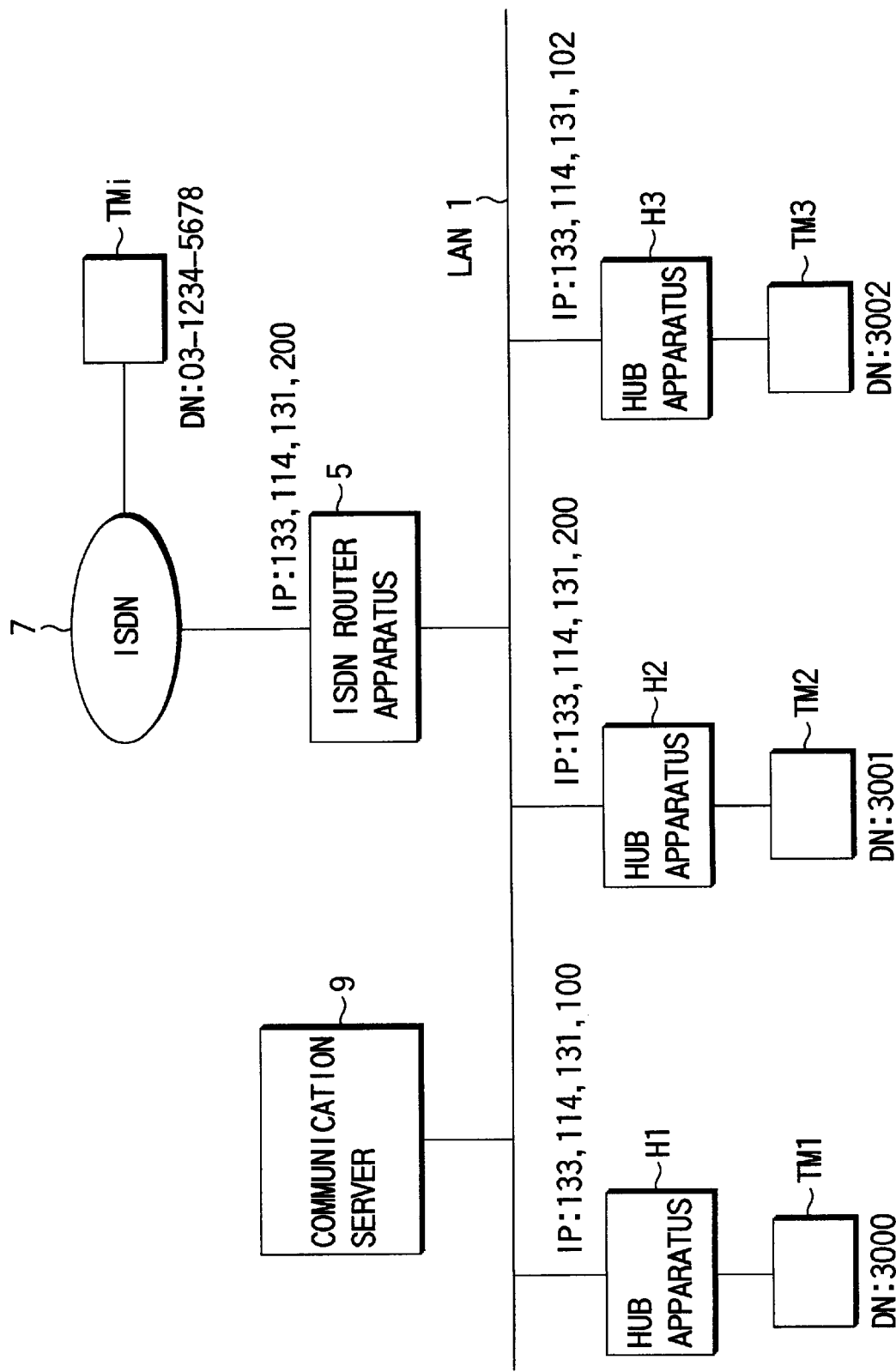
FIG. 24 is a diagram showing an example of DN or IP addresses assigned to the respective apparatuses in the system.

In the following description, as shown in, e.g., FIG. 24, hub apparatuses H1, H2, and H3, and the router apparatus 5 are respectively assigned IP addresses "IP: 133.114.131.100", "IP: 133.114.131.101", "IP: 133.114.131.102", and "IP: 133.114.131.200", and extension terminals TM1, TM2, and TM3 served by the hub apparatuses H1, H2, and H3 are assigned extension telephone numbers DN "DN: 3000", "DN: 3001", and "DN: 3002". Furthermore, an outside-line terminal Tm1 connected to the router apparatus 5 via the ISDN 7 is assigned subscriber's telephone number "DN: 03-1234-5678".

Figures 25, 26:
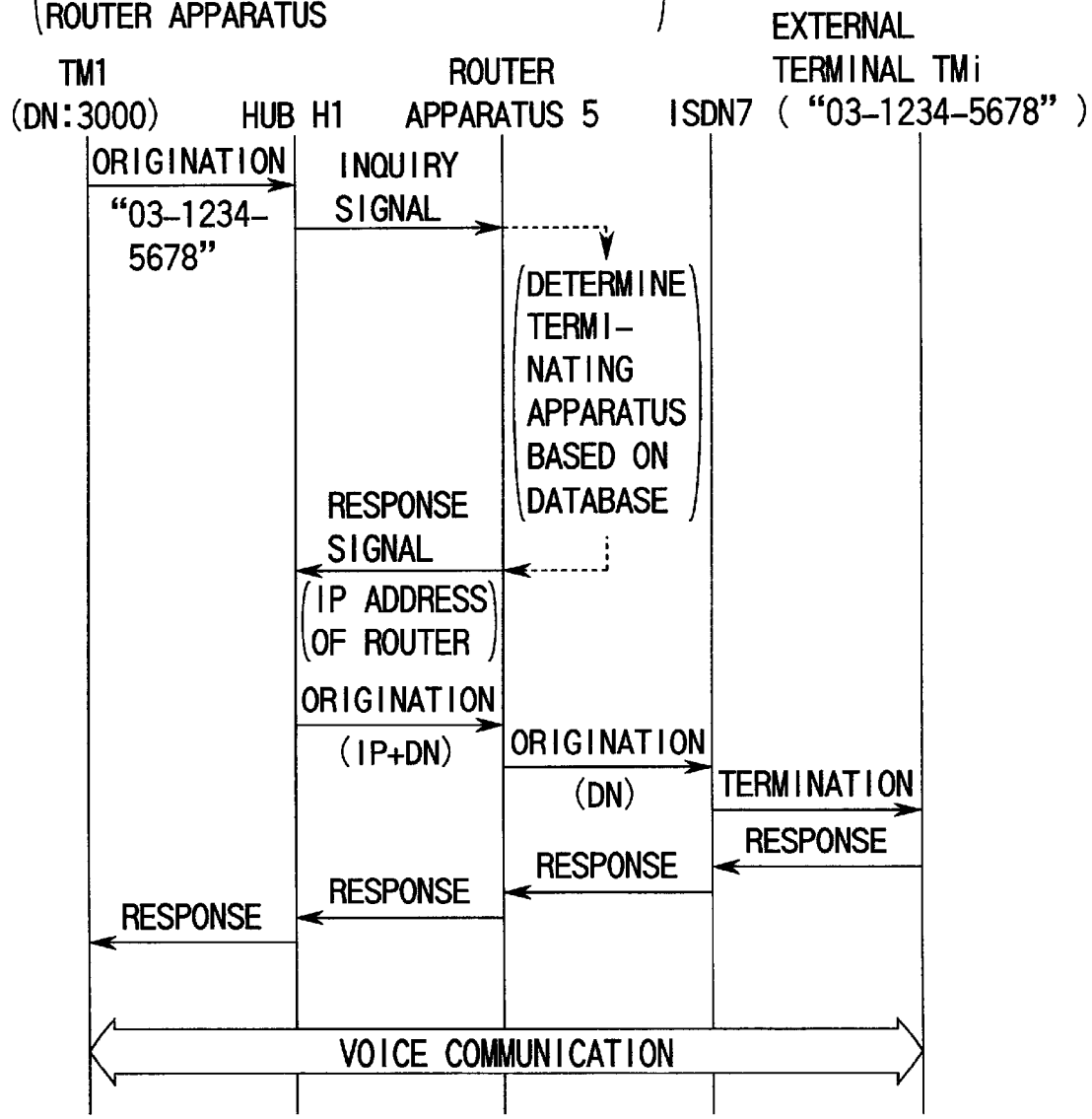
FIG. 25 is a sequence chart showing the operation of a router apparatus which determines the terminating apparatus on the basis of its own database upon placing a call from an extension terminal onto an outside line.
FIG. 26 is a table showing an example of the configuration of an IP address search database provided to the router apparatus.

Referring to FIG. 25, when the extension terminal TM1 outputs a call originating request to the outsi-deline terminal TMi, the hub apparatus H1 inserts destination DN "03-1234-5678" into an inquiry signal (request message) together with source DN "3000", and transmits that signal onto the LAN 1 toward the router apparatus 5.

The router apparatus 5 comprises a database that stores the correspondences between the DNs of all the extension terminals served by the system, and the IP addresses of the hub apparatuses that serve the extension terminals, as shown in, e.g., FIG. 26. Upon receiving the request message from the hub apparatus, it is checked if the destination DN contained in that request message is stored in the database. If the destination DN is stored, it is determined that the terminating apparatus is an extension terminal; otherwise, it is determined that the terminating apparatus is an outside-line terminal. In this case, since the destination DN sent from the hub apparatus H1 is the subscriber's telephone number of an outside-line terminal, the router apparatus 5 determines that the terminating apparatus is an outside-line terminal, and sends back a response signal (request response message) inserted with its own IP address "IP: 133.114.131.200" to the hub apparatus H1 as the inquiry source.

If the terminating apparatus is an extension terminal, the router apparatus 5 searches the database using the DN of that terminating extension terminal as a key, inserts the IP address of the hub apparatus that serves the terminating extension terminal into a response signal (request response message), and sends it back to the hub apparatus H1 as the inquiry source.

When the hub apparatus H1 acquires the IP address of the router apparatus 5 from the request response message, it transmits a call originating signal (setup signal) to the router apparatus 5 using that IP address as a destination address. Upon receiving the setup message, the router apparatus 5 transmits the call originating signal onto the ISDN 7. Upon reception of the call originating signal, the ISDN 7 outputs a call termination signal to the terminating terminal TMi to make it generate a ringing tone.

When the user of the terminating terminal TMi answers the call, that response is transmitted to the ISDN 7, thus forming a communication link between the terminating terminal TMi and router apparatus 5. Then, the response is transferred from the router apparatus 5 to the hub apparatus H1, thus forming a communication link between the originating extension terminal TM1 and terminating terminal TMi and allowing a communication such as a voice communication between the two terminals TM1 and TMi.

(15) When extension terminal accesses outside line (router apparatus determines terminating apparatus on the basis of special service code)

Figure 27:
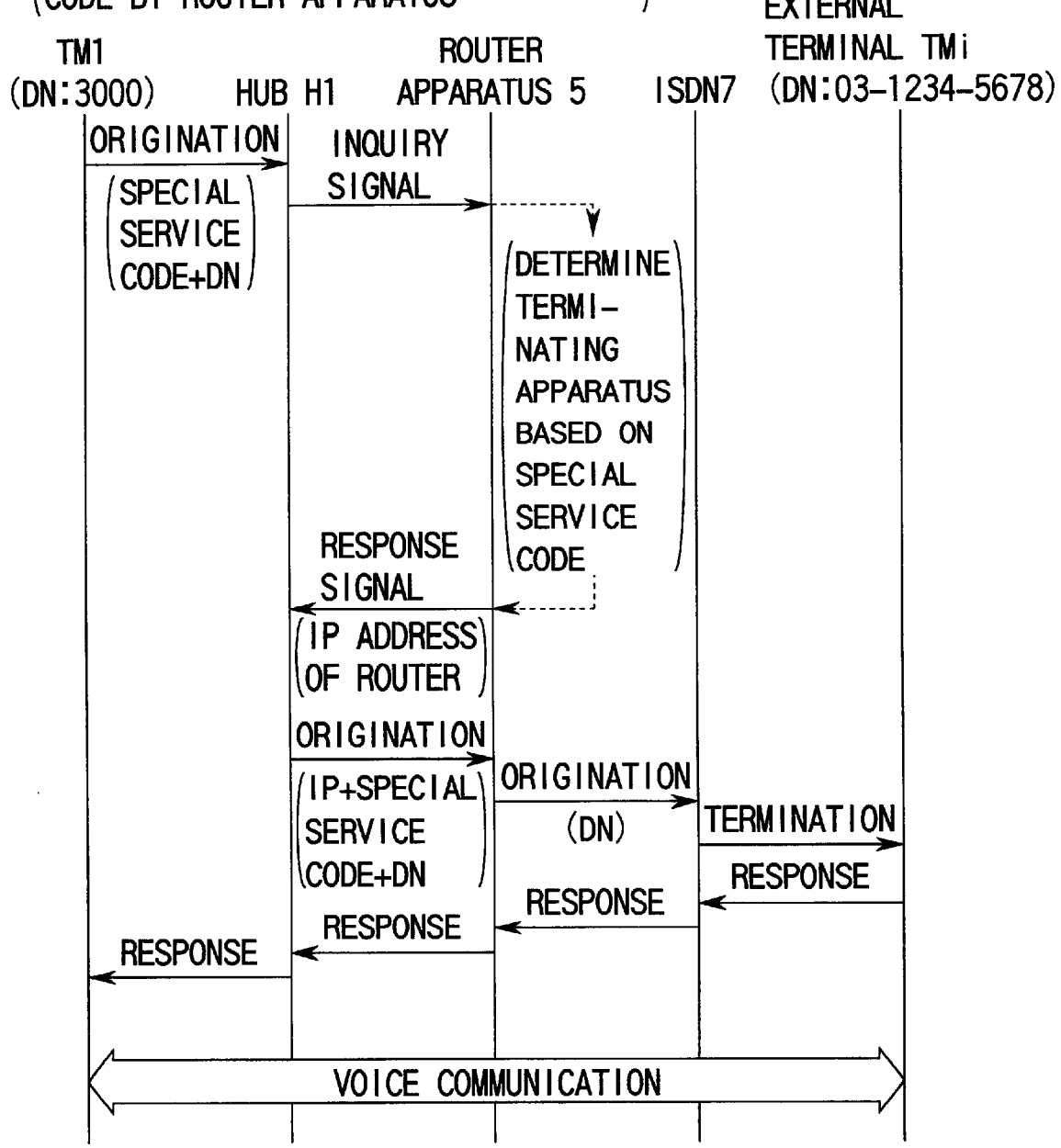
FIG. 27 is a sequence chart showing the operation of a router apparatus which determines the terminating apparatus on the basis of a special service code upon placing a call from an extension terminal to an outside line.

FIG. 27 is a sequence chart showing the call originating process. When each of the extension terminals TM1, TM2, and TM3 accesses an outside line, it appends a special service code indicating outside line access to the subscriber's telephone number of the partner apparatus, and transmits them. For example, when the extension terminal TM1 originates a call to the outside-line terminal TMi, it appends special service code "0" to subscriber's telephone number "DN: 03-1234-5678" of the partner terminal TMi, and transmits them.

Upon receiving the call originating request from the extension terminal TM1, the hub apparatus H1 inserts special service code "0" and destination DN "03-1234-5678" contained in that call originating request into a request message together with source DN "3000", and transmits the message onto the LAN 1 toward the router apparatus 5.

Upon reception of the request message from the hub apparatus H1, the router apparatus 5 checks based on the presence/absence of special service code "0" in the request message if the terminating apparatus is an extension terminal or outside-line terminal. In this case, since the request message contains special service code "0", the router apparatus 5 determines that the terminating apparatus is an outside-line terminal, inserts its own IP address "IP: 133.114.131.200" into a request response message, and sends back that message to the hub apparatus H1 as the inquiry source.

If the request message does not contain any special service code "0" and it is determined that the terminating apparatus is an extension terminal, the database is searched using the DN of the terminating extension terminal as a key, the IP address of the hub apparatus that serves the terminating extension terminal is inserted into the request message, and the message is sent back to the hub apparatus H1 as the inquiry source.

The operation after the IP address of the router apparatus 5 is informed by the request response message is the same as that described in case (14) above. After a communication link is formed between the originating extension terminal TM1 and terminating external terminal TMi, a communication can be made between these terminals.

(16) When extension terminal accesses outside line (content server 9 determines terminating apparatus based on its own database)

Figure 28:
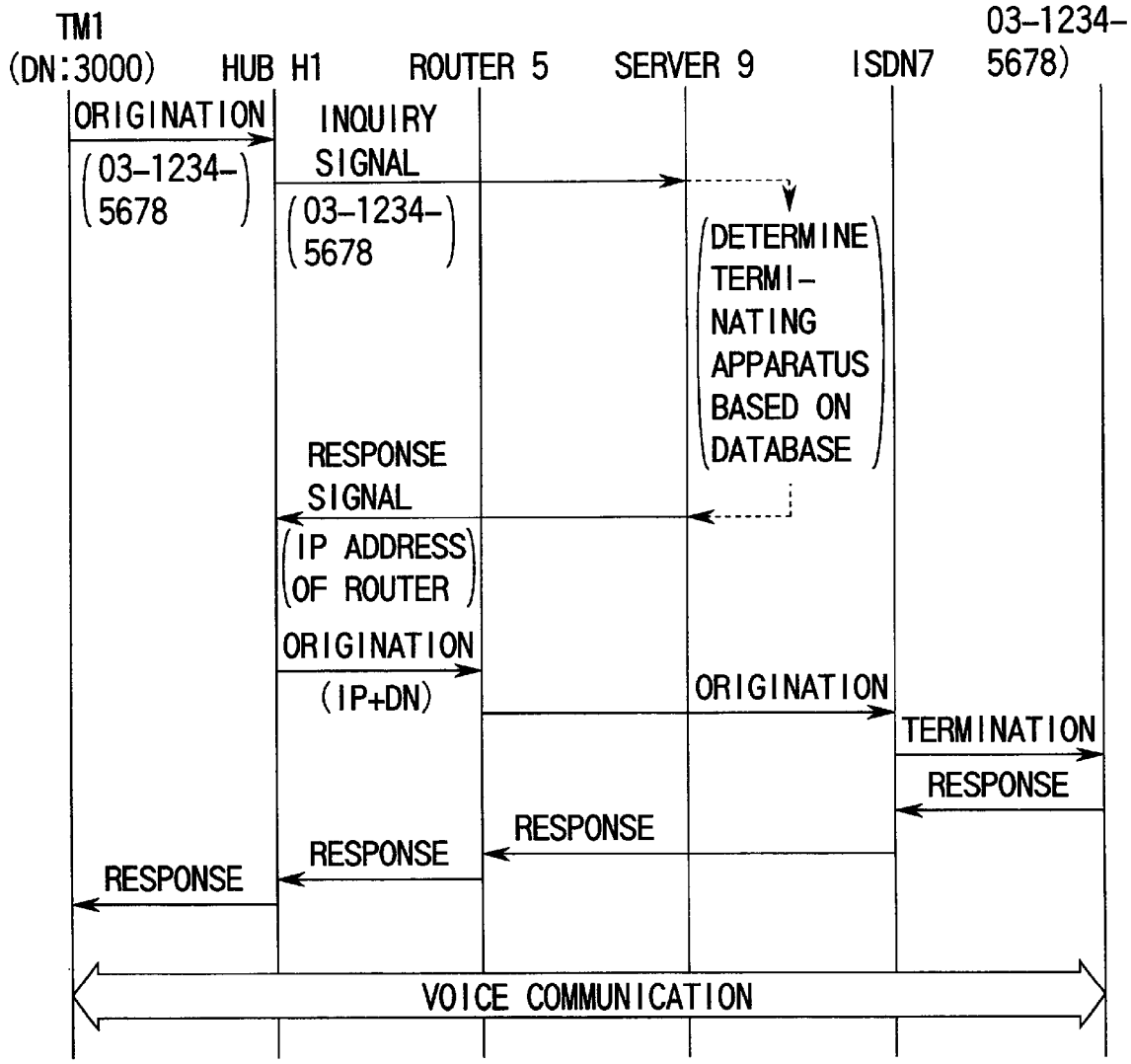
FIG. 28 is a sequence chart showing the operation of a content server which determines the terminating apparatus on the basis of its own database upon placing a call from an extension terminal to an outside line.

FIG. 28 is a sequence chart showing that operation. Referring to FIG. 28, when the extension terminal TM1 outputs a call originating request to the outside-line terminal TMi, the hub apparatus H1 inserts destination DN "03-1234-5678" contained in that call originating request into a request message together with DN "3000" of the source extension terminal TM1, and transmits that message onto the LAN 1 toward the content server 9.

The content server 9 comprises a database that stores the correspondences between the DNs of all the extension terminals in the system, and the IP addresses of the hub apparatuses that serve the extension terminals, as shown, e.g., FIG. 29. Note that this database also stores the IP address of the router apparatus 5 in correspondence with its DN. Upon reception of the request message from the hub apparatus Hi, it is checked if the destination DN contained in that request message is stored in the database. If the destination DN is stored, it is determined that the terminating apparatus is an extension terminal; otherwise, it is determined that the terminating apparatus is an outside-line terminal.

In this case, since the destination DN sent from the hub apparatus H1 is subscriber's telephone number "DN: 03-1234-5678" of the outside-line terminal, the content server 9 determines that the terminating apparatus is an outside-line terminal, inserts IP address "IP: 133.114.131.200" into a request response message, and sends back it to the hub apparatus H1 as the inquiry source.

When the destination DN is stored in the database and it is determined that the terminating apparatus is an extension terminal, the content server 9 searches the database using the DN of the terminating extension terminal as a key, inserts the IP address of a hub apparatus that serves the terminating extension terminal into a request response message, and sends back that message to the hub apparatus HI as the inquiry source.

When the hub apparatus Hi acquires the IP address of the router apparatus 5 from the request response message, it transmits a setup message to the router apparatus 5 using that IP address as a destination address. Upon receiving the setup message, the router apparatus 5 transmits a call originating signal onto the ISDN 7. Upon reception of the call originating signal, the ISDN 7 outputs a call originating signal to the terminating terminal TMi to make it output a ringing tone.

When the user of the terminating terminal TMi answers the call, the response is transmitted to the ISDN 7, thereby forming a communication link between the terminating external terminal TMi and router apparatus 5. Furthermore, since the response is supplied from the router apparatus 5 to the hub apparatus H1, a communication link is also formed between the originating extension terminal TM1 and terminating terminal TMi, thus allowing a communication such as a voice communication between these terminals TM1 and TMi.

(17) When extension terminal accesses outside line (content server determines terminating apparatus based on special service code)

Figure 30:
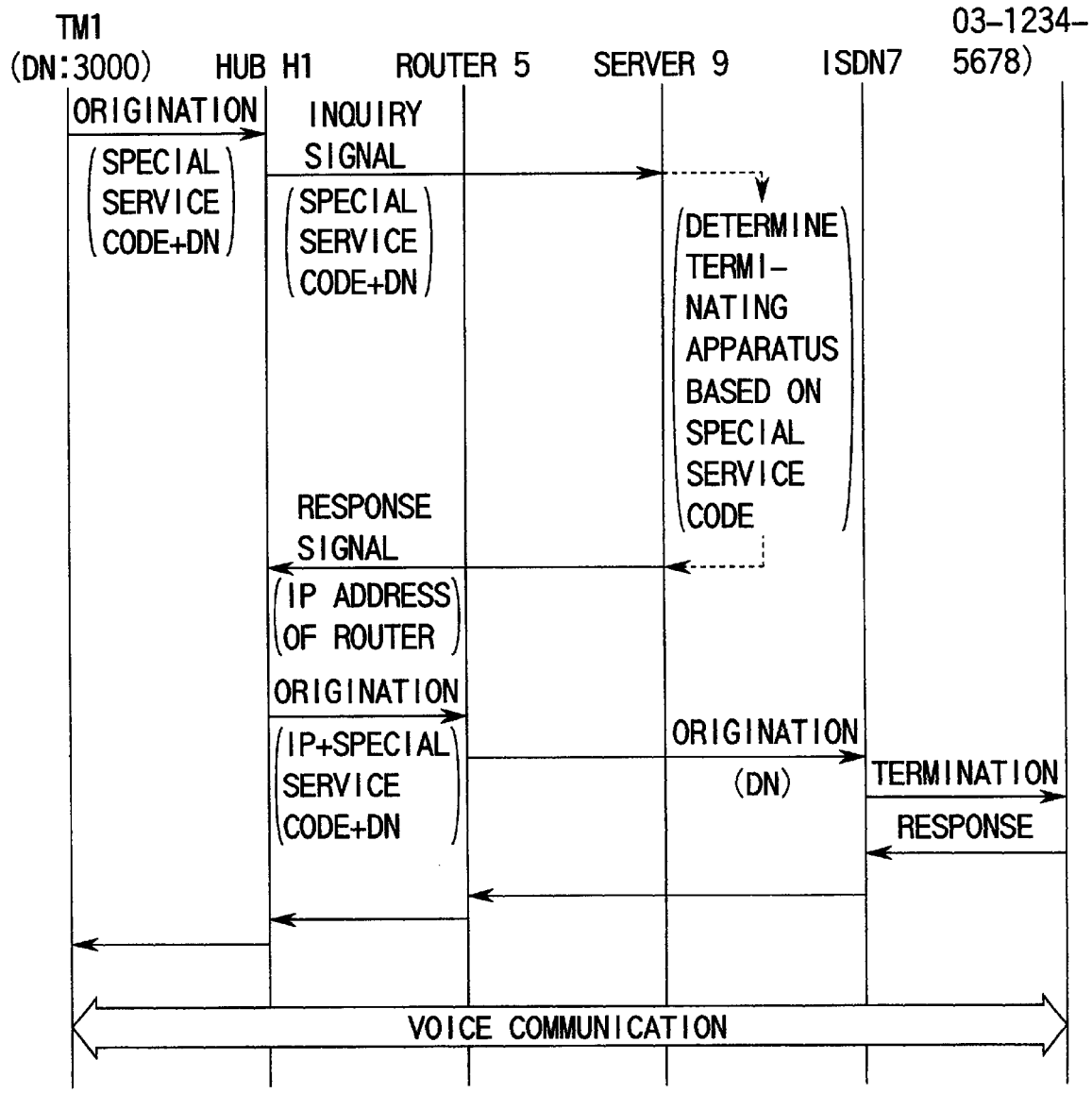
FIG. 30 is a sequence chart showing the operation of a content server which determines the terminating apparatus on the basis of a special service code upon placing a call from an extension terminal to an outside line.

FIG. 30 is a sequence chart showing that call originating process. When each of the extension 5 terminals TM1, TM2, and TM3 accesses an outside line, it appends a special service code indicating outside line access to the subscriber's telephone number of the partner apparatus, and transmits them. For example, when the extension terminal TM1 originates a call to the outside-line terminal TMi, it appends special service code "0" to subscriber's telephone number "DN: 03-1234-5678" of the partner terminal TMi, and transmits them.

Upon receiving the call originating request from the extension terminal TM1, the hub apparatus H1 inserts special service code "0" and destination DN "03-1234-5678" contained in that call originating request into a request message together with source DN "3000", and transmits the message onto the LAN 1 toward the content server 9.

Upon reception of the request message from the hub apparatus Hi, the content server 9 checks based on the presence/absence of special service code "0" in the request message if the terminating apparatus is an extension terminal or outside-line terminal. In this case, since the request message contains special service code "0", the content server 9 determines that the terminating apparatus is an outside-line terminal, inserts its own IP address "IP: 133.114.131.200" of the router apparatus 5 into a request response message, and sends back that message to the hub apparatus Hi as the inquiry source.

If the request message does not contain any special service code "0" and it is determined that the terminating apparatus is an extension terminal, the database is searched using the DN of the terminating extension terminal as a key, the IP address of the hub apparatus that serves the terminating extension terminal is inserted into the request message, and the message is sent back to the hub apparatus H1 as the inquiry source.

The operation after the IP address of the router apparatus 5 is informed by the request response message is the same as that which has been described in case (16) above.

(18) When extension terminal accesses outside line (hub apparatus determines terminating apparatus based on database)

Figures 31, 32:
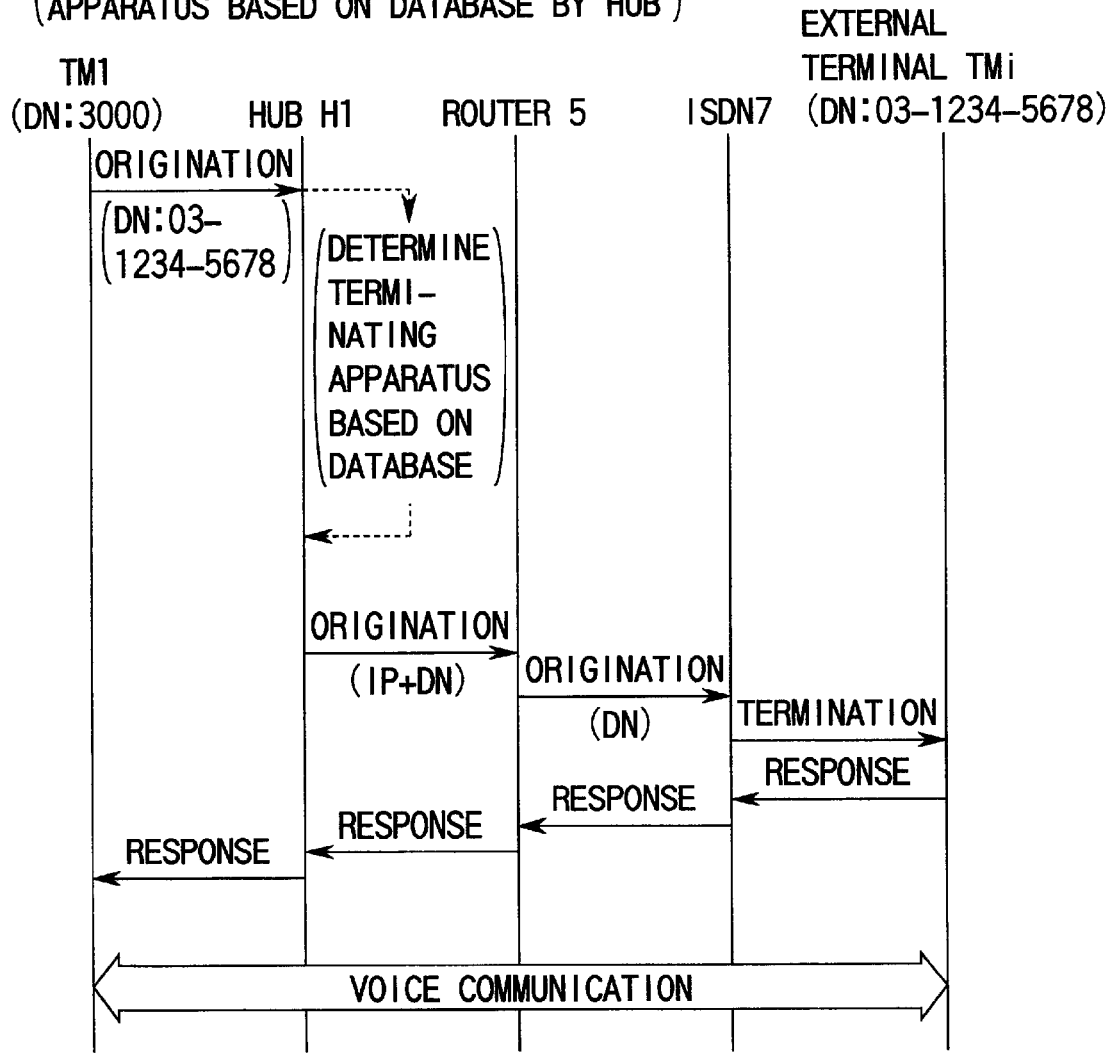
FIG. 31 is a sequence chart showing the operation of a hub apparatus which determines the terminating apparatus on the basis of its own database upon placing a call from an extension terminal to an outside line.
FIG. 32 is a table showing an example of the configuration of an IP address search database provided to the hub apparatus.

FIG. 31 is a sequence chart showing that operation. Referring to FIG. 31, when the extension terminal TM1 outputs a call originating request to the outside-line terminal TMi, the hub apparatus H1 determines the terminating apparatus on the basis of the destination DN contained in that call originating request.

More specifically, each of the hub apparatuses Hi, H2, H3, . . . , has a database that stores the correspondence between the DNs of all the extension terminals in the system, and the IP addresses of the hub apparatuses that serve the extension terminals, as shown in, e.g., FIG. 32. Note that this database also stores the IP address of the router apparatus 5 in correspondence with its DN. Upon receiving the call originating request from the extension terminal TM1 served by itself, the hub apparatus checks if the destination DN contained in that call originating request is stored in the database. If the destination DN is stored, it is determined that the terminating apparatus is an extension terminal; otherwise, it is determined that the terminating apparatus is an outside-line terminal.

In this case, since subscriber's telephone number "DN: 03-1234-5678" of an external terminal is sent from the originating extension terminal TM1, the hub apparatus H1 determines that the terminating apparatus is an outside-line terminal. The hub apparatus H1 reads out IP address "IP: 133.114.131.200" of the router apparatus 5 from its own database, and outputs a setup message to the router apparatus 5 using this IP address as a destination address.

When the destination DN is stored in its own database and it is determined that the terminating apparatus is an extension terminal, the hub apparatus H1 searches the database using the DN of that terminating extension terminal as a key to read out the IP address of a hub apparatus that serves the terminating extension terminal. Then, the hub apparatus transmits a setup message to the terminating hub apparatus using the IP address as a destination address.

Upon reception of the setup message, the router apparatus 5 transmits a call originating signal to the ISDN 7 on the basis of the information of the setup message. Upon reception of the call originating signal, the ISDN 7 outputs a call originating signal to the terminating terminal TMi to make it output a ringing tone.

When the user of the terminating terminal TMi answers the call in this state, the response is supplied to the ISDN 7, thereby forming a communication link between the terminating external terminal TMi and router apparatus 5. Furthermore, since the response is transferred from the router apparatus 5 to the hub apparatus H1, a communication link is also formed between the originating extension terminal TM1 and terminating terminal TMi, thus allowing a communication such as a voice communication or the like between these terminals TM1 and TMi.

(19) When extension terminal accesses outside line (hub apparatus determines terminating apparatus based on special service code)

Figure 33:
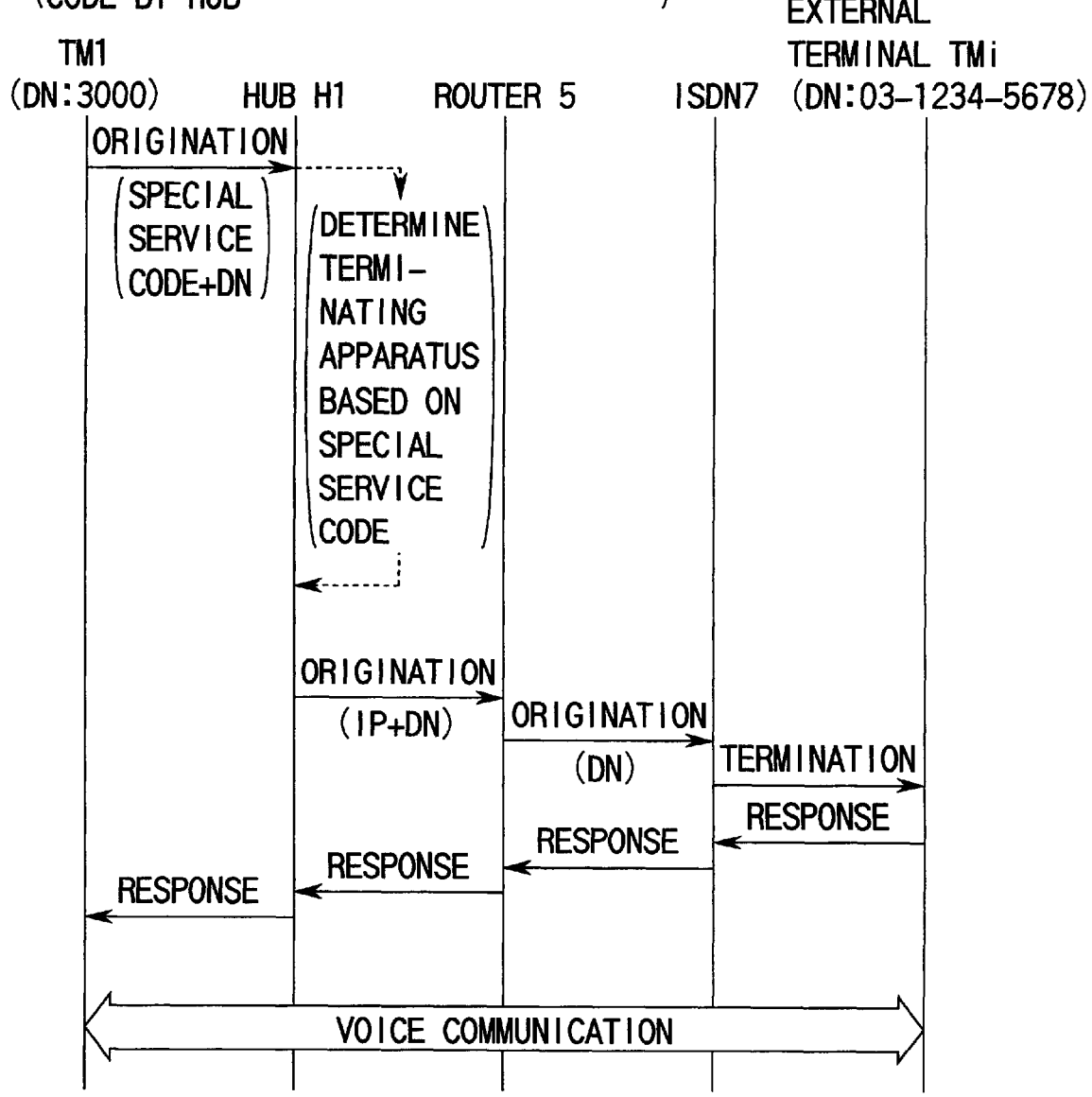
FIG. 33 is a sequence chart showing the operation of a hub apparatus which determines the terminating apparatus on the basis of a special service code upon placing a call from an extension terminal to an outside line.

FIG. 33 is a sequence chart showing that operation. When each of the extension terminals TM1, TM2, and TM3 accesses an outside line, it appends a special service code indicating outside-line access to the subscriber's telephone number of the partner apparatus and transmits them. For example, when the extension terminal TM1 originates a call to the outside-line terminal TMi, it appends special service code "0" to subscriber's telephone number "DN: 03-1234-5678" of the partner terminal TMi and transmits them.

Upon receiving a call originating request from this extension terminal TM1, the hub apparatus H1 checks if special service code "0" is appended to destination information contained in that call originating request. If the special service code is appended, the hub apparatus determines that the terminating apparatus is an external terminal, reads out IP address "IP: 133.114.131.200" of the router apparatus 5 from its own database, and transmits a setup message to the router apparatus 5 using this IP address as a destination address.

The operation after the setup message is sent from the hub apparatus H1 to the router apparatus 5 is the same as that which has been described in case (18) above.

Figures 34, 35:
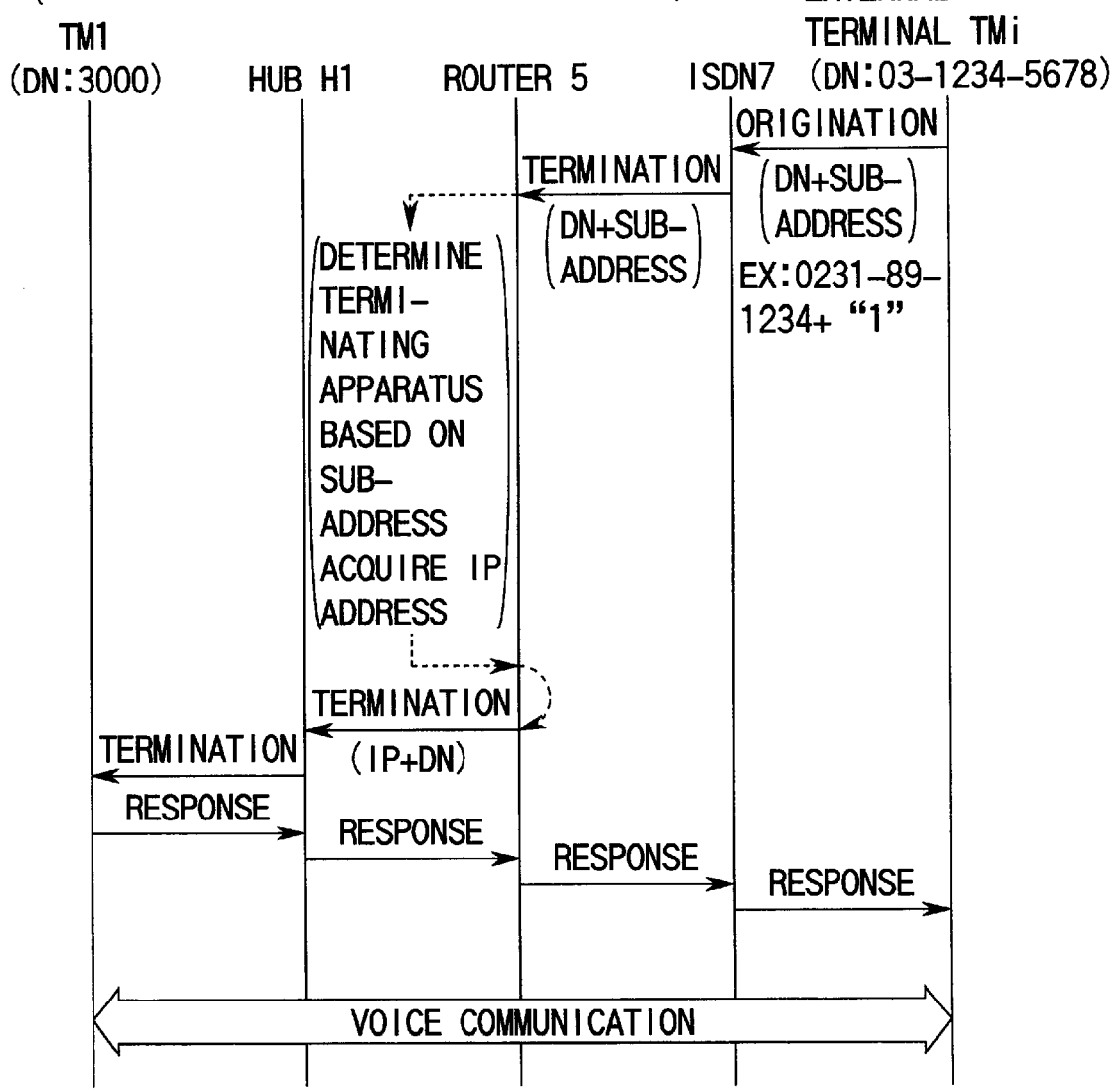
FIG. 34 is a sequence chart showing the operation for determining the terminating apparatus on the basis of a received sub-address upon receiving an incoming call from an outside line.
FIG. 35 is a table showing an example of the configuration of a sub-address database provided to a router apparatus.

(20) When call is received from external terminal to extension terminal (scheme for determining terminating apparatus based on sub-address) FIG. 34 is a sequence chart showing that operation. Assume that at, e.g., the external terminal TMi, the user places a call to the extension terminal TM1 served by the system of this embodiment having the LAN 1 as a core. In this case, the external terminal TMi transmits a call originating signal in which a subscriber's telephone number (e.g., "DN: 0231-89-1234") assigned to this system and a sub-address (e.g., "1") that designates the terminating extension terminal TM1 are inserted as destination information. Upon receiving this call originating signal, the ISDN 7 transmits a call terminating signal containing the above destination information as destination information toward this system.

The call originating signal coming from the ISDN 7is received by the router apparatus 5. The router apparatus 7 has a sub-address database that stores the DNs of the extension terminals TM1, TM2, TM3, . . . in correspondence with sub-addresses "1", "2", "3", . . . , as shown in, e.g., FIG. 35.

Upon reception of the call terminating signal, the router apparatus 5 extracts the sub-address from that destination information, and searches the sub-address database using the sub-address as a key, thereby reading out the DN of the terminating extension terminal. For example, if the sub-address is "1", "DN: 3000" is read out from the sub-address database, as can be seen from FIG. 35. Then, the router apparatus 5 accesses the IP address search database shown in FIG. 26 previously using the readout DN as a key, thus reading out the IP address of the hub apparatus H1 that serves the terminating extension terminal TM1. The router apparatus 5 generates a call terminating message using this IP address as a destination address, and transmits the call terminating message to the terminating hub apparatus H1.

Upon receiving the call terminating message, the hub apparatus H1 outputs a call terminating signal to the extension terminal TM1 corresponding to the extension DN (DN: 3000) contained in that destination information to make it generate a ringing tone.

In this state, when the user answers the call at the extension terminal TM1, that response message is sent to the hub apparatus Hi, and is then transferred from the hub apparatus H1 to the router apparatus 5. In this way, a communication link is formed between the router apparatus 5 and terminating extension terminal TM1. Furthermore, the response message is sent from the router apparatus 5 to the ISDN 7. As a consequence, a communication link is formed between the originating external terminal TMi and terminating internal terminal TM1, thus allowing a communication between these terminals.

(21) When call to extension terminal is received from external terminal (scheme for determining terminating apparatus based on communication type expressed by sub-address)

Figures 36, 37:
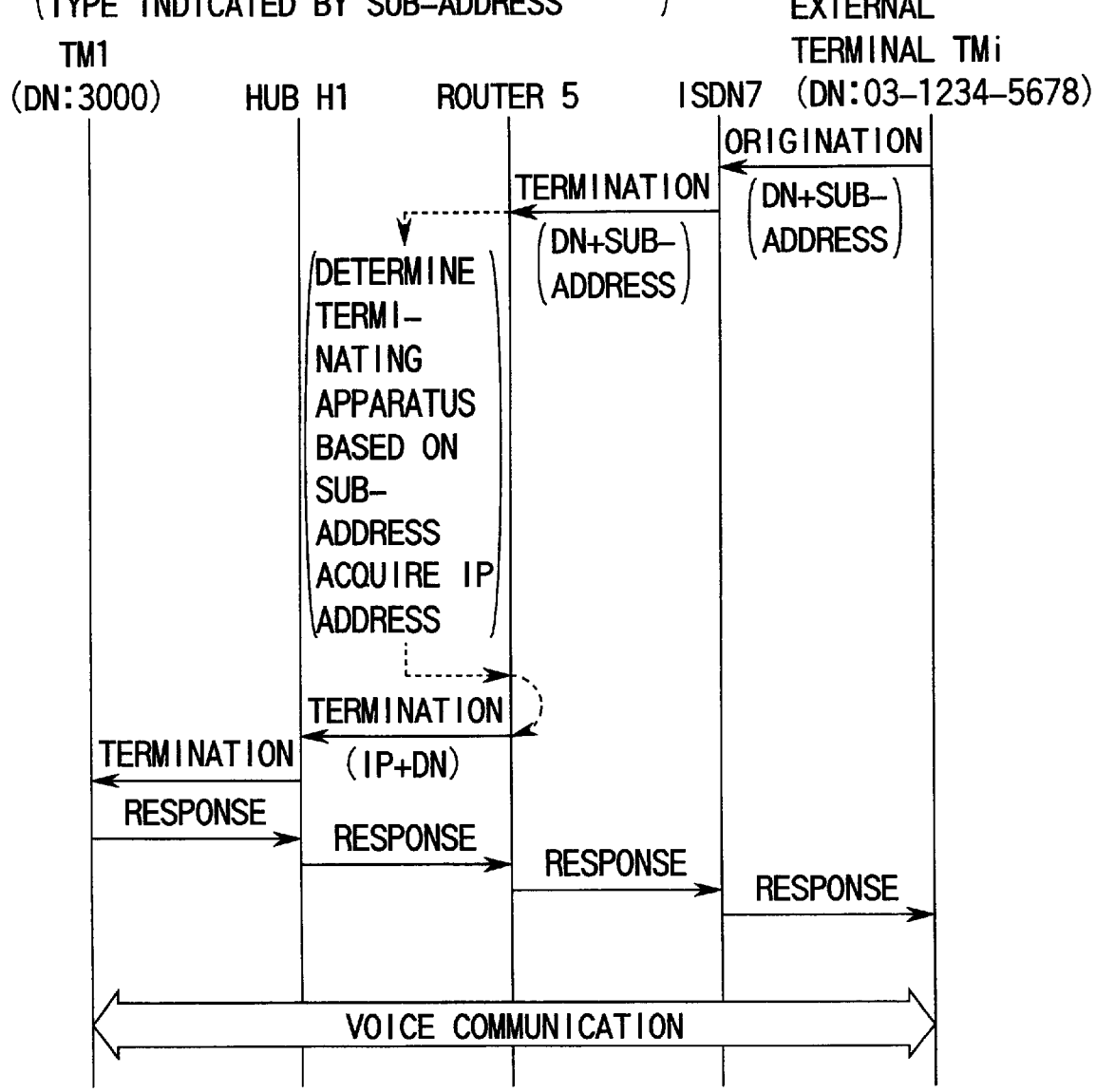
FIG. 36 is a sequence chart showing the operation for determining the terminating apparatus on the basis of the communication type expressed by a received sub-address upon receiving an incoming call from an outside line.
FIG. 37 is a table showing an example of the configuration of a communication type database provided to a router apparatus.

FIG. 36 is a sequence chart showing that operation. The external terminal TMi has a function of generating a sub-address corresponding to communication type. When the user at the external terminal TMi places a call to the extension terminal TM1, the external terminal TMi generates destination information that contains a subscriber's telephone number (for example, "DN: 0231-89-1234") assigned to the terminating system, and a sub-address corresponding to the communication type to be made now, and transmits a call originating signal containing this destination information toward the ISDN 7. For example, assuming that the user wants to make a voice communication now, sub-address "1" indicating that the communication type is a voice communication is inserted into the destination information to be transmitted. On the other hand, if the user wants to make a data communication, sub-address "2" indicating that the communication type is a data communication is inserted into the destination information to be transmitted.

A call terminating signal coming from the ISDN 7 is received by the router apparatus 5. The router apparatus 7 has a communication type database that stores the communication types corresponding to sub-addresses, and the DNs of the extension terminals corresponding to these communication types.

Upon receiving the call terminating signal, the router apparatus 5 extracts a sub-address from that destination information, and searches the communication type database using the sub-address as a key, thus reading out the DN of the extension terminal corresponding to the communication type requested by the originating external terminal TMi. Assuming that, for example, the received sub-address is "1", the communication type requested by the originating external terminal TMi is "voice communication", and the DN of an extension terminal (e.g., "DN: 3000" of the telephone TM1) such as a telephone capable of "voice communication" is read out from the communication type database. On the other hand, if the received sub-address is "2", the communication type requested by the originating external terminal TMi is "data communication", and the DN of an extension terminal (e.g., "DN: 3001" of the personal computer TM2" such as a personal computer or the like capable of "data communication" is read out from the communication type database.

The router apparatus 5 then accesses the IP address search database shown in FIG. 26 previously using the readout DN as a key, thus reading out the IP address of a hub apparatus that serves the terminating extension terminal. After that, the router apparatus 5 generates a call terminating message using the IP address as a destination address, and transmits that call terminating message to the terminating hub apparatus.

The system operation after the call terminating message is sent to the hub apparatus is the same as that which has been described in case (20) above.

In this manner, in the aforementioned operation mode, when an originating external terminal has a function of automatically appending a sub-address that represents the communication type to destination information to be transmitted, the router apparatus 5 comprises a communication type database that stores sub-addresses to be received and the DNs of extension terminals corresponding to communication types represented by the sub-addresses. When the router apparatus 5 accesses this database using the received sub-address as a key, an extension terminal corresponding to the communication type requested by the originating external terminal is selected, and the selected extension terminal is controlled to receive that call.

With this control, an originating terminal need only designate an arbitrary communication type upon originating a call, and an extension terminal corresponding to the designated communication type is automatically selected to receive the call. For this reason, the user on the originating side need not designate a terminating extension terminal in correspondence with the communication types in units of calls, and can very easily originate a call of his or her desired communication type.

(22) When call to extension terminal is received from external terminal (scheme for determining terminating apparatus based on originating apparatus DN)

Figures 38, 39:
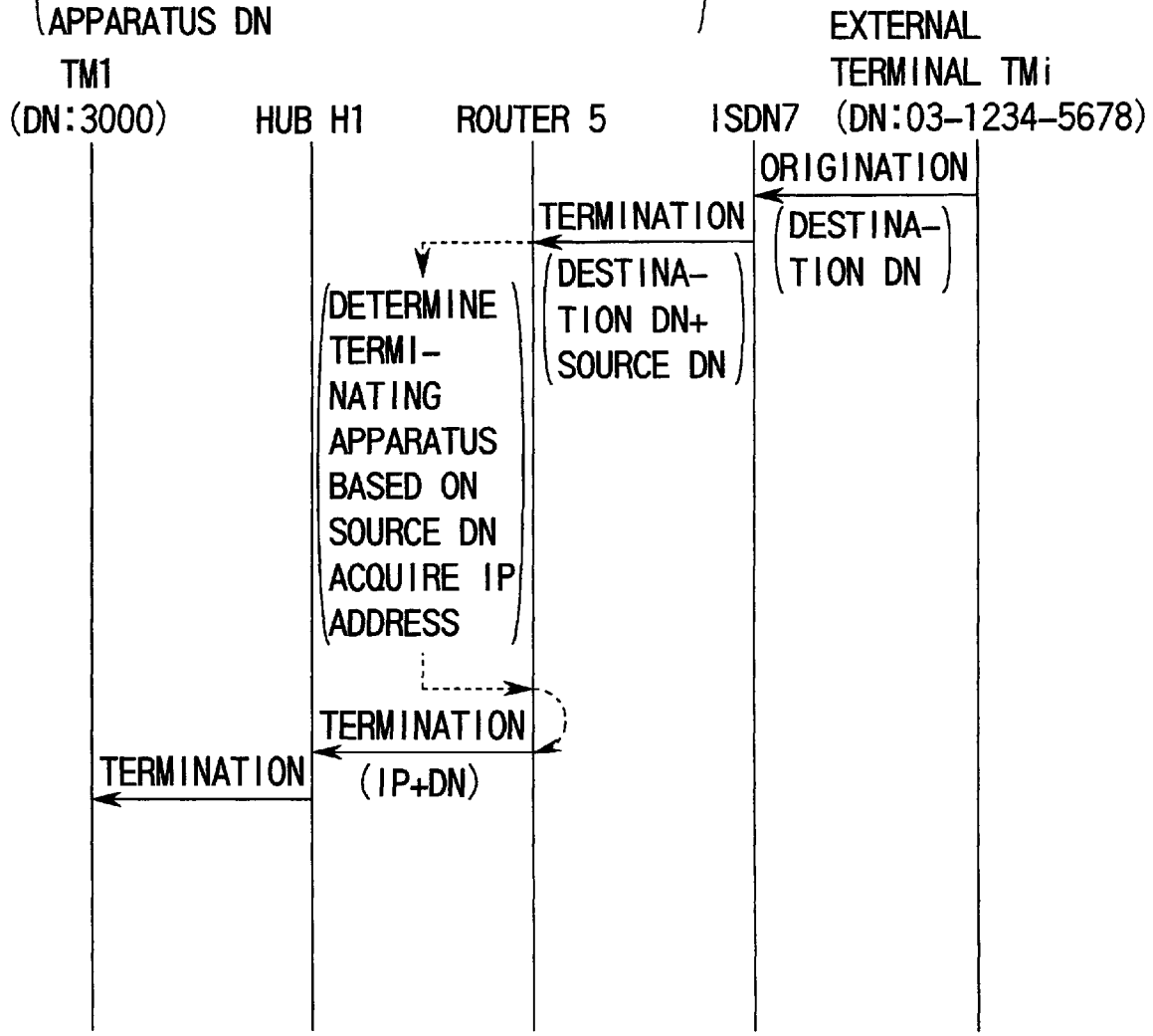
FIG. 38 is a sequence chart showing the operation for determining the terminating apparatus on the basis of the DN of the originating apparatus upon receiving an incoming call from an outside line.
FIG. 39 is a table showing an example of the configuration of a caller database provided to a router apparatus.

FIG. 38 is a sequence chart showing that operation. When the user of the external terminal TMi places a call to the extension terminal TM1, the external terminal TMi generates destination information containing only a subscriber's telephone number (e.g., "DN: 0231-89-1234") assigned to the terminating system, and transmits a call originating signal containing that destination information toward the ISDN 7.

The ISDN 7 manages the subscribers' telephone numbers of all the terminals served by its own network. Upon receiving the call originating signal, the ISDN 7 generates a call terminating signal in which the destination information contained in the call originating signal, and the subscriber's telephone number of the originating external terminal TMi are inserted, and transmits the call terminating signal to the router apparatus 5.

The router apparatus 7 has a caller database that stores the DNs of the extension terminals in correspondence with originating apparatus IDs, as shown in, e.g., FIG. 39. Upon receiving the call terminating signal coming from the ISDN 7, the router apparatus 5 accesses the caller database using the originating apparatus DN inserted in this call terminating signal as a key to read out the DN of the corresponding extension terminal.

Subsequently, the router apparatus 5 first accesses the IP address search database shown in FIG. 26 using the readout DN as a key to read out the IP address of a hub apparatus that serves the terminating extension terminal. Subsequently, the router apparatus 5 generates a call terminating message using this IP address as a destination address, and transmits the call terminating message to the terminating hub apparatus.

The system operation after the call terminating message is sent to the hub apparatus is the same as that which has been described in case (20) above.

According to this operation mode, when the caller database stores the terminal DNs of callers in correspondence with extension terminals of corresponding communication types in advance, a call can always be received by an extension terminal that can communicate with the external terminal that the caller used. Hence, the caller need only originate a call by selecting a desired communication terminal, but can communicate with an extension terminal of the corresponding communication type. In this way, the user on the originating side need not designate a terminating extension terminal in correspondence with the communication types in units of calls, and can very easily originate a call of a desired communication type.

In the above embodiment, various communication methods of the present invention have been explained using the functional diagram and sequence charts that pertain to the respective processes. In the following embodiment, the operation of the present invention will be explained using the detailed arrangements of hub apparatuses, router apparatuses, and the like.

An example of the hub apparatus will be described in detail first.

Figure 40:
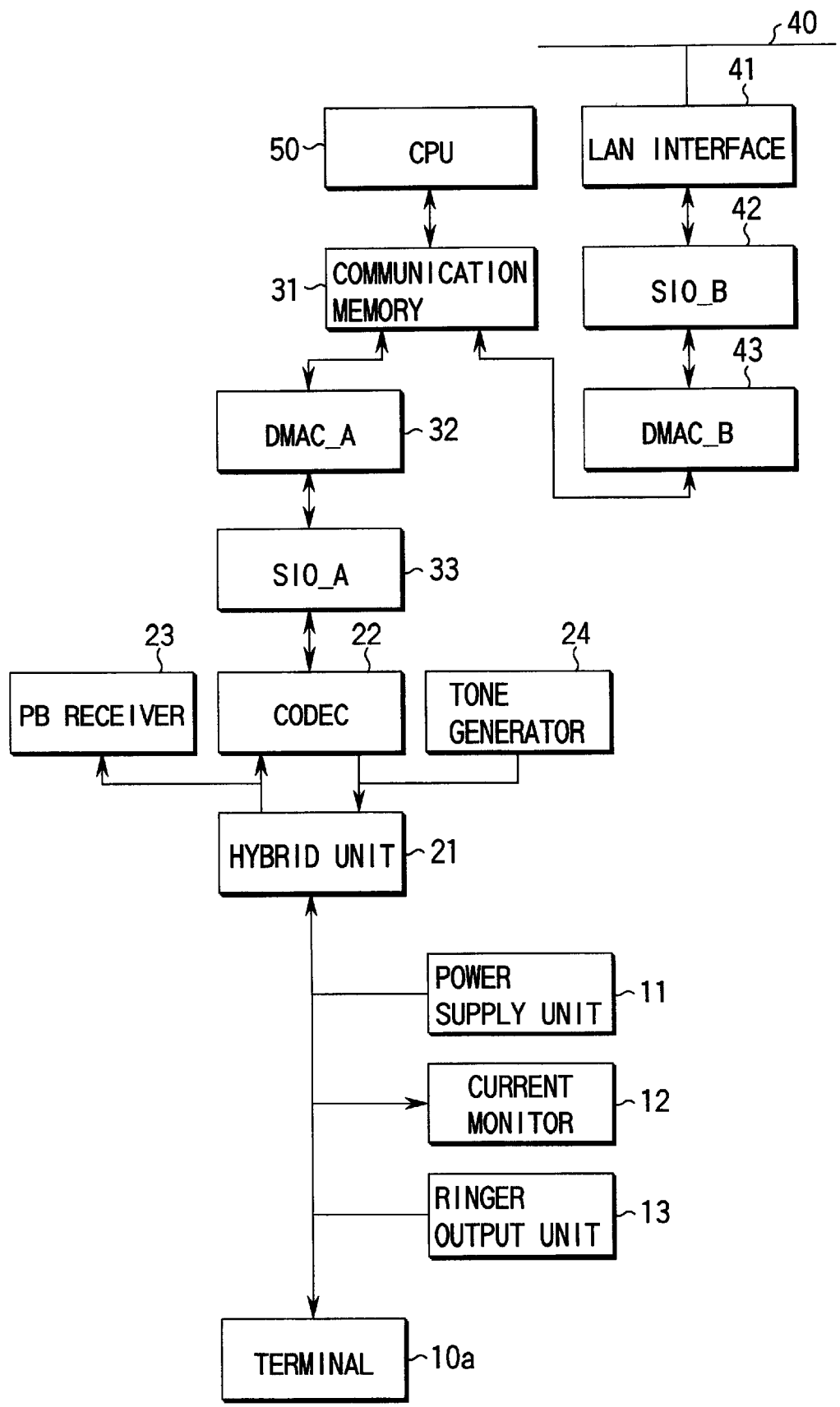
FIG. 40 is a block diagram showing an embodiment of a hub apparatus according to the present invention.

FIG. 40 is a block diagram showing an embodiment of a hub apparatus according to the present invention. The hub apparatus according to one embodiment of the present invention has a power supply unit 11, current monitor 12, ringer output unit 13, hybrid unit 21, CODEC 22, PB receiver 23, and tone generator 24. Furthermore, the hub according to the present invention comprises a communication memory 31, DMAC_A 32, SIO_A 33, LAN interface 41, SIO_B 42, DMAC_B 43, and CPU 50.

Normally, the power supply unit 11 to ringer output unit 13 are provided to the terminal side. Of these units, the ringer output unit 13 may be provided to the hub apparatus main body.

The functions of the respective units with the above arrangement are as follows.

The power supply unit 11 supplies a DC current to a terminal 10a. The current monitor 12 monitors the DC current on the line. The ringer output unit 13 outputs a ringer signal to the terminal 10a. The hybrid unit 21 performs two-wire/four-wire conversion of analog signals in the voice channel band. The CODEC 22 encodes or decodes signals. The PB receiver 23 decodes a PB signal from the terminal 10a. The tone generator 24 generates a call progress tone.

The communication memory 31 saves communication data. The DMAC_A 32 transfers encoded data between the communication memory 31 and SIO_A 33. The SIO_A 33 exchanges serial data with the CODEC 22, and exchanges parallel data with the DMAC_A 32. The LAN interface 41 communicates with a LAN 40. The SIO_B 42 exchanges serial data with the LAN interface 41, and exchanges parallel data with the DMAC_B 43. The DMAC_B 43 transfers packetized data between the communication memory 31 and SIO_B 42.

Note that the CPU 50 processes data on the communication memory 31 and controls the respective units.

The operation of the hub apparatus with the above-mentioned arrangement will be explained below.

Formation of a voice channel upon reception of a voice communication request from the LAN 40 will be explained first.

Upon receiving a communication request packet of an originating apparatus from the LAN 40, the LAN interface 41 transmits the packet to the SIO_B 42 as serial data. The SIO_B 42 converts the received serial data into parallel data. The parallel data converted by the SIO_B 42 is transferred to the communication memory 31 by the DMAC_B 43.

Upon completion of transfer to the communication memory 31, the CPU 50 analyzes the packet data stored in the communication memory 31. If the CPU 50 determines as a result of analysis that the received packet is a communication request to the terminal 10a, it checks the status of the terminal 10a. If the terminal 10a is idle, the CPU 50 controls the ringer output unit 13 to output a ringer signal to the terminal 10a so as to receive the call.

If the user of the terminal 10a answers the call and a DC loop is formed, the current monitor 12 detects the DC current supplied from the power supply unit 11, and informs the CPU 50 of it. Upon detecting the response, the CPU 50 informs the originating apparatus of that message using a response packet, and enables the CODEC 22 to form a communication channel between the originating apparatus and terminal 10a.

Note that the response packet is transmitted to the originating apparatus as follows. The response packet generated by the CPU 50 is stored in the communication memory 31. The DMAC_B 43 reads out this response packet from the communication memory 31 as parallel data, and transfers the parallel data to the SIO_B 42. The SIO_B 42 converts the parallel data into serial data, and transmits the serial data to the LAN interface 41. The LAN interface 41 packetizes the serial data in accordance with the protocol of the LAN 40, and transmits the packet to the originating apparatus.

A communication method (by means of, e.g., voice) when the voice channel has been formed in this way is as follows.

When an audio packet obtained by packetizing encoded audio data arrives at the communication memory 31 from the originating apparatus via the LAN interface 41, SIO_B 42, and DMAC_B 43 after a voice channel is formed, the CPU 50 stores audio data (parallel data) alone in another area of the communication memory 31. The DMAC_A 32 reads out the parallel audio data from the communication memory 31, and transfers that data to the SIO_A 33. The SIO_A 33 converts the parallel audio data into serial audio data, and outputs the serial audio data to the CODEC 22. The audio data is decoded by the CODEC 22, is converted from four-wire data into two-wire data by the hybrid unit 21, and is then output as an analog audio signal to the terminal 10a.

An analog audio signal output from the terminal 10a is converted from two-wire data into four-wire data by the hybrid unit 21, and is then output from the CODEC 22 as encoded serial data to the SIO_A 33. The SIO_A 33 converts the serial audio data into parallel audio data, which is transferred to the communication memory 31 by the DMAC_A 32. The audio data from the terminal 10a stored in the communication memory 31 is packetized by the CPU 50, and is stored in another area of the communication memory 31. The DMAC_B 43 reads out the audio packet from the communication memory 31 as parallel data, and transfers the parallel data to the SIO_B 42. The SIO_B 42 converts the parallel data into serial data, and transmits the serial data to the LAN interface 41. The LAN interface 41 packetizes the serial data in accordance with the protocol of the LAN 40, and transmits the packet to the originating apparatus.

A method of forming a communication channel upon receiving a call originating request from the terminal 10a is as follows.

When the user of the terminal 10a goes off-hook to form a DC loop, the current monitor 12 detects the DC current supplied from the power supply unit 11, and informs the CPU 50 of it. Upon detecting off-hook of the terminal 10a, the CPU 50 controls the terminal 10a to output a dial tone. When the terminal 10a outputs a selection signal after it confirms the dial tone, the PB receiver 23 decodes the selection signal and supplies it to the CPU 50. The CPU 50 specifies the terminating apparatus on the basis of the number of the selection signal, generates a communication request packet, and transmits the communication request packet to the LAN 40 via the communication memory 31, DMAC_B 43, SIO_B 42, and LAN interface 41 in the same procedure as that for transmitting a response packet to the originating apparatus, thus supplying the request packet to the terminating apparatus. Upon receiving a response packet from the terminating apparatus, the CPU 50 enables the CODEC 22 to form a communication channel between the terminal 10a and terminating apparatus.

Figure 41:
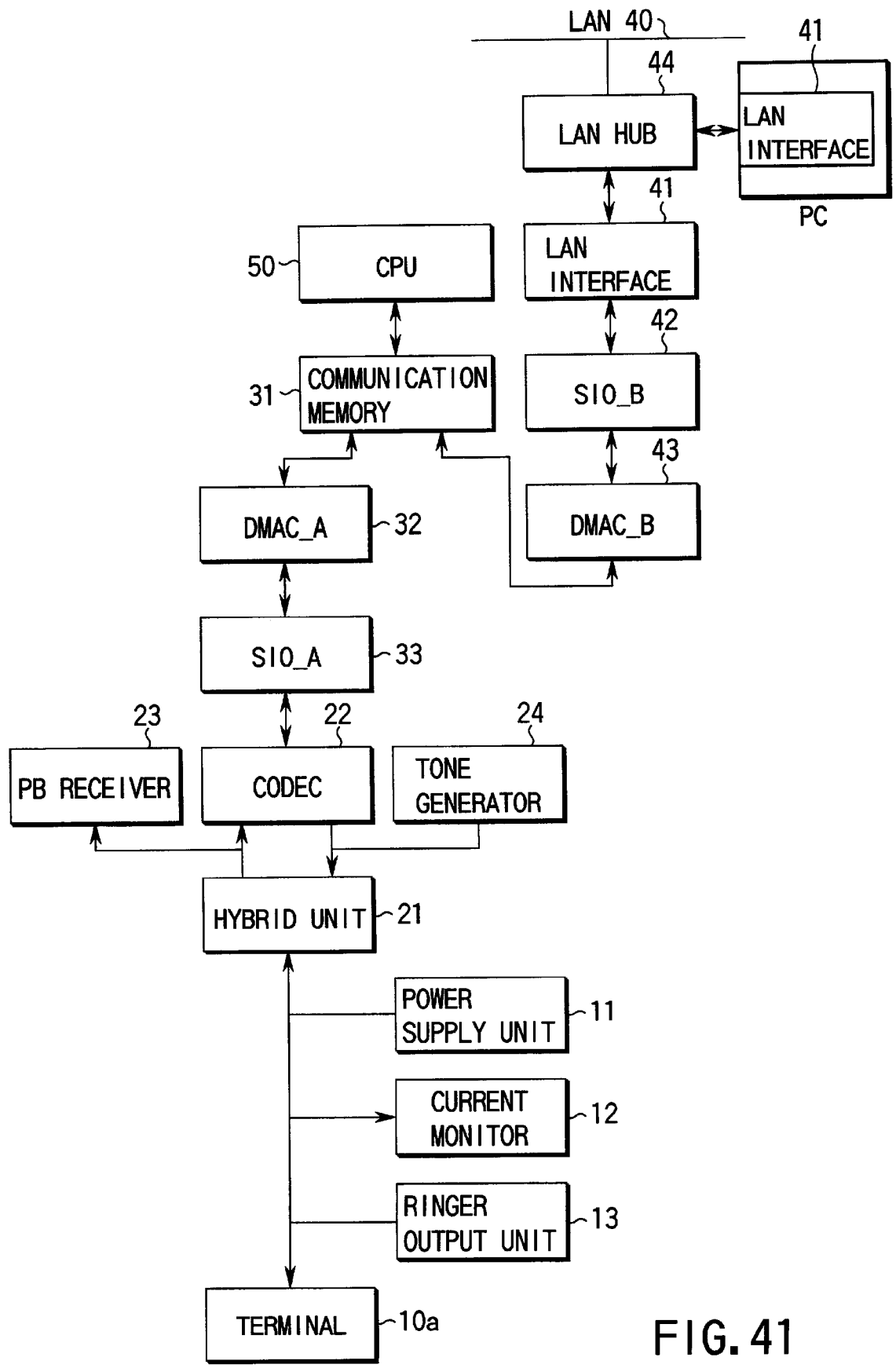
FIG. 41 is a block diagram showing the first modification of the hub apparatus shown in FIG. 40.

FIG. 41 is a block diagram showing the first modification of the hub apparatus shown in FIG. 40.

The hub apparatus according to the first modification is constructed by a power supply unit 11, current monitor 12, ringer output unit 13, hybrid unit 21, CODEC 22, PB receiver 23, tone generator 24, communication memory 31, DMAC_A 32, SIO_A 33, LAN interface 41, SIO_B 42, DMAC_43, CPU 50, and LAN hub 44.

The same reference numerals in FIG. 41 denote the same parts as those in FIG. 40, and a detailed description thereof will be omitted.

In this first modification, the LAN hub 44 is inserted between the LAN interface 41 and LAN 40, and serves a plurality of LAN interfaces 41, so that a plurality of hub apparatuses can be connected. Note that in FIG. 41 another LAN interface 41 connected to the LAN hub 44 is incorporated in, e.g., a personal computer PC.

The operation of the hub apparatus with the aforementioned arrangement will be explained below.

Formation of a voice channel upon receiving a voice communication request from the LAN 40 will be explained first.

Upon receiving a communication request packet of an originating apparatus from the LAN 40 served by the LAN hub 44, the LAN interface 41 transmits the packet to the SIO_B 42 as serial data. The SIO_B 42 converts the received serial data into parallel data. The parallel data converted by the SIO_B 42 is transferred to the communication memory 31 by the DMAC_B 43.

Upon completion of transfer to the communication memory 31, the CPU 50 analyzes the packet data stored in the communication memory 31. If the CPU 50 determines as a result of analysis that the received packet is a communication request to the terminal 10a, it checks the status of the terminal 10a. If the terminal 10a is idle, the CPU 50 controls the ringer output unit 13 to output a ringer signal to the terminal 10a so as to receive the call.

If the user of the terminal 10a answers the call and a DC loop is formed, the current monitor 12 detects the DC current supplied from the power supply unit 11, and informs the CPU 50 of it. Upon detecting the response, the CPU 50 informs the originating apparatus of that message using a response packet, and enables the CODEC 22 to form a communication channel between the originating apparatus and terminal 10a.

Note that the response packet is transmitted to the originating apparatus as follows. The response packet generated by the CPU 50 is stored in the communication memory 31. The DMAC_B 43 reads out this response packet from the communication memory 31 as parallel data, and transfers the parallel data to the SIO_B 42. The SIO_B 42 converts the parallel data into serial data, and transmits the serial data to the LAN interface 41. The LAN interface 41 packetizes the serial data in accordance with the protocol of the LAN 40, and transmits the packet to the originating apparatus via the LAN hub 44.

A communication method (by means of, e.g., voice) when a voice channel has been formed in this way is as follows.

When an audio packet obtained by packetizing encoded audio data arrives at the communication memory 31 from the originating apparatus via the LAN hub 44, LAN interface 41, SIO_B 42, and DMAC_B 43 after a voice channel is formed, the CPU 50 stores audio data (parallel data) alone in another area of the communication memory 31. The DMAC_A 32 reads out the parallel audio data from the communication memory 31, and transfers that data to the SIO_A 33. The SIO_A 33 converts the parallel audio data into serial audio data, and outputs the serial audio data to the CODEC 22. The audio data is decoded by the CODEC 22, is converted from four-wire data into two-wire data by the hybrid unit 21, and is then output as an analog audio signal to the terminal 10a.

An analog audio signal output from the terminal 10a is converted from two-wire data into four-wire data by the hybrid unit 21, and is the output from the CODEC 22 as encoded serial data to the SIO_A 33. The SIO_A 33 converts the serial audio data into parallel audio data, and the converted parallel data is transferred to the communication memory 31 by the DMAC_A 32. The audio data from the terminal 10a stored in the communication memory 31 is packetized by the CPU 50, and is stored in another area of the communication memory 31. The DMAC_B 43 reads out the audio packet from the communication memory 31 as parallel data, and transfers the parallel data to the SIO_B 42. The SIO_B 42 converts the parallel data into serial data, and transmits the serial data to the LAN interface 41. The LAN interface 41 packetizes the serial data in accordance with the protocol of the LAN 40, and transmits the packet to the originating apparatus via the LAN hub 44.

A method of forming a communication channel upon receiving a call originating request from the terminal 10a is as follows.

When the user of the terminal 10a goes off-hook to form a DC loop, the current monitor 12 detects the DC current supplied from the power supply unit 11, and informs the CPU 50 of it. Upon detecting off-hook of the terminal 10a, the CPU 50 controls the terminal 10a to output a dial tone. When the terminal 10a outputs a selection signal after it confirms the dial tone, the PB receiver 23 decodes the selection signal and supplies it to the CPU 50. The CPU 50 specifies the terminating apparatus on the basis of the number of the selection signal, generates a communication request packet, and transmits the communication request packet to the LAN 40 via the communication memory 31, DMAC_B 43, SIO_B 42, LAN interface 41, and LAN hub 44 in the same procedure as that for transmitting a response packet to the originating apparatus, thus supplying the request packet to the terminating apparatus. Upon receiving a response packet from the terminating apparatus, the CPU 50 enables the CODEC 22 to form a communication channel between the terminal 10a and terminating apparatus.

In the first modification, the LAN hub 44 can serve a PC 45 (personal computer) having the LAN interface 41, and the PC 45 can be served by the LAN 40.

Figure 42:
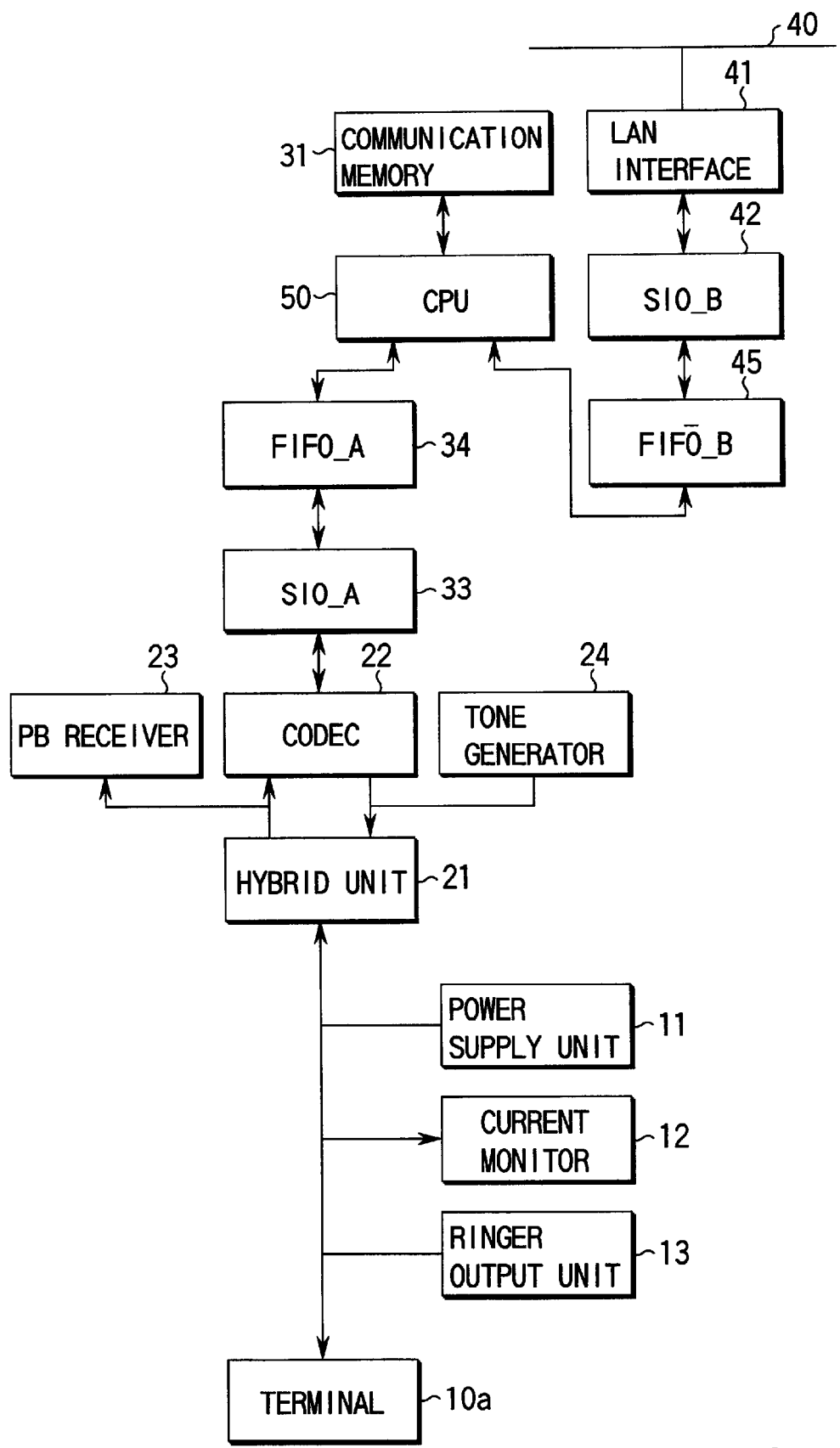
FIG. 42 is a block diagram showing the second modification of the hub apparatus shown in FIG. 40.

FIG. 42 is a block diagram showing the second modification of the hub apparatus shown in FIG. 40.

The hub apparatus according to the second modification is constructed by a power supply unit 11, current monitor 12, ringer output unit 13, hybrid unit 21, CODEC 22, PB receiver 23, tone generator 24, communication memory 31, FIFO_A 34, SIO_A 33, LAN interface 41, SIO_B 42, FIFO_B 45, and CPU 50.

The same reference numerals in FIG. 42 denote the same parts as those in FIG. 40, and a detailed description thereof will be omitted.

The second modification is characterized in that the FIFO_A 34 and FIFO_B 45 are provided respectively in place of the DMAC_A 32 and DMAC_B 43, and the communication memory 31 and CPU 50 replace each other. Note that the FIFO_A 34 and FIFO_B 45 as new building elements have the same function as that of the DMAC_A 32 and DMAC_B 43. That is, the FIFO_A 34 transfers encoded data between the CPU and SIO_A 33, and the FIFO_B 45 transfers packetized data between the communication memory 31 and SIO_B 42.

The operation of the hub apparatus with the aforementioned arrangement will be explained below.

Formation of a voice channel upon receiving a voice communication request from the LAN 40 will be explained first.

Upon receiving a communication request packet of an originating apparatus from the LAN 40, the LAN interface 41 transmits the packet to the SIO_B 42 as serial data. The SIO_B 42 converts the received serial data into parallel data. The parallel data converted by the SIO_B 42 is sequentially stored in the FIFO_B 45. The CPU 50 sequentially reads out the parallel data stored in the FIFO_B 45, and stores the readout data in the communication memory 31.

The CPU 50 analyzes the packet data stored in the communication memory 31. If the CPU 50 determines as a result of analysis that the received packet is a communication request to the terminal 10a, it checks the status of the terminal 10a. If the terminal 10a is idle, the CPU 50 controls the ringer output unit 13 to output a ringer signal to the terminal 10a so as to receive the call.

If the user of the terminal 10a answers the call and a DC loop is formed, the current monitor 12 detects the DC current supplied from the power supply unit 11, and informs the CPU 50 of it. Upon detecting the response, the CPU 50 informs the originating apparatus of that message using a response packet, and enables the CODEC 22 to form a communication channel between the originating apparatus and terminal 10a.

Note that the response packet is transmitted to the originating apparatus as follows. The response packet generated by the CPU 50 is stored in the FIFO_B 45. The SIO B 42 reads out this response packet from the FIFO_B 45 as parallel data, and converts the parallel data into serial data. Then, the SIO_B 42 transmits the serial data to the LAN interface 41. The LAN interface 41 packetizes the serial data in accordance with the protocol of the LAN 40, and transmits the packet to the originating apparatus.

A communication method (by means of, e.g., voice) when the voice channel has been formed in this way is as follows.

When an audio packet obtained by packetizing encoded audio data arrives from the originating apparatus via the LAN interface 41, SIO_B 42, and FIFO_B 45 after a voice channel is formed, the CPU 50 temporarily stores audio data (parallel data) in the communication memory 31 to separate the data, and then stores audio data alone in the FIFO_A 34. The parallel audio data stored in the FIFO_A 34 is sequentially read out by the SIO_A 33. The SIO_A 33 converts the parallel audio data into serial audio data, and outputs the serial audio data to the CODEC 22. The audio data is decoded by the CODEC 22, is converted from four-wire data into two-wire data by the hybrid unit 21, and is then output as an analog audio signal to the terminal 10a.

An analog audio signal output from the terminal 10a is converted from two-wire data into four-wire data by the hybrid unit 21, and is then output from the CODEC 22 as encoded serial data to the SIO_A 33. The SIO_A 33 converts the serial audio data into parallel audio data, and sequentially stores the converted data in the FIFO_A 34. The audio data from the terminal 10a stored in the FIFO_A 34 is transferred to the communication memory 31 by the CPU 50, is packetized by the CPU 50, and is then stored in the FIFO_B 45. The audio packet stored in the FIFO_B 45 is read out as parallel data by the SIO_B 42, and is converted into serial data. The serial data is transmitted to the LAN interface 41. The LAN interface 41 packetizes the data in accordance with the protocol of the LAN 40, and transmits the packet to the originating apparatus.

A method of forming a communication channel upon receiving a call originating request from the terminal 10a is as follows.

When the user of the terminal 10a goes off-hook to form a DC loop, the current monitor 12 detects the DC current supplied from the power supply unit 11, and informs the CPU 50 of it. Upon detecting off-hook of the terminal 10a, the CPU 50 controls the terminal 10a to output a dial tone. When the terminal 10a outputs a selection signal after it confirms the dial tone, the PB receiver 23 decodes the selection signal and supplies it to the CPU 50. The CPU 50 specifies the terminating apparatus on the basis of the number of the selection signal, generates a communication request packet, and transmits the communication request packet to the LAN 40 via the FIFO_B 45, SIO_B 42, and LAN interface 41, in the same procedure as that for transmitting the response packet to the originating apparatus, thus supplying the request packet to the terminating apparatus. Upon receiving a response packet from the terminating apparatus, the CPU 50 enables the CODEC 22 to form a communication channel between the terminal 10a and terminating apparatus.

An example of the ISDN router apparatus will be explained in detail below.

Figure 43:
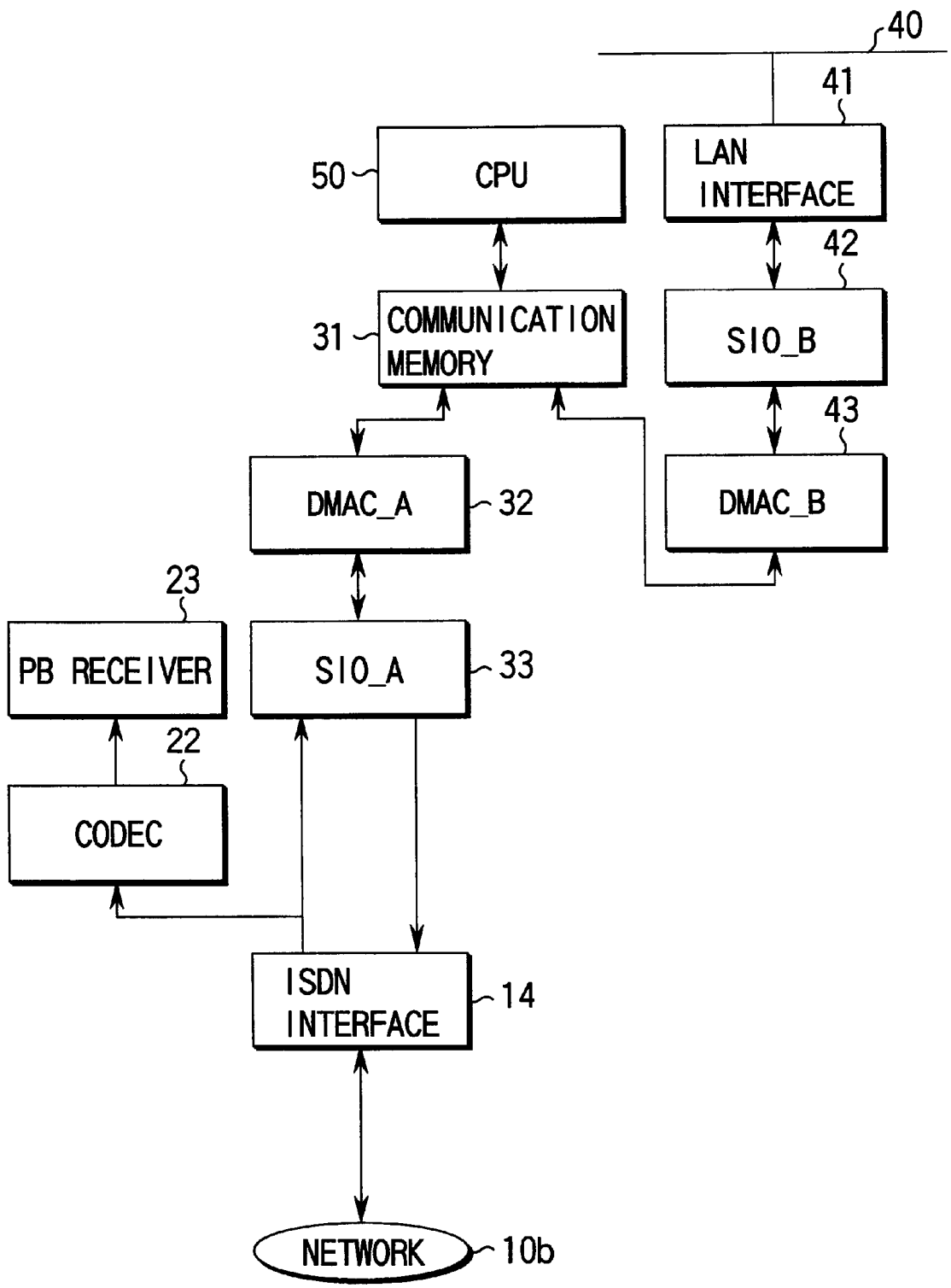
FIG. 43 is a block diagram showing an embodiment of an ISDN router apparatus according to the present invention.

FIG. 43 is a block diagram showing an embodiment of an ISDN router apparatus according to the present invention. The ISDN router apparatus according to one embodiment of the present invention is constructed by an ISDN interface 14, CODEC 22, PB receiver 23, communication memory 31, DMAC_A 32, SIO_A 33, LAN interface 41, SIO_B 42, DMAC_B 43, and CPU 50.

The same reference numerals in FIG. 43 denote the same parts as those in FIG. 40, and a detailed description thereof will be omitted.

The ISDN router apparatus is different from the hub apparatus shown in FIG. 40 in that it does not require any functions (for example, the power supply unit 11, current monitor 12, and the like in FIG. 40) inherent to the terminal 10*a* shown in FIG. 40, and comprises the ISDN interface 14 in place of such functions. The ISDN interface 14 communicates with an ISDN network 10*b* and this apparatus.

The operation of the ISDN router apparatus with the aforementioned arrangement will be explained below.

Formation of a communication channel upon receiving a call terminating request from a LAN 40 will be explained below.

Upon receiving a communication request packet of an originating apparatus from the LAN 40, the LAN interface 41 transmits the packet to the SIO_B 42 as serial data. The SIO_B 42 converts the received serial data into parallel data. The parallel data converted by the SIO_B 42 is transferred to the communication memory 31 by the DMAC_B 43.

Upon completion of transfer to the communication memory 31, the CPU 50 analyzes the packet data stored in the communication memory 31. If the CPU 50 determines as a result of analysis that the packet is a communication request to the ISDN network 10*b*, it checks the status of the network. If the network is idle, the CPU 50 starts communication processing via the ISDN interface 14.

Upon detecting a response from the ISDN network 10*b*, the CPU 50 transmits a response packet to the originating apparatus to form a communication channel between the originating apparatus and ISDN network 10*b*.

Note that the response packet is transmitted to the originating apparatus as follows. The response packet generated by the CPU 50 is stored in the communication memory 31. The DMAC_B 43 reads out this response packet from the communication memory 31 as parallel data, and transfers the parallel data to the SIO_B 42. The SIO_B 42 converts the parallel data into serial data, and transmits the serial data to the LAN interface 41. The LAN interface 41 packetizes the serial data in accordance with the protocol of the LAN 40, and transmits the packet to the originating apparatus.

A communication method after the voice channel is formed in this way is as follows.

When an audio packet obtained by packetizing encoded audio data arrives at the communication memory 31 from the originating apparatus via the LAN interface 41, SIO_B 42, and DMAC_B 43 after a voice channel is formed, the CPU 50 stores audio data (parallel data) alone in another area of the communication memory 31. The DMAC_A 32 reads out the parallel audio data from the communication memory 31, and transfers the readout data to the SIO_A 33. The SIO_A 33 converts the parallel audio data into serial audio data and outputs the serial audio data to the ISDN interface 14. The ISDN interface 14 sends the audio data to the ISDN network 10*b* via a Bch.

Audio data on the Bch received from the ISDN network 10*b* is output from the ISDN interface 14 to the SIO_A 33 and CODEC 22. The SIO_A 33 converts serial audio data into parallel audio data, which is transferred to the communication memory 31 by the DMAC_A 32. The audio data from the ISDN network 10*b* stored in the communication memory 31 is packetized by the CPU 50, and is stored in another area of the communication memory 31. The DMAC_B 43 reads out the audio packet from the communication memory 31 as parallel data, and transfers the parallel data to the SIO_B 42. The SIO_B 42 converts the parallel data into serial data, and transmits the serial data to the LAN interface 41. The LAN interface 41 packetizes the serial data in accordance with the protocol of the LAN 40, and transmits the packet to the originating apparatus.

The CODEC 22 decodes the audio data and transmits the decoded audio data to the PB receiver 23. Upon receiving a PB signal in the audio data, the PB receiver 23 decodes the PB signal, and supplies it to the CPU 50.

A method of forming a communication channel upon receiving a call from the ISDN network 10*b* is as follows.

Upon detecting a communication request from the ISDN network 10*b*, the CPU 50 specifies the terminating apparatus from the terminating number. Then, the CPU 50 generates a communication request packet, and transmits the packet to the LAN 40 via the communication memory 31, DMAC_B 43, SIO_B 42, and LAN interface 41 in the same procedure as that for transmitting the response packet to the originating apparatus, thus supplying the packet to the terminating apparatus. Upon receiving a response packet from the terminating apparatus, the CPU 50 performs communication processing via the ISDN interface 14 to form a communication channel, and enables the CODEC 22 to receive a PB signal on the Bch from the ISDN network 10*b*.

An example of a public network router apparatus will be described in detail below.

Figure 44:
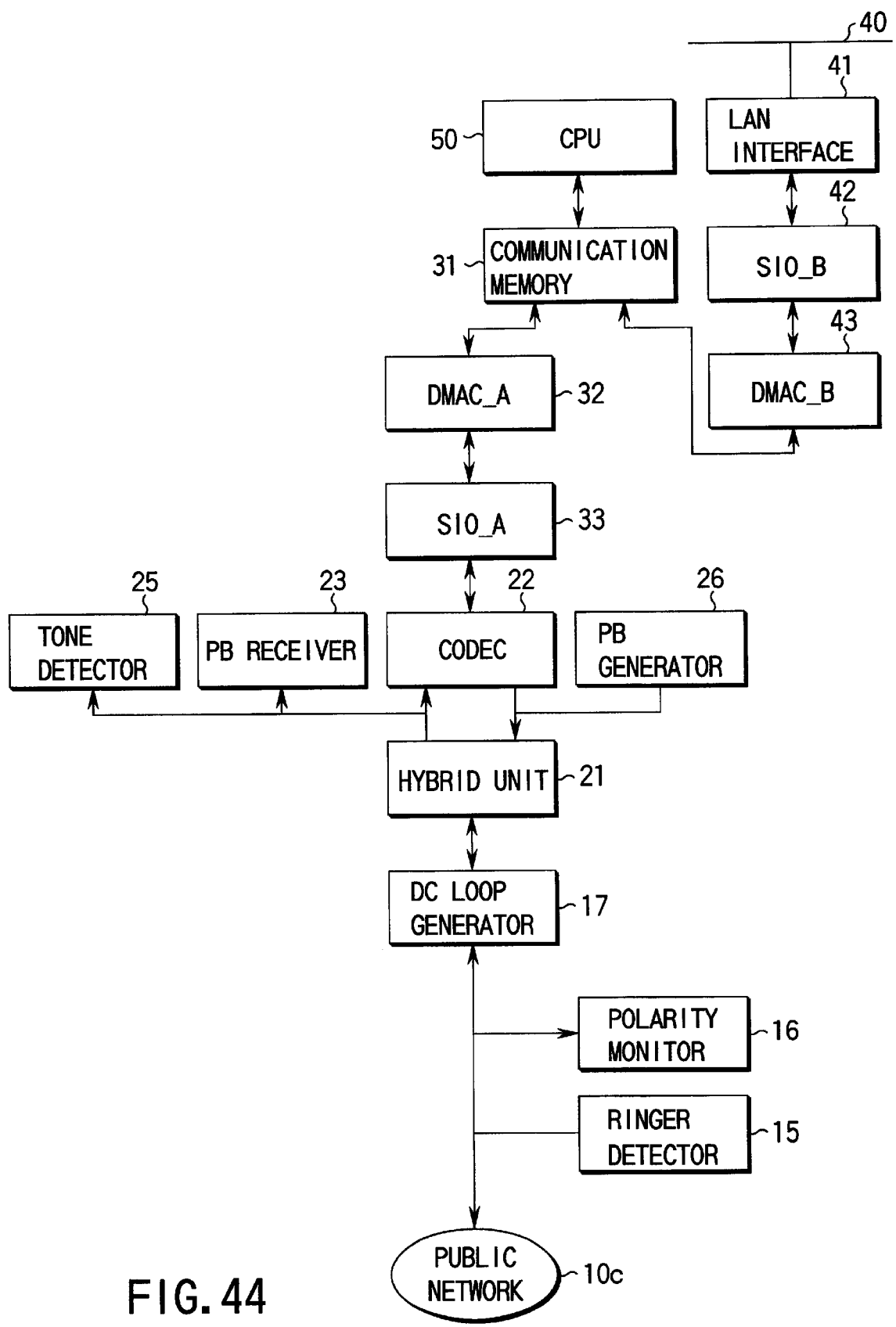
FIG. 44 is a block diagram showing an embodiment of a public network router apparatus according to the present invention.

FIG. 44 is a block diagram showing an embodiment of a public network router apparatus according to the present invention. The public network router apparatus according to one embodiment of the present invention is constructed by a ringer detector 15, polarity monitor 16, DC loop generator 17, hybrid unit 21, CODEC 22, PB receiver 23, tone detector 25, PB signal generator 26, communication memory 31, DMAC_A 32, SIO_A 33, LAN interface 41, SIO_B 42, DMAC_B 43, and CPU 50.

The same reference numerals in FIG. 44 denote the same parts as those in FIG. 40, and a detailed description thereof will be omitted.

The public network router is different from the hub apparatus shown in FIG. 40 in that the DC loop generator 17 replaces the power supply unit 11, the polarity monitor 16 replaces the current monitor 12, the ringer detector 15 replaces the ringer output unit 13, and the tone detector 25 and PB generator 26 replace the tone generator 24, since a public network 10*c* is connected in place of the terminal 10*a* shown in FIG. 40.

Referring to FIG. 44, the ringer detector 15 detects a ringer signal from the public network 10*c*. The polarity monitor 16 monitors the polarity of the network. The DC loop generator 17 opens/closes the DC circuit. The tone detector 25 detects a call progress tone. The PB signal generator 26 outputs a PB signal. Since other constructing elements are the same as those in FIG. 40, a description thereof will be omitted.

The operation of the public network router apparatus with the above-mentioned arrangement will be explained below.

Formation of a voice channel upon reception of a voice communication request from the LAN 40 will be explained first.

Upon receiving a communication request packet of an originating apparatus from the LAN 40, the LAN interface 41 transmits the packet to the SIO_B 42 as serial data. The SIO_B 42 converts the received serial data into parallel data. The parallel data converted by the SIO_B 42 is transferred to the communication memory 31 by the DMAC_B 43.

Upon completion of transfer to the communication memory 31, the CPU 50 analyzes the packet data stored in the communication memory 31. If the CPU 50 determines as a result of analysis that the received packet is a communication request to the public network 10c, it checks the status of the network. If the network is idle, the DC loop generator 17 forms a DC loop to inform the public network 10c of the communication request.

When the tone detector 25 detects a dial tone from the public network 10c and informs the CPU 50 of it, the CPU 50 outputs a selection signal from the PB generator 26 onto the public network 10c. The polarity monitor 16 monitors the polarity of the network. When the public network 10c responds by inverting the polarity, the polarity monitor 16 detects it and informs the CPU 50 of the response. Upon detecting the response, the CPU 50 informs the originating apparatus of that message using a response packet, and enables the CODEC 22 to form a communication channel between the originating apparatus and public network 10c.

Note that the response packet is transmitted to the originating apparatus as follows. The response packet generated by the CPU 50 is stored in the communication memory 31. The DMAC_B 43 reads out this response packet from the communication memory 31 as parallel data, and transfers the parallel data to the SIO_B 42. The SIO_B 42 converts the parallel data into serial data, and transmits the serial data to the LAN interface 41. The LAN interface 41 packetizes the serial data in accordance with the protocol of the LAN 40, and transmits the packet to the originating apparatus.

A communication method (by means of, e.g., voice) when the voice channel has been formed in this way is as follows.

When an audio packet obtained by packetizing encoded audio data arrives at the communication memory 31 from the originating apparatus via the LAN interface 41, SIO_B 42, and DMAC_B 43 after a voice channel is formed, the CPU 50 stores audio data (parallel data) alone in another area of the communication memory 31. The DMAC_A 32 reads out the parallel audio data from the communication memory 31, and transfers that data to the SIO_A 33. The SIO_A 33 converts the parallel audio data into serial audio data, and outputs the serial audio data to the CODEC 22. The audio data is decoded by the CODEC 22, is converted from four-wire data into two-wire data by the hybrid unit 21, and is then output as an analog audio signal onto the public network 10c.

An analog audio signal output from the terminal 10a is converted from two-wire data into four-wire data by the hybrid unit 21, and is the output from the CODEC 22 as encoded serial data to the SIO_A 33. The SIO_A 33 converts the serial audio data into parallel audio data, and the converted parallel data is transferred to the communication memory 31 by the DMAC_A 32. The audio data from the public network 10c stored in the communication memory 31 is packetized by the CPU 50, and is stored in another area of the communication memory 31. The DMAC_B 43 reads out the audio packet from the communication memory 31 as parallel data, and transfers the parallel data to the SIO_B 42. The SIO_B 42 converts the parallel data into serial data, and transmits the serial data to the LAN interface 41. The LAN interface 41 packetizes the serial data in accordance with the protocol of the LAN 40, and transmits the packet to the originating apparatus.

A method of forming a communication channel upon receiving a call originating request from the public network 10c is as follows.

Upon detecting a ringer signal from the public network 10c, the ringer detector 15 informs the CPU 50 of it. The CPU 50 controls the DC loop generator 17 to form a DC loop and waits for a selection signal. When the public network 10c outputs a selection signal, the PB receiver 23 decodes and supplies it to the CPU 50. The CPU 50 specifies the terminating apparatus on the basis of the number of the selection signal, controls the DC loop generator 17 to open a DC loop, generates a communication request packet, and transmits the packet to the LAN 40 via the communication memory 31, DMAC_B 43, SIO_B 42, and LAN interface 41 in the same procedure as that for transmitting the response packet to the originating apparatus, thus supplying the request packet to the terminating apparatus. Upon receiving a response packet from the terminating apparatus, the CPU 50 controls the DC loop generator 17 to form a DC loop again, and enables the CODEC 22 to form a communication channel between the public network 10c and terminating apparatus. The public network 10c re-inverts the polarity to become ready to communicate.

An example of a radio hub apparatus will be explained in detail below.

Figure 45:
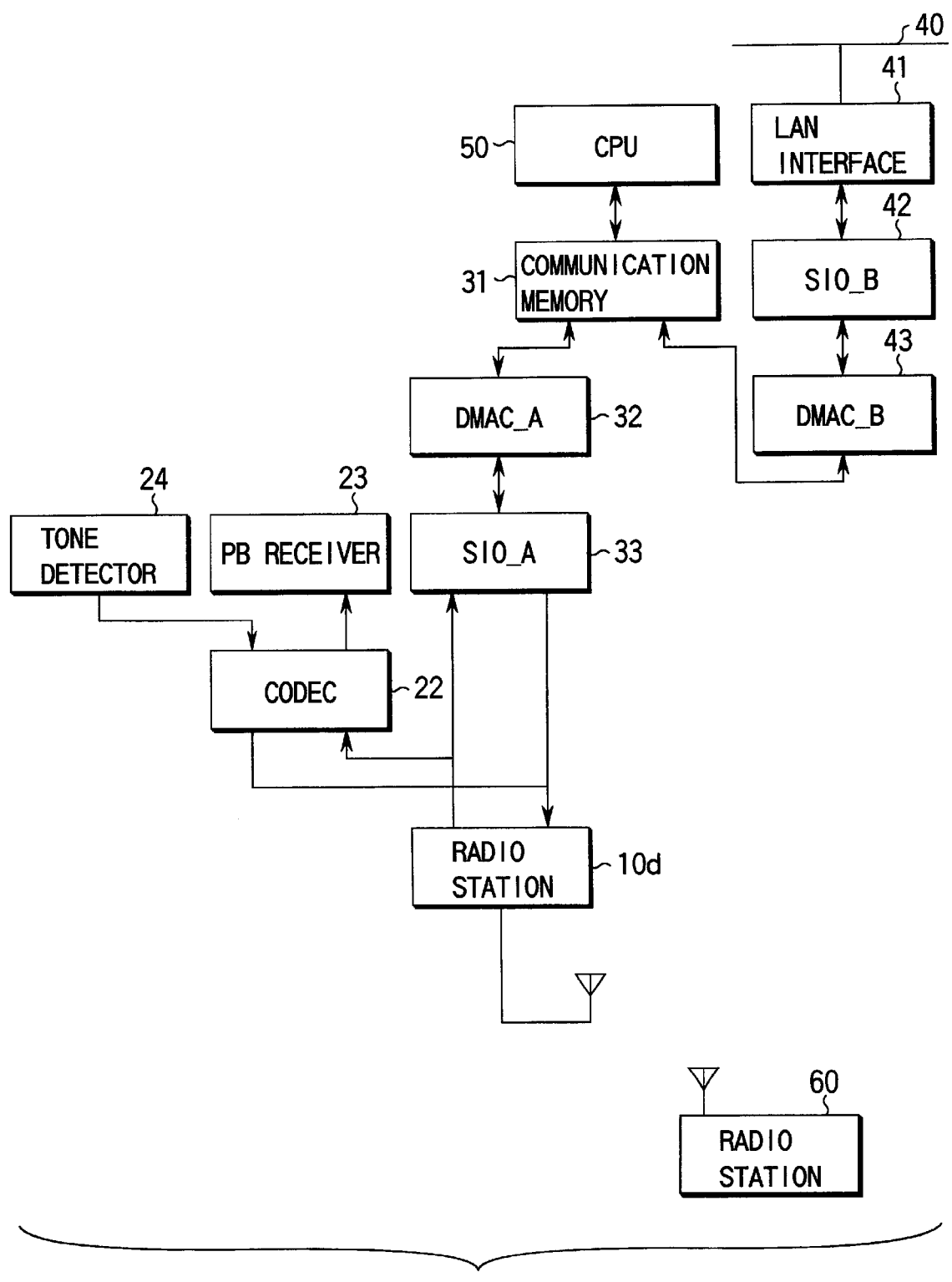
FIG. 45 is a block diagram showing an embodiment of a radio hub apparatus according to the present invention.

FIG. 45 is a block diagram showing an embodiment of a radio hub apparatus according to the present invention. The radio hub apparatus according to one embodiment of the present invention is constructed by a radio unit 10d, CODEC 22, PB receiver 23, tone generator 24, communication memory 31, DMAC_A 32, SIO_A 33, LAN interface 41, SIO_B 42, DMAC_B 43, and CPU 50.

The same reference numerals in FIG. 45 denote the same parts as those in FIG. 40, and a detailed description thereof will be omitted.

The radio hub apparatus is different from the hub apparatus shown in FIG. 40 in that the radio unit 10d replaces the hybrid unit 21 to the terminal 10a in FIG. 40, and can communicate with a radio station 60 via radio.

Note that the radio unit 10d transmits/receives a radio wave to/from the radio station 60.

The operation of the radio hub apparatus with the above-mentioned arrangement will be explained below.

Formation of a voice channel upon reception of a call terminating request from the LAN 40 will be explained first.

Upon receiving a communication request packet of an originating apparatus from the LAN 40, the LAN interface 41 transmits the packet to the SIO_B 42 as serial data. The SIO_B 42 converts the received serial data into parallel data. The parallel data converted by the SIO_B 42 is transferred to the communication memory 31 by the DMAC_B 43.

Upon completion of transfer to the communication memory 31, the CPU 50 analyzes the packet data stored in the communication memory 31. If the CPU. 50 determines as a result of analysis that the received packet is a communication request to the radio station 60, it checks the status of the radio station 60. If the radio station 60 is idle, the CPU 50 starts communication processing via the radio unit 10d.

Upon detecting a response from the radio station, the CPU 50 informs the originating apparatus of that message using a response packet to form a communication channel between the originating apparatus and radio station 60.

Note that the response packet is transmitted to the originating apparatus as follows. The response packet generated by the CPU 50 is stored in the communication memory 31. The DMAC_B 43 reads out this response packet from the communication memory 31 as parallel data, and transfers the parallel data to the SIO_B 42. The SIO_B 42 converts the parallel data into serial data, and transmits the serial data to the LAN interface 41. The LAN interface 41 packetizes the serial data in accordance with the protocol of the LAN 40, and transmits the packet to the originating apparatus.

A communication method used when the voice channel has been formed in this way is as follows.

When an audio packet obtained by packetizing encoded audio data arrives at the communication memory 31 from the originating apparatus via the LAN interface 41, SIO_B 42, and DMAC_B 43 after a voice channel is formed, the CPU 50 stores audio data (parallel data) alone in another area of the communication memory 31. The DMAC_A 32 reads out the parallel audio data from the communication memory 31, and transfers that data to the SIO_A 33. The SIO_A 33 converts the parallel audio data into serial audio data, and outputs the serial audio data to the radio unit 10d. The radio unit 10d outputs the audio data to the radio station 60 on a radio wave.

Audio data on a radio wave received from the radio station 60 is output from the radio unit 10d to the SIO_A 33 and CODEC 22. The SIO_A 33 converts the serial audio data into parallel audio data, which is transferred to the communication memory 31 by the DMAC_A 32. The audio data from the radio station 60 stored in the communication memory 31 is packetized by the CPU 60, and is stored in another area of the communication memory 31. The DMAC_B 43 reads out the audio packet from the communication memory 31 as parallel data and transfers the readout data to the SIO_B 42. The SIO_B 42 converts the parallel data into serial data and transmits the serial data to the LAN interface 41. The LAN interface 41 packetizes the serial data in accordance with the protocol of the LAN 40 and transmits the packet to the originating apparatus.

The CODEC 22 decodes the audio data and transmits the decoded audio data to the PB receiver 23. Upon receiving a PB signal in the audio data, the PB receiver 23 decodes the PB signal, and supplies it to the CPU 50.

A method of forming a communication channel upon receiving a call originating request from the radio station is as follows.

Upon detecting a communication request from the radio station 60, the CPU 50 specifies the terminating apparatus from the terminating number. Subsequently, the CPU 50 generates a communication request packet, and transmits the packet to the LAN 40 via the communication memory 31, DMAC_B 43, SIO_B 42, and LAN interface 41 in the same procedure as that for transmitting the response packet to the originating apparatus, thus supplying the request packet to the terminating apparatus. In addition, the CPU 50 controls the tone generator 24 to output a call progress tone to the radio station 60. Upon receiving a response packet from the terminating apparatus, the CPU 50 executes communication processing via the radio unit 10d to form a communication channel, and enables the CODEC 22 to receive a PB signal from the radio station 60.

As described above, according to the present invention, the data conversion processes of the respective terminal apparatuses are distributed to communication interface apparatuses corresponding to the terminal apparatuses as in the above-mentioned examples, and each communication interface apparatus need only have a data conversion function between, e.g., one type of communication protocol on the terminal apparatus side and only one type of communication protocol on the first communication network (the LAN in this embodiment) side, and need not have all data conversion functions corresponding to a plurality of types of communication protocols versus a plurality of types of communication protocols.

Hence, according to the present invention, a plurality of kinds of communications can be implemented by a common communication infrastructure (e.g., the LAN) without requiring any large-scale equipment such as a PBX, gateway, and the like.

As described in detail above, in a multimedia information communication system according to one embodiment of the present invention, a radio base station, analog telephone hub apparatus, business telephone hub apparatus, and hub apparatus for a personal computer are connected as communication interface apparatuses for extension terminals to the LAN, and respectively serve extension terminals. Furthermore, an ISDN router apparatus and PSTN router apparatus are connected as communication interface apparatuses for outside lines to the LAN, and these router apparatuses connect the LAN to an ISDN and PSTN. Each communication interface for the extension performs protocol conversion and data conversion between each extension terminal and LAN, and each communication interface apparatus for the outside line performs protocol conversion and data conversion between the LAN and public network.

Therefore, according to the above-mentioned embodiment, both an audio signal transmitted from an analog telephone and data transmitted from a data terminal such as a personal computer or the like are converted into a single data format corresponding to the communication protocol of the LAN by the corresponding hub apparatuses, and the converted data are then output onto the LAN. Data transferred on the LAN is converted into a data format corresponding to the communication protocol of a given extension terminal by a terminating hub apparatus, and is then sent to the extension terminal. For this reason, a plurality of kinds of communications can be implemented using a single infrastructure, i.e., a core (first) communication network (e.g., the LAN).

In addition, data conversion processes that pertain to the individual extension terminals are distributed to the corresponding hub apparatuses, and each hub apparatus need only have a data conversion function between only one type of communication protocol corresponding to its extension terminal, and only one type of communication protocol for the LAN on the LAN 1 side but need not have data conversion functions of all the combinations corresponding to a plurality of types of communication protocols versus a plurality of types of communication protocols. Hence, no large-scale communication equipment for integrated processing such as double PBXs, gateway, and the like is required, and a system can be realized by preparing a plurality of hub apparatuses having simple functions, thus attaining a simple system arrangement and a great cost reduction.

Upon connecting a new extension terminal or changing connections, after an arbitrary extension terminal is connected to the LAN 1 via a hub apparatus, a simple setup process need only be done without requiring any complicated setups. Consequently, a system which has high expandability and allows easy maintenance- management can be provided.

Figure 46:
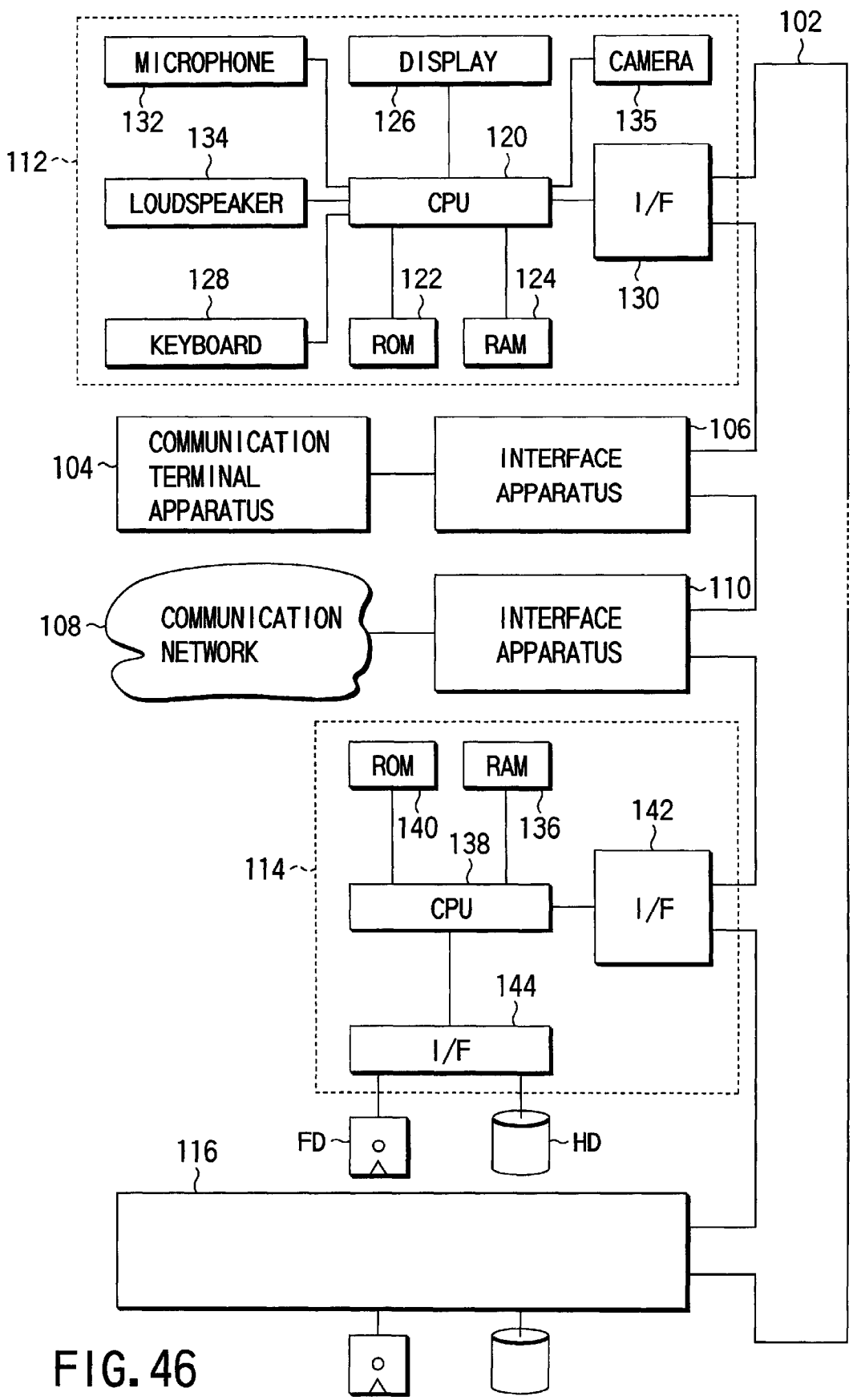
FIG. 46 is a schematic diagram showing the second embodiment of a multimedia information communication system according to the present invention.

The second embodiment of a multimedia information communication system according to the present invention will be explained below. FIG. 46 is a schematic diagram showing the arrangement of a CTI (Computer Telephony Integration) system according to the second embodiment.

The aforementioned embodiment has exemplified the LAN using Ethernet as means for connecting the respective communication interface apparatuses. However, this embodiment will exemplify a case wherein the respective apparatuses are connected using an IEEE1394 interface, which is a kind of serial interface, and is beginning to be used as a home bus or the like in recent years. However, in the second embodiment as well, the respective apparatuses may be connected using a LAN (may use either Ethernet or other networks), and another interface such as a USB (Universal Serial Bus) or the like may be used in place of IEEE1394.

Note that as a communication protocol for packets on a network in this embodiment, an RTP (Real Time Transparent Protocol) that can transfer audio and video data in real time is used to cope with an audio meeting, video meeting, and the like.

A communication terminal apparatus 104 is connected to a network 102 via an interface apparatus 106. Note that the IEEE1394 interface connects two apparatuses in daisy-chain to form a network. The communication terminal apparatus includes a standard telephone, multi-functional digital telephone, video telephone, facsimile apparatus, master unit of a PHS system, terminal apparatus of a video meeting system, and the like.

A communication network 108 is connected to the network 102 via an interface apparatus 110. The communication network includes a public network (PSTN), ISDN network, frame relay network, and the like. The interface apparatuses 110 and 106 have basically the same arrangement, which is shown in detail in FIG. 47.

A personal computer 112 having a telephone function is connected to the network 102 as a communication terminal apparatus. The personal computer has a microphone 132, loudspeaker 134, and television camera 135 in addition to a CPU 120, ROM 122, RAM 124, keyboard 126, display 128, and network interface 130 as in a normal one. The CPU 120 converts an audio signal and video signal from the network interface 130 into those for the loudspeaker 134 and display 126, and outputs the converted signals. Also, the CPU 120 converts signals from the microphone 132 and camera 135 into those for the network interface 130, and outputs the converted signals.

CTI servers 114 and 116 for controlling communications between communication terminal apparatuses are connected to the network 102. Note that one of the two servers is a backup server, and the two servers need not operate at the same time. For this reason, in order to double the control function, two physically different servers need not always be provided, and a single server may functionally double the control. Furthermore, the control function may be distributed to the respective interface apparatuses without being concentrated on a single server. Even when the CTI server is provided, each interface apparatus may have a simple communication control function. The CTI servers 114 and 116 have the same arrangement, i.e., have a CPU 138, ROM 140, RAM 136, network interface 142, and external storage interface 144. The external storage interface 144 serves a floppy disk FD, hard disk HD, and the like.

Figure 47:
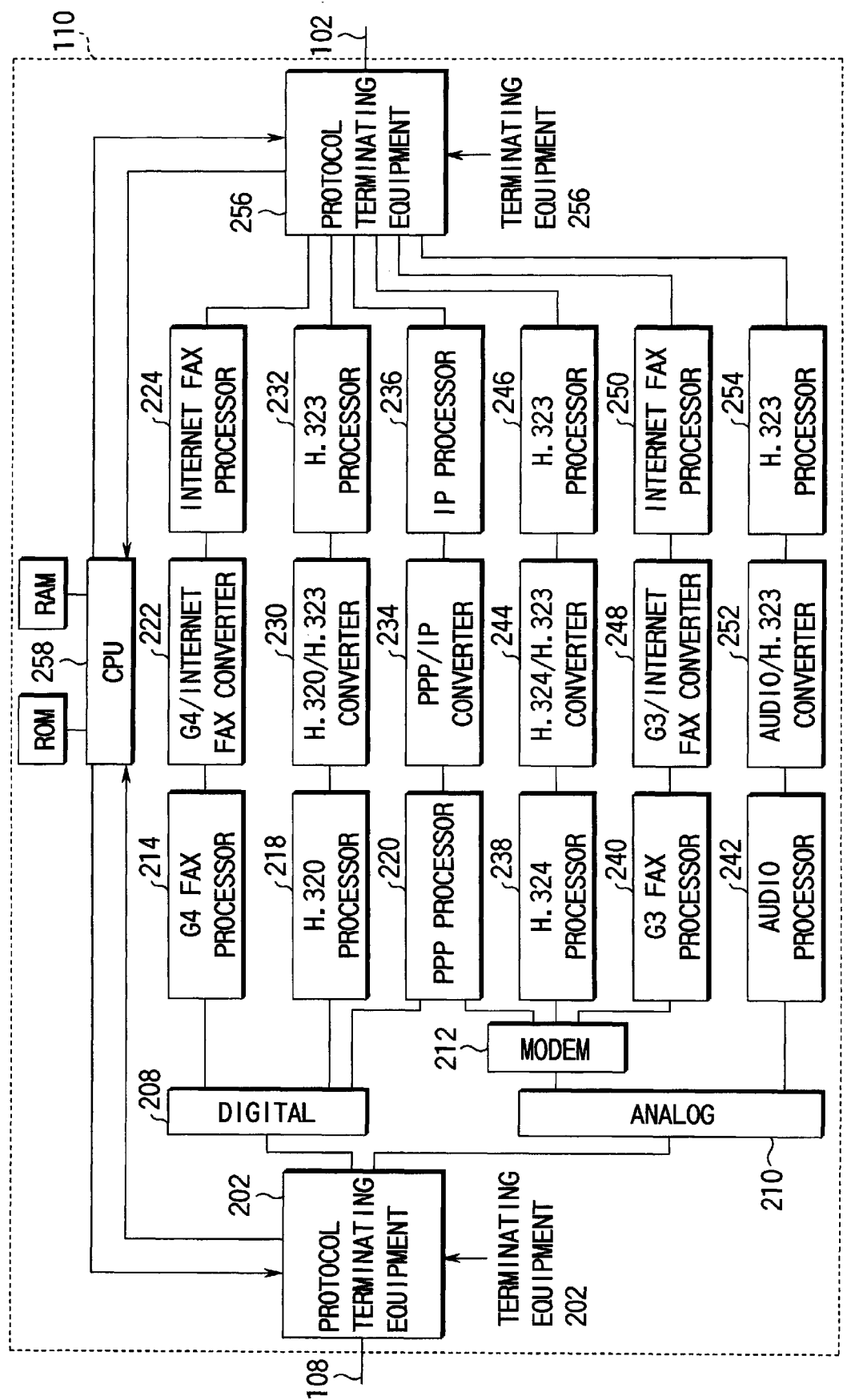
FIG. 47 is a block diagram showing the arrangement of an interface apparatus shown in FIG. 46 in detail.

FIG. 47 is a block diagram showing the arrangement of the interface apparatus 110 connected to a communication network, especially, the ISDN network. The interface apparatus 110 converts between the communication protocol of the communication network 108 and that of the network 102. The ISDN network is connected to a protocol terminating equipment 202. The terminating equipment 202 separates signals coming from the ISDN network into digital and analog signals, and respectively supplies these signals to a digital signal processor 208 and analog signal processor 210. The digital signal processor 208 and analog signal processor 210 serve as selection switches for respectively analyzing the digital and analog signals from the protocol terminating equipment 202 and supplying the analyzed signals to predetermined processing circuits at their output side.

A G4 FAX processor 214, H.320 processor 218, PPP (point-to-point protocol) processor 220, and the like are connected to the digital signal processor 208. The output from the G4 FAX processor 214 is supplied to an internet FAX processor via a G4FAX/internet FAX protocol converter 222. The output from the H.320 processor 218 is supplied to an H323 processor 232 via an H.320/H.323 protocol converter 230. The output from the PPP processor 220 is supplied to an IP processor 236 via a PPP/IP (internet protocol) converter 234.

A modem 212 and audio processor 242 are connected to the analog signal processor 210. The PPP processor 220, an H.324 processor 238, a G3 FAX processor 240, and the like are connected to the modem 212. The output from the H.324 processor 238 is supplied to an H.323 processor 246 via an H.324/H.323 protocol converter 244. The output from the G3 FAX processor 240 is supplied to an internet FAX processor 250 via a G3 FAX/internet FAX protocol converter 248. The output from the audio processor 242 is supplied to an H.323 processor 254 via an audio/H.323 protocol converter 254.

The outputs from the internet FAX protocol unit 224, H.323 processor 232, IP processor 236, H.323 processor 246, internet FAX processor 250, and H.323 processor 254 are connected to the network 102 via a protocol terminating equipment 256.

That is, the interface apparatus 110 has a function of terminating protocols such as G3 FAX, H.324, and PPP connection by means of audio and analog modem data, and PPP connection, H.320 TV meeting, G4FAX, and the like by means of digital communications, as the communication procedures on the ISDN network, a function of terminating H.323, internet FAX protocol, IP connection, and the like as the corresponding protocols on the network, and a protocol conversion function of converting these protocols to each other. The ISDN 108 and network 102 are connected to each other by switching switches in the terminating equipments 202 and 256 in correspondence with a communication protocol at the beginning of or during a communication to select a required protocol conversion section. A CPU 258 controls the terminating equipments 202 and 256 to select a connection protocol. As described above, the CPU 258 may have a portion of the communication connection control function of the CTI servers 114 and 116. Note that the protocol converters may be implemented by software by the CPU 258 instead of hardware.

Note that the interface apparatus 110 need not always include all the components of the arrangement shown in FIG. 47, and need only have converters corresponding to the protocols of the communication network 108. Similarly, the interface apparatus 106 connected to the communication terminal apparatus 104 need not always include all the components of the arrangement shown in FIG. 47, and need only have converters corresponding to the protocols of the communication terminal apparatus 104.

Figure 48:
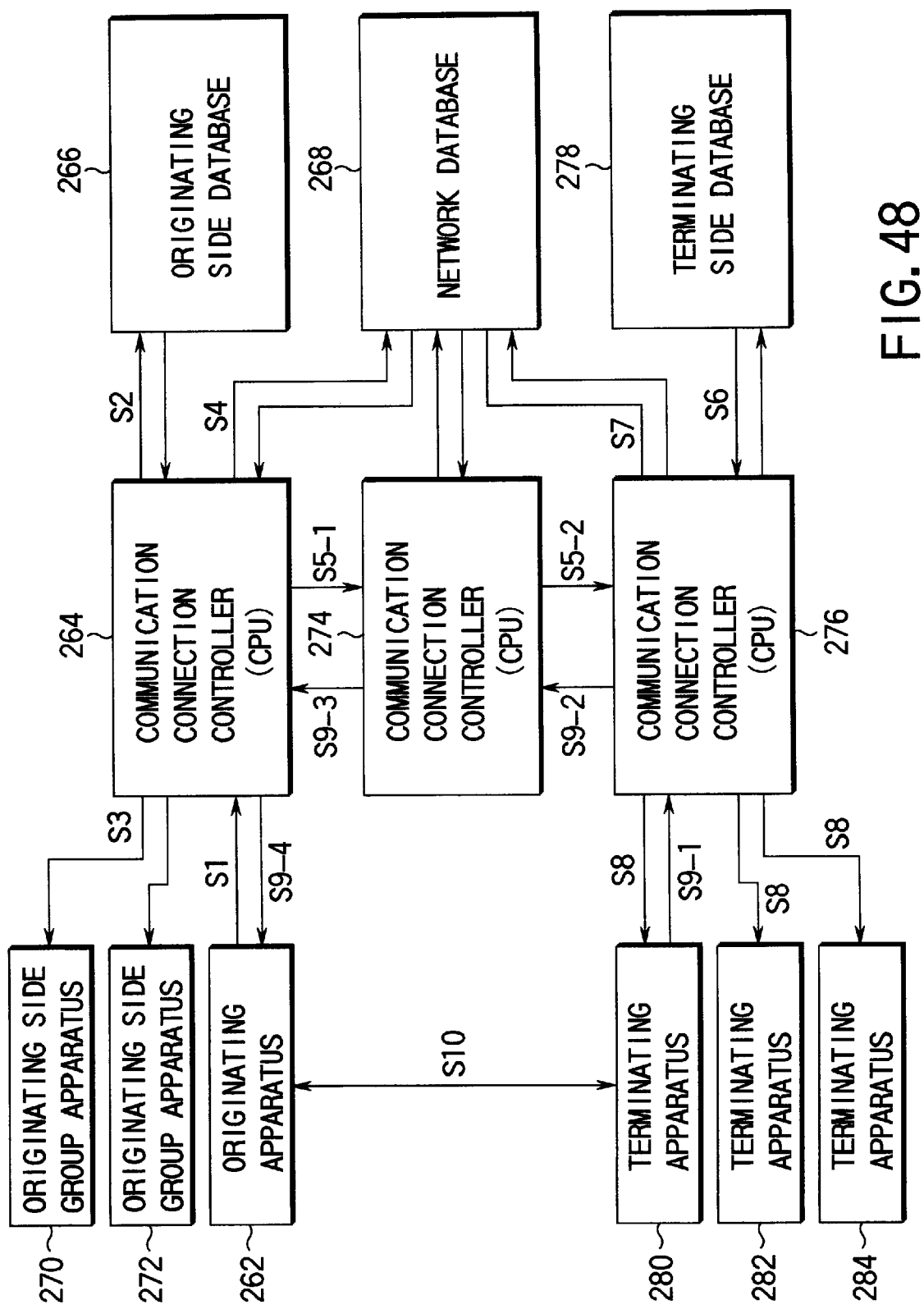
FIG. 48 is a chart showing the communication sequence of the second embodiment.

FIG. 48 is a chart for explaining the basic connection procedure in the embodiment shown in FIG. 46.

When one (originating apparatus 262) of the communication terminal apparatus 104, personal computer 112, and a communication terminal apparatus connected to the communication network 108 begins to communicate with another apparatus (terminating apparatus), it supplies a caller number and login information as originating side information, a terminating side number, name, and service as terminating side information, and a communication condition such as audio, video, data, or the like to one of communication connection controllers 264 (step S1). The communication connection controller 264 may be any of the CPU 138 in the CTI server 114 or 116, the CPU 258 in each interface apparatus, and the CPU 120 in the personal computer 112.

The communication connection controller 264 extracts detailed information that pertains to the caller (the language, address, age, past communication record, operator record, transaction log, and the like of the caller) by referring to an originating side database 266 (step S2). The database 266 is stored in the hard disk HD of the CTI server 114.

The communication connection controller 264 informs, based on this information, apparatuses 270 and 272 that belong to the same group as the caller (a group used when a PBX classifies terminals into groups to manage them) that the originating apparatus 262 has started a communication (step S3).

Subsequently, data such as a communication start time, network condition, and the like, which are not directly associated with originating and terminating side data are extracted by referring to a network database 268 (step S4).

When the communication connection controller 264 on the caller side cannot refer to the database of terminating side information requested from the caller side, information required for connection acquired from the databases 266 and 268 is transferred to a communication connection controller 276 having route information of the terminating terminal so as to access a communication connection controller 276 that can refer to the terminating side information (step S5-1). A communication connection controller 274 selects a communication connection controller 276 that can refer to information of the terminating side terminal, and transfers information received from the communication connection controller 264 and information required upon reference by the communication connection controller 274 to the communication connection controller 276 (step S5-2).

The communication connection controller 276 extracts information that pertains to the callee (the language, address, age, past communication record, operator record, transaction log, and the like of the callee) by referring to a terminating side database 278 on the basis of the received terminating side information (step S6). Similarly, the controller 276 extracts data such as a communication start time, network condition, and the like, which are not directly associated with the originating and terminating side data by referring to the network database 268 (step S7).

The communication connection controller 276 determines one or a plurality of terminating side terminals that are actually to receive the call, with reference to register information and operating information of operators of the terminal apparatuses 262, 270, and 272, which are associated with the groups on the caller side, and informs terminating side apparatuses 280, 282, and 284 of the presence of an incoming call (step S8). The terminating side terminal informs the originating side terminal 262 of the beginning of ringing via the communication connection controllers 276, 274, and 264 (steps S9-1, S9-2, S9-3, and S9-4).

After that, a communication between the originating side apparatus 262 and terminating side apparatus 280 is realized (step S10). As described above, a series of these communication connection procedures may be implemented by the CPU 138 alone on the single CTI server 114, but may be easily modified so that these procedures are respectively contained in individual communication terminal apparatuses.

The basic communication connection procedures between two parties have been described. According to this embodiment, audio data is also processed (transferred on the network) as a packet, and data and audio processes can be unified. Since no line exchange is required unlike in a conventional telephone exchange, communication controllers can be distributed, thus allowing easily maintenance. In addition, a terminal can be set by the user since it need only be connected to the network 102 via the interface apparatus 106. Furthermore, a new terminal can be similarly connected, thus assuring high expandability.

Since a computer and telephone can be completely integrated, voice/e-mail unification (unified message), a telephone directory originating function (directory service), a voice mail function, a FAX mail function, a voice recognition function, and an e-mail text-to-speech function can be implemented. Furthermore, various kinds of services provided by the conventional ISDN are also available: for example, a call center function, a caller ID informing function, and an automatic voice answering function.

Some examples will be explained below.

Figure 49:
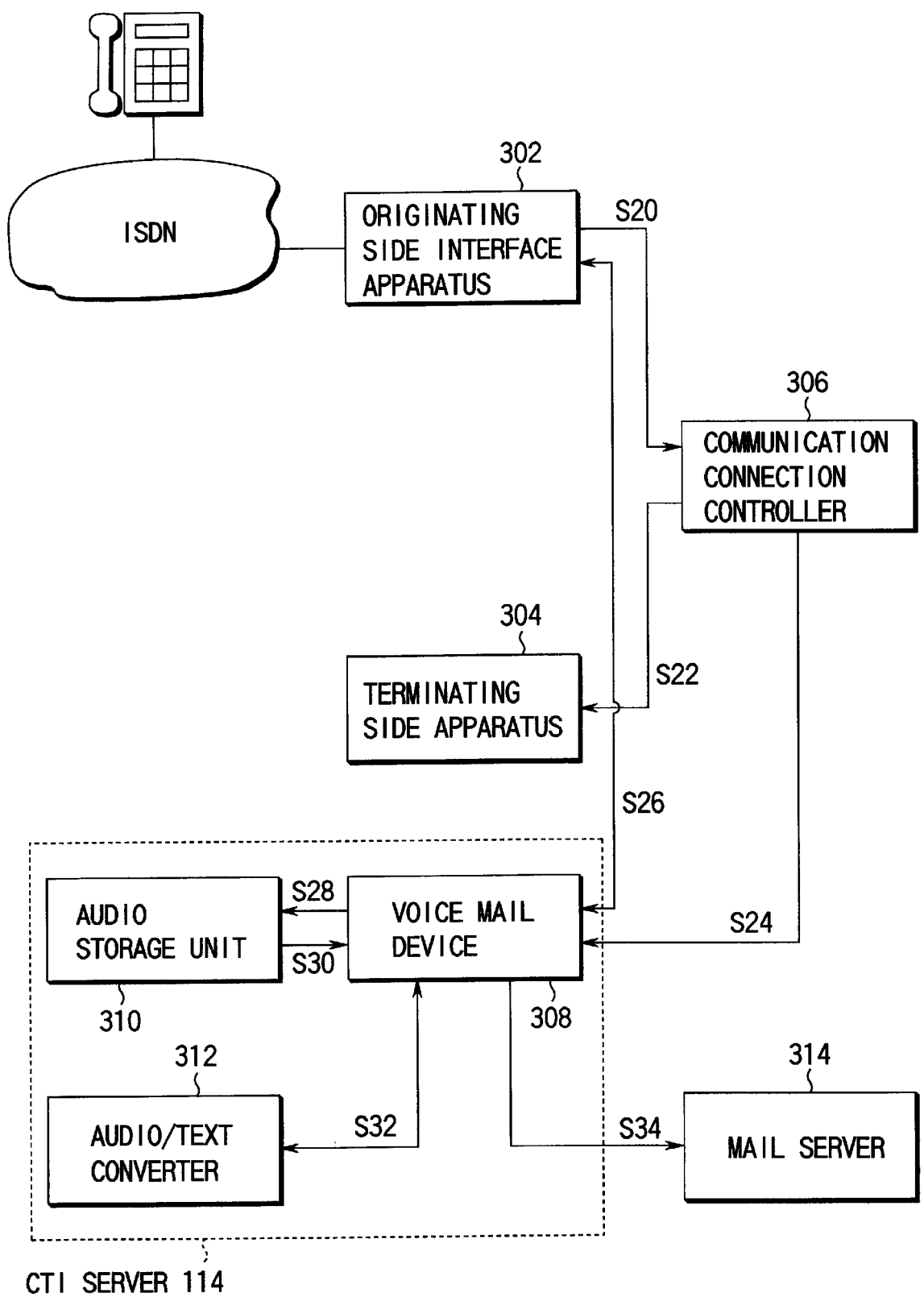
FIG. 49 is a diagram showing an arrangement for implementing a voice mail in the second embodiment.

FIG. 49 shows a method of implementing a voice mail when the user at the terminating side terminal does not answer. In this case, the CTI server 114 includes a voice mail device 308, an audio storage unit 310, and a speech/text converter 312, and an independent mail server 314 is added.

A case will be examined below wherein a call originated from a telephone connected to the ISDN network is received by an originating side interface apparatus 302 (step S20), and is then received by a terminating side apparatus 304 (step S22).

If the terminating side apparatus 304 does not answer the call for a predetermined period of time or all terminating terminals are busy and cannot answer, a communication connection controller 306 re-connects by changing the terminating apparatus to the voice mail device 308 in the CTI server 114 in accordance with information prestored in a terminating side information database (step S24). The voice mail device 308 automatically answers and sends back a voice message "We are not here right now. Please leave your message.", and if the user at the telephone connected to the ISDN network leaves a message in the same manner as a voice mail (step S26), the voice mail device 308 saves that audio data in the audio storage unit 310 as an audio file (step S28).

Next, the audio file in the audio storage unit 310 is read by the voice mail device 308 (step S30), and is converted into an attached file of an e-mail by the speech/text converter 312 (step S32). Then, the e-mail is sent to the mail server 314 as the one addressed to the terminating side apparatus 304 that could not answer (step S34).

In this manner, an e-mail by means of text and a voice mail by means of voice can be easily unified using the e-mail mechanism on the network.

Figure 50:
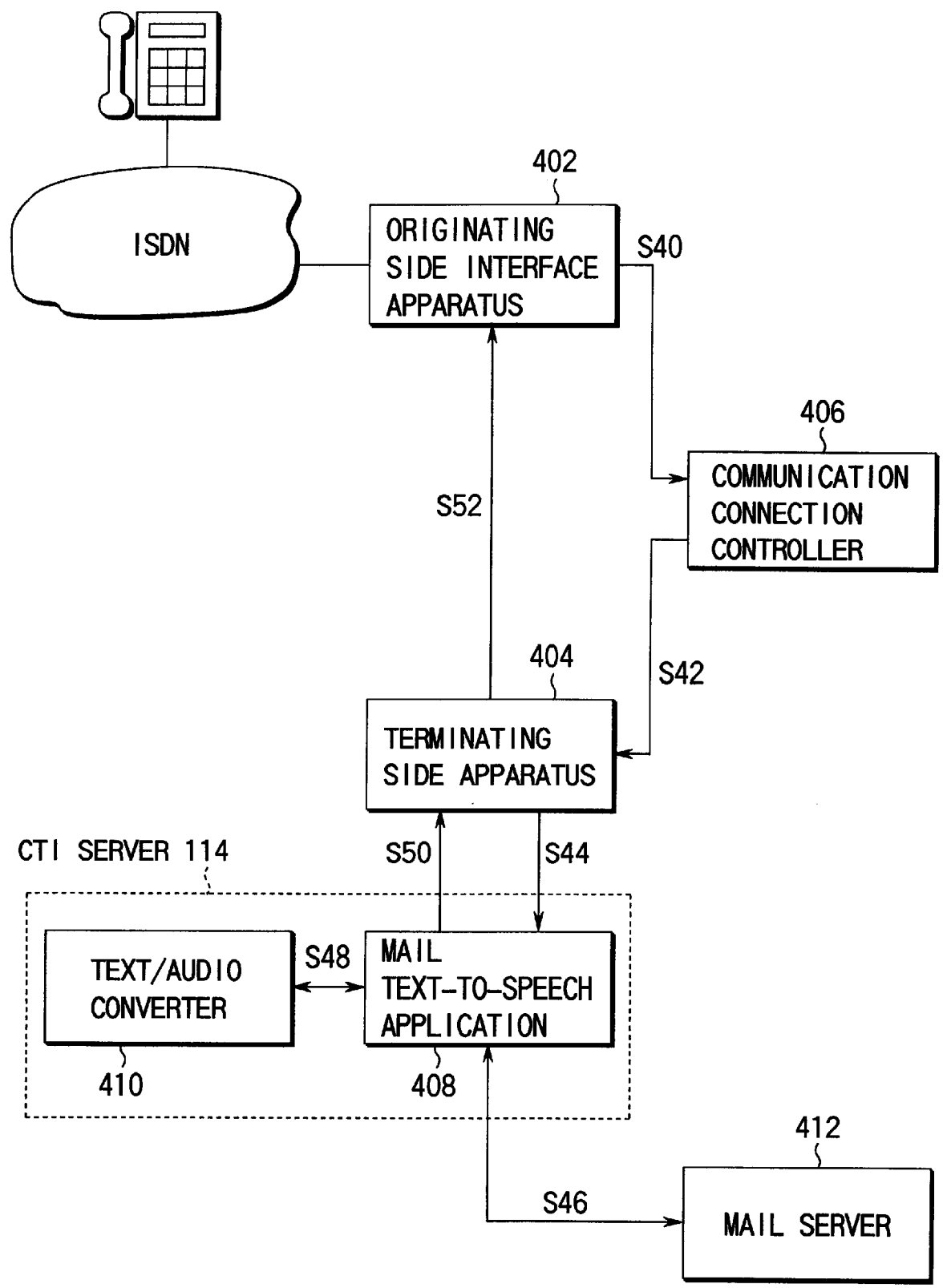
FIG. 50 is a diagram showing an arrangement for implementing a mail text-to-speech function in the second embodiment.

FIG. 50 shows a method of implementing an e-mail text-to-speech function. In this case, the CTI server 114 comprises a mail text-to-speech application 408, and text/speech converter 410, and an independent mail server 412 is added.

A case will be examined below wherein a call originated from a telephone connected to the ISDN network is received by an originating side interface apparatus 402 (step S40), and is then received by a terminating side apparatus 404 (step S42).

The terminating side apparatus 404 is directly terminated by the e-mail text-to-speech application 408 in the CTI server 114. In such case, if a person calls using a telephone, the caller ID of which indicates his or her home, or the like, and must be the person himself or herself, per authentication is done by, e.g., simply collating a password (ID). If a person calls using a public telephone, after an ID is input, personal authentication data is accessed on the basis of caller information obtained from a communication connection controller 406 upon connection to require input of an arbitrary combination of information that can be used for personal authentication, so as to check the caller's authenticity. In this manner, the security level can be changed in units of originating side terminals and access means.

After the ID has been confirmed, the mail server 412 is accessed using this ID to acquire an e-mail (step S46). This text information is converted into an audio file using the text/speech converter 410 (step S48), and the converted file can be read back as speech to the caller (steps S50 and S52).

In this way, a text-to-speech system can be easily built. Note that the user can give priority depending on the mail sender, title, contents, and the like. Also, flexible setups (e.g., the mail contents are read back after its title is confirmed) can be made by this mail text-to-speech application.

A case will be explained wherein an electronic meeting is held. Since a plurality of persons join the electronic meeting, voices of a plurality of attendants must be synthesized. This synthesis is done by the CTI server 114. For example, when three persons A, B, and C are in meeting, B's and C's audio packets are synthesized and supplied to A; A's and C's audio packets are synthesized and supplied to B; and A's and B's audio packets are synthesized and supplied to C. Note that if the number of attendants of a meeting is n, nC2×2 voice synthesis functions need only be prepared.

Note that the communication connection controller may change the terminating side interface apparatus or the communication connection controller itself in correspondence with a request from the originating side interface apparatus or terminating side interface apparatus, or changes in state of the network. When audio data of a voice communication is transferred to another apparatus, the communication connection controller may change the transfer destination (communication connection mode) in correspondence with a request from the originating side interface apparatus or terminating side interface apparatus, or changes in state of the network. Furthermore, the communication connection controller may have a call center function of calling originating and terminating side interface apparatuses in turn to connect them to each other and to make them communicate with each other (so-called third party call).

As described above, according to the present invention, when an audio communication terminal represented by a telephone is connected to a computer network via an interface apparatus that converts between the communication protocol of the network and the communication protocol unique to the terminal, a multimedia information communication system which allows the audio communication terminal to serve as one terminal of the computer network, and can obviate the need for a time switch for line exchange by exchanging audio data as packets on the network, can be realized.

Industrial Applicability

To restate, according to the present invention, both an audio signal transmitted from, e.g., an audio communication terminal and data transmitted from a data terminal such as a personal computer or the like are converted into an identical data format corresponding to the communication protocol of a first communication network by a communication interface apparatus, and the converted data are then sent onto the first communication network. The data transferred on the first communication network is converted into a data format corresponding to the communication protocol of a voice communication terminal or data terminal by a terminating communication interface apparatus, and is then sent to a terminal apparatus. For this reason, a plurality of kinds of communications can be implemented using a single infrastructure, i.e., the first communication network.

In addition, the data conversion processes of the respective terminal apparatuses are distributed to communication interface apparatuses corresponding to the terminal apparatuses, and each communication interface apparatus need only have a data conversion function between, e.g., one type of communication protocol on the terminal apparatus side and only one type of communication protocol on the first communication network side, and need not have all data conversion functions corresponding to a plurality of types of communication protocols versus a plurality of types of communication protocols. For this reason, no large-scale communication equipment for integrated processing such as double PBXs, gateway, and the like is required, and a system can be implemented by preparing a plurality of communication interface apparatuses having simple functions, thus attaining a simple system arrangement and a great cost reduction.

Upon connecting a new terminal apparatus or changing connections, after an arbitrary terminal apparatus is connected to the first communication network via a communication interface apparatus, a simple setup process need only be done without requiring any complicated setups. Hence, a system which has high expandability and allows easy maintenance management can be provided.

Therefore, according to the present invention, a low-cost, high-reliability multimedia information communication system which can realize a plurality of kinds of communications by a common communication infrastructure without equipping any large-scale equipment such as a PBX, gateway, and the like, and can make the system arrangement simple and maintenance management easy can be provided.

What is claimed is:

1. A multimedia information communication system comprising:

first and second communication terminal apparatuses for exchanging information data using a common first communication protocol or first and second communication protocols which are different from each other;

a first communication network for transmitting information data in accordance with a third communication protocol different from the first and second communication protocols;

first and second communication interface apparatuses for respectively connecting said first and second communication terminal apparatuses to said first communication network; and a third communication interface apparatus for connecting said first communication network to a second communication network which transmits information data in accordance with a fourth communication protocol which is different from at least the third communication protocol, wherein said first communication interface apparatus comprises first conversion means for converting information data in accordance with the first and third communication protocols between said first communication terminal apparatus and said first communication network, said second communication interface apparatus comprises second conversion means for converting information data in accordance with the second and third communication protocols between said second communication terminal apparatus and said first communication network, and said third communication interface apparatus comprises third conversion means for converting information data in correspondence with a difference between the third and fourth communication protocols between said second and first communication networks, and wherein said third communication interface apparatus comprises first communication interface means for communicating with said first communication network, codec means for decoding information obtained from said first communication network or information obtained from said second communication network by said communication interface means, or encoding information to be output to said first or second communication network, a PB receiver for decoding a PB signal from said second communication network, and second communication interface means for communicating with said second communication network.

2. A multimedia information communication system according to claim 1, wherein said third communication interface apparatus comprises first communication interface means for communicating with said first communication network, codec means for decoding information obtained from said first communication network by said communication interface means, or encoding information to be output to said first communication network, and second communication interface means for communication with said second communication network.

3. A multimedia information communication system according to claim 1, wherein at least one of said first, second, and third conversion means comprises a plurality of data conversion means provided in correspondence with types of information data, data type determination means for determining a type of input information data, and selection means for selectively enabling said plurality of data conversion means in accordance with a determination result of said data type determination means to convert the information data.

4. A multimedia information communication system comprising:

first and second communication terminal apparatuses for exchanging information data using a common first communication protocol or first and second communication protocols which are different from each other;

a first communication network for transmitting information data in accordance with a third communication protocol different from the first and second communication protocols;

first and second communication interface apparatuses for respectively connecting said first and second communication terminal apparatuses to said first communication network; and a third communication interface apparatus for connecting said first communication network to a second communication network for transmitting information data in accordance with a fourth communication protocol different from the third communication protocol, wherein each of said first and second interface apparatuses comprises;

inquiry means for, when a communication terminal apparatus served by the own apparatus generates a call originating request addressed to a communication terminal apparatus served by another communication interface apparatus, multi-address transmitting an inquiry signal containing first identification information assigned to the terminating communication terminal apparatus to all communication interface apparatuses connected to said first communication network;

determination means for, when an inquiry signal reaches via said first communication network, determining if a communication terminal apparatus corresponding to the first identification information contained in the inquiry signal is served by the own apparatus;

response signal transmission means for, when said determination means determines that the communication terminal apparatus of interest is served by the own apparatus, sending back a response signal containing second identification information assigned to the own apparatus on said first communication network to an originating communication interface apparatus via said first communication network; and first communication link formation means for, when the response signal is sent back, performing processing for forming a communication link between the own apparatus and the terminating communication interface apparatus on said first communication network on the basis of the second identification information contained in the response signal.

5. A multimedia information communication system according to claim 4, wherein each of said first and second communication interface apparatuses comprises:

identification information storage means for, when the response signal is sent back, storing the second identification information contained in the response signal together with first identification information corresponding to a partner communication terminal apparatus in correspondence with each other;

first acquisition means for, when a communication terminal apparatus served by the own apparatus generates a call originating request addressed to a communication terminal apparatus served by another communication interface apparatus, acquiring second identification information assigned to a communication interface apparatus that serves the terminating communication terminal apparatus from said identification information storage means; and second communication link formation means for, when said first acquisition means acquires the second identification information assigned to the terminating communication interface apparatus, performing processing for forming a communication link that connects between the own communication interface apparatus and terminating communication interface apparatus on said first communication network on the basis of the second identification information.

6. A multimedia information communication system according to claim 5, wherein said identification information storage means stores first identification information and second identification information acquired by the own communication interface apparatus by the inquiry, and first identification information and second identification information acquired by another communication interface apparatus by the inquiry.

7. A multimedia information communication system according to claim 4, further comprising a server apparatus, which is connected to said first communication network, and has a function of intensively storing the first identification information and second identification information acquired by said first and second communication interface apparatuses by the inquiry, and wherein each of said first and second communication interface apparatuses comprises:

second acquisition means for, when a communication terminal apparatus served by the own apparatus generates a call originating request addressed to a communication terminal apparatus served by another communication interface apparatus, acquiring second identification information assigned to a communication interface apparatus that serves the terminating communication terminal apparatus from said server apparatus; and third communication link formation means for, when said second acquisition means acquires the second identification information assigned to the terminating communication interface apparatus, performing processing for forming a communication link that connects between the own communication interface apparatus and terminating communication interface apparatus on said first communication network on the basis of the second identification information.

8. A multimedia information communication system according to claim 4, wherein said third communication interface apparatus comprises identification information storage means for intensively storing the first identification information and second identification information acquired by said first and second communication interface apparatuses by the inquiry, and each of said first and second communication interface apparatuses comprises:

third acquisition means for, when a communication terminal apparatus served by the own apparatus generates a call originating request addressed to a communication terminal apparatus served by another communication interface apparatus, acquiring second identification information assigned to a communication interface apparatus that serves the terminating communication terminal apparatus from said identification information storage means of said third communication interface apparatus; and fourth communication link formation means for, when said third acquisition means acquires the second identification information assigned to the terminating communication interface apparatus, performing processing for forming a communication link that connects between the own communication interface apparatus and terminating communication interface apparatus on said first communication network on the basis of the second identification information.

9. A multimedia information communication system according to claim 4, further comprising a server apparatus, which is connected to said first communication network, and has a function of intensively storing the first identification information and second identification information acquired by said first and second communication interface apparatuses by the inquiry, and wherein each of said first and second communication interface apparatuses comprises:

identification information storage means for, when a response signal to the inquiry signal is sent back, storing second identification information contained in the response signal together with first identification information assigned to a terminating communication terminal apparatus in correspondence with each other;

first search means for, when a communication terminal apparatus served by the own apparatus generates a call originating request addressed to a communication terminal apparatus served by another communication interface apparatus, searching said identification information storage means of the own apparatus for second identification information assigned to a communication interface apparatus that serves the terminating communication terminal apparatus;

second search means for, when said first search means cannot find the second identification information by the search, searching said server apparatus for the second identification information;

third search means for, when said second search means cannot find the second identification information by the search, multi-address transmitting an inquiry signal containing first identification information corresponding to the terminating communication terminal apparatus to all communication interface apparatuses connected to said first communication network, and acquiring second identification information assigned to the communication interface apparatus that serves the terminating communication terminal apparatus, on the basis of a response signal to the inquiry signal; and fifth communication link formation means for, when one of said first, second, and third search means acquires the second identification information assigned to the communication interface apparatus that serves the terminating communication terminal apparatus, performing processing for forming a communication link for connecting between the own communication interface apparatus and terminating communication interface apparatus on said first communication network on the basis of the second identification information.

10. A multimedia information communication system comprising first and second communication terminal apparatuses for exchanging information data using a common first communication protocol or first and second communication protocols which are different from each other;

a first communication network for transmitting information data in accordance with a third communication protocol different from the first and second communication protocols;

first and second communication interface apparatuses for respectively connecting said first and second communication terminal apparatuses to said first communication network; and a third communication interface apparatus for connecting said first communication network to a second communication network for transmitting information data in accordance with a fourth communication protocol different from the third communication protocol, wherein each of said first and second interface apparatuses comprises:

inquiry signal transmission means for, when a communication terminal apparatus served by the own apparatus generates a call originating request addressed to a communication terminal apparatus served by another communication interface apparatus, transmitting an inquiry signal containing identification information corresponding to the terminating communication terminal apparatus onto said first communication network, and said third communication interface apparatus comprises:

terminating apparatus determination means for receiving the inquiry signal, and determining based on the identification information contained in the inquiry signal if the terminating communication terminal apparatus is a communication terminal apparatus which is served by said first or second communication interface apparatus inside said system, or a communication terminal apparatus which is connected to said second communication network outside said system; and communication link formation means for selectively performing first control for forming a communication link for connecting between said first or second communication interface apparatus that serves an originating communication terminal apparatus and said first or second communication interface apparatus that serves the terminating communication terminal apparatus, and second control for forming a communication link between said first or second communication interface apparatus that serves the originating communication terminal apparatus and the terminating communication terminal apparatus connected to said second communication network, in accordance with a determination result of said terminating apparatus determination means.

11. A multimedia information communication system comprising:

first and second communication terminal apparatuses for exchanging information data using a common first communication protocol or first and second communication protocols which are different from each other;

a first communication network for transmitting information data in accordance with a third communication protocol different from the first and second communication protocols;

first and second communication interface apparatuses for respectively connecting said first and second communication terminal apparatuses to said first communication network;

a third communication interface apparatus for connecting said first communication network to a second communication network for transmitting information data in accordance with a fourth communication protocol different from the third communication protocol; and a server apparatus connected to said first communication network, wherein each of said first and second communication interface apparatuses comprises:

inquiry signal transmission means for, when a communication terminal apparatus served by the own apparatus generates a call originating request addressed to a communication terminal apparatus served by another communication interface apparatus, transmitting an inquiry signal containing identification information corresponding to the terminating communication terminal apparatus onto said first communication network, and said server apparatus comprises:

terminating apparatus determination means for receiving the inquiry signal, and determining based on the identification information contained in the inquiry signal if the terminating communication terminal apparatus is a communication terminal apparatus which is served by said first or second communication interface apparatus inside said system, or a communication terminal apparatus which is connected to said second communication network outside said system; and communication link formation means for selectively performing first control for forming a communication link for connecting between said first or second communication interface apparatus that serves an originating communication terminal apparatus and said first or second communication interface apparatus that serves the terminating communication terminal apparatus, and second control for forming a communication link between said first or second communication interface apparatus that serves the originating communication terminal apparatus and the terminating communication terminal apparatus connected to said second communication network, in accordance with a determination result of said terminating apparatus determination means.

12. A multimedia information communication system according to claim 10 or 11, wherein said communication link formation means performs as the first control, control for sending back a response signal containing second identification information assigned to a communication interface apparatus that serves the terminating communication terminal apparatus to the communication interface apparatus as an inquiry source, and forming a communication link that connects between a communication interface apparatus that serves an originating communication terminal apparatus, and the communication interface apparatus that serves the terminating communication terminal apparatus, and as the second control, processing for sending back a response signal containing second identification information assigned to said third communication interface apparatus to the communication interface apparatus as an inquiry source, forming an internal communication link that connects the originating communication interface apparatus and said third communication interface apparatus on said first communication network, forming an external communication link between the terminating external communication terminal apparatus and said third communication interface apparatus by requesting a call connection to said second communication network, and connecting the internal and external communication links to each other.

13. A multimedia information communication system according to claim 10 or 11, wherein said terminating apparatus determination means comprises identification information storage means for prestoring first identification information assigned to said first and second communication interface apparatuses, and first identification information of each communication terminal apparatuses served by the communication interface apparatuses in correspondence with each other, and determines if the terminating communication terminal apparatus is a communication terminal apparatus inside or outside said system by checking if first identification information of a terminating apparatus contained in the received inquiry signal is stored in said identification information storage means.

14. A multimedia information communication system according to claim 13, wherein said terminating apparatus determination means further comprises means for acquiring second identification information assigned to said first and second communication interface apparatuses and the first identification information of each communication terminal apparatuses served by these communication interface apparatuses by inquiring of said first and second communication interface apparatuses.

15. A multimedia information communication system according to claim 10 or 11, wherein when a received inquiry signal contains information indicating whether or not a call is originated to said second communication network, said terminating apparatus determination means determines based on the information if the terminating communication terminal apparatus is a communication terminal apparatus inside or outside said system.

16. A multimedia information communication system comprising:

first and second communication terminal apparatuses for exchanging information data using a common first communication protocol or first and second communication protocols which are different from each other;

a first communication network for transmitting information data in accordance with a third communication protocol different from the first and second communication protocols;

first and second communication interface apparatuses for respectively connecting said first and second communication terminal apparatuses to said first communication network; and a third communication interface apparatus for connecting said first communication network to a second communication network for transmitting information data in accordance with a fourth communication protocol different from the third communication protocol, wherein each of said first and second communication interface apparatuses comprises:

terminating apparatus determination means for, when a communication terminal apparatus served by the own apparatus generates a call originating request addressed to another communication terminal apparatus, determining if the terminating communication terminal apparatus is a communication terminal apparatus which is served by said first or second interface apparatus inside said system, or a communication terminal apparatus which is connected to said second communication network outside said system, wherein said terminating apparatus determination means comprises inquiry means for, when a communication terminal apparatus served by the own communication interface apparatus generates a call originating request addressed to another communication terminal apparatus, multi-address transmitting an inquiry signal containing identification information corresponding to the terminating communication terminal apparatus to all communication interface apparatuses connected to said first communication network; and communication link formation means for selectively performing first control for forming a communication link for connecting between the own communication interface apparatus and a communication interface apparatus that serves the terminating communication terminal apparatus, and second control for forming a communication link for connecting between the own communication interface apparatus and the terminating communication terminal apparatus connected to said second communication network, in accordance with a determination result of said terminating apparatus determination means.

17. A multimedia information communication system according to claim 1, wherein said terminating apparatus determination means further comprises:

determination means for determining if the terminating other communication terminal apparatus is a communication terminal apparatus inside or outside said system by monitoring whether or not one of the communication interface apparatuses connected to said first communication network sends back a response signal indicating that the apparatus serves the terminating other communication terminal apparatus, after the inquiry signal is transmitted.

18. A multimedia information communication apparatus according to claim 17, wherein said terminating apparatus determination means comprises:

identification information storage means for, when the response signal is sent back, storing second identification information, which is contained in the response signal, and corresponds to a communication interface apparatus that sent back the response signal, together with first identification information corresponding to the terminating communication terminal apparatus in correspondence with each other; and determination means for, when a communication terminal apparatus served by the own communication interface apparatus generates a call originating request addressed to another communication terminal apparatus, searching said identification information storage means for second identification information assigned to a communication interface apparatus that serves the terminating communication terminal apparatus, and determining based on the presence/absence of the second identification information if the terminating communication terminal apparatus is a communication terminal apparatus inside or outside said system.

19. A multimedia information communication apparatus according to claim 16, wherein when a call originating request sent from an originating communication terminal apparatus contains information indicating whether or not a call is originated to said second communication network, said terminating apparatus determination means determines based on this information if the terminating communication terminal apparatus is a communication terminal apparatus inside or outside said system.

20. A multimedia information communication system comprising:

first and second communication terminal apparatuses for exchanging information data using a common first communication protocol or first and second communication protocols which are different from each other;

a first communication network for transmitting information data in accordance with a third communication protocol different from the first and second communication protocols;

first and second communication interface apparatuses for respectively connecting said first and second communication terminal apparatuses to said first communication network; and a third communication interface apparatus for connecting said first communication network to a second communication network for transmitting information data in accordance with a fourth communication protocol different from the third communication protocol, wherein said third communication interface apparatus comprises:
first identification information acquisition means for, when an incoming call signal reaches from an external communication terminal apparatus via said second communication network, acquiring first identification information corresponding to a terminating communication terminal apparatus served by said first or second communication interface apparatus on the basis of information representing a terminating apparatus contained in the incoming call signal;
second identification information acquisition means for acquiring second identification information assigned to said first or second communication interface apparatus that serves the terminating communication terminal apparatus on the basis of the first identification information acquired by said first identification information acquisition means; and
communication link formation means for forming a communication link that connects between said third communication interface apparatus and said first or second communication interface apparatus that serves the terminating communication terminal apparatus on said first communication network on the basis of the second identification information acquired by said second identification information acquisition means.

21. A multimedia information communication system according to claim 20, wherein when the incoming call signal coming from the external communication terminal apparatus contains at least one of identification information corresponding to a terminating communication terminal apparatus and a communication type, said first identification information acquisition means determines a terminating communication terminal apparatus on the basis of at least one of the identification information and communication type, and acquires first identification information assigned to the determined communication terminal apparatus.

22. A multimedia information communication system according to claim 20, wherein when the incoming call signal coming from the external communication terminal apparatus contains identification information of an originating communication terminal apparatus, said first identification information acquisition means determines a terminating communication terminal apparatus on the basis of the identification information, and acquires first identification information assigned to the determined communication terminal apparatus.

23. A multimedia communication system comprising:a plurality of interface apparatuses, each of which is connected to a communication terminal, and has protocol conversion means for converting a first communication protocol unique to the communication terminal into a second communication protocol different from the first communication protocol, and vice versa;
a network for connecting said interface apparatuses to each other and transmitting a signal in accordance with the second communication protocol; and
a communication connection controller for controlling a communication between the terminal devices connected to the plurality of interface apparatuses, wherein said communication connection controller is provided to at least one of said interface apparatuses, and
each of said interface apparatuses transmits, to one communication connection controller, originating side information that pertains to the interface apparatus which is to initiate a communication, terminating side information that pertains to the interface apparatus which is to communicate with, and communication condition information that pertains to communication means for performing a communication, at the beginning of the communication.

24. A multimedia communication system according to claim 23, wherein said communication controller acquires detailed originating side information, terminating side information, and communication condition information from a database on said network or said interface apparatus on the basis of the received originating side information, terminating side information, and communication condition information, selects an appropriate communication connection controller on the basis of the acquired information and information that pertains to a status of said network at the time of the communication, and transmits information that pertains to the selected communication connection controller to originating and terminating side interface apparatuses.

25. A multimedia communication system according to claim 24, wherein each of said interface apparatuses further comprises means for monitoring a communication state from the originating side interface apparatus to the terminating side interface apparatus.

26. A multimedia communication system according to claim 23, wherein the originating side information contains a telephone number, network number, and login name, and the communication condition information contains an audio communication, image communication, and data communication.

27. A multimedia communication system according to claim 23, wherein the terminating side information contains a telephone number, network number, login name, and group information required for a communication.

28. A multimedia communication system according to claim 23, wherein said communication connection controller further comprises means for changing a terminating side interface apparatus in correspondence with a request from an originating or terminating side interface apparatus or a change in status of said network even after the beginning of the communication between the interface apparatuses.

29. A multimedia communication system according to claim 23, wherein when a terminating side interface apparatus cannot answer a call, a third interface apparatus answers as proxy for the terminating side interface apparatus, stores communicating information, and transfers the stored information upon call termination to the terminating side interface apparatus.

30. A multimedia communication system according to claim 23, further comprising means for converting e-mail text into audio data, and wherein audio data of an e-mail addressed to an originating side interface apparatus is transmitted to the originating side interface apparatus in response to a request from the originating side interface apparatus.

31. A multimedia communication system according to claim 23, wherein said network transmits a signal in accordance with a protocol complying with an IEEE802 interface.

32. A multimedia communication system according to claim 23, wherein said network transmits a signal in accordance with a protocol complying with an IEEE1294 interface.

33. A multimedia communication system comprising:
a plurality of interface apparatuses, each of which is connected to a communication terminal, and has protocol conversion means for converting a first communication protocol unique to the communication terminal into a second communication protocol different from the first communication protocol, and vice versa;

a network for connecting said interface apparatuses to each other and transmitting a signal in accordance with the second communication protocol;

a communication connection controller for controlling a communication between the terminal devices connected to the plurality of interface apparatuses; and means for changing the communication connection controller in correspondence with a request from an originating or terminating side interface apparatus or a change in status of said network even after the beginning of the communication between the interface apparatuses, wherein said communication connection controller is provided to at least one of said interface apparatuses.

34. A multimedia communication system according to claim 33, further comprising means for changing a communication connection mode in correspondence with a request from an originating or terminating side interface apparatus or a change in status of said network even after the beginning of the communication between the interface apparatuses.

35. A multimedia communication system according to claim 33, wherein a third interface apparatus different from originating and terminating side interface apparatuses sends information of the originating and terminating side interface apparatuses to one communication connection controller to call the originating and terminating side interface apparatuses in turn and to connect the originating and terminating side interface apparatuses to each other so as to make the originating and terminating side interface apparatuses communicate with each other.

* * * * *

UNITED STATES PATENT AND TRADEMARK OFFICE
CERTIFICATE OF CORRECTION

PATENT NO.    : 6,643,291 B1
DATED         : November 4, 2003
INVENTOR(S)   : Yoshihara et al.

It is certified that error appears in the above-identified patent and that said Letters Patent is hereby corrected as shown below:

Column 54,
Line 43, change "comprising" to -- comprising: --.

Column 58,
Line 6, change "claim 1" to -- claim 16 --.

Column 59,
Line 49, after "comprising:" insert a carriage return.

Column 60,
Line 59, change "IEEE 1294 interface" to -- IEEE 1394 interface --.

Signed and Sealed this

Second Day of March, 2004

JON W. DUDAS
*Acting Director of the United States Patent and Trademark Office*